(12) United States Patent
Tokuda et al.

(10) Patent No.: US 10,982,303 B2
(45) Date of Patent: Apr. 20, 2021

(54) COATED STEEL PRODUCT

(71) Applicant: NIPPON STEEL CORPORATION, Tokyo (JP)

(72) Inventors: Kohei Tokuda, Tokyo (JP); Jun Maki, Tokyo (JP); Yasuto Goto, Tokyo (JP); Takuya Mitsunobu, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/480,967

(22) PCT Filed: Jan. 26, 2018

(86) PCT No.: PCT/JP2018/002595
§ 371 (c)(1),
(2) Date: Jul. 25, 2019

(87) PCT Pub. No.: WO2018/139619
PCT Pub. Date: Aug. 2, 2018

(65) Prior Publication Data
US 2019/0390303 A1 Dec. 26, 2019

(30) Foreign Application Priority Data
Jan. 27, 2017 (JP) .............................. JP2017-013198

(51) Int. Cl.
*C22C 18/04* (2006.01)
*B32B 15/01* (2006.01)
(Continued)

(52) U.S. Cl.
CPC ............ *C22C 18/04* (2013.01); *B32B 15/013* (2013.01); *C23C 2/06* (2013.01); *C23C 2/28* (2013.01); *C23C 2/40* (2013.01)

(58) Field of Classification Search
CPC .......... C22C 18/04; B32B 15/013; C23C 2/06; C23C 2/40
(Continued)

(56) References Cited

U.S. PATENT DOCUMENTS 6,235,410 B1    5/2001  Komatsu et al.
6,465,114 B1 *  10/2002 Honda ................ C23C 2/02
                                                      148/264

FOREIGN PATENT DOCUMENTS

AU    2010267413 A1    2/2012
EP       1199376 A1    4/2002
(Continued)

OTHER PUBLICATIONS

International Search Report for PCT/JP2018/002595 dated Apr. 3, 2018.
(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

There is provided a coated steel product having a steel product and a coating layer including a Zn—Al—Mg alloy layer disposed on a surface of the steel product, in which the Zn—Al—Mg alloy layer has a Zn phase, the Zn phase contains a Mg—Sn intermetallic compound phase, and the coating layer consists of Zn: more than 65.0%, Al: from more than 5.0% to less than 25.0%, Mg: from more than 3.0% to less than 12.5%, Sn: 0.1% to 20.0% in terms of percent (%) by mass, given amounts of optional elements, and impurities, and has a chemical composition that satisfies the following Formulas 1 to 5:

Bi+In<Sn    Formula 1:

Y+La+Ce≤Ca    Formula 2:

(Continued)

| | |
|---|---|
| Si<Sn | Formula 3: |
| 0≤Cr+Ti+Ni+Co+V+Nb+Cu+Mn<0.25 | Formula 4: |
| 0≤Sr+Sb+Pb+B<0.5. | Formula 5: |

17 Claims, 8 Drawing Sheets

(51) Int. Cl.
  *C23C 2/06* (2006.01)
  *C23C 2/28* (2006.01)
  *C23C 2/40* (2006.01)

(58) Field of Classification Search
  USPC .......................................................... 428/653
  See application file for complete search history.

(56) References Cited

FOREIGN PATENT DOCUMENTS

| | | |
|---|---|---|
| JP | 10-306357 A | 11/1998 |
| JP | 2001-64759 A | 3/2001 |
| JP | 2001-115273 A | 4/2001 |
| JP | 2001-316791 A | 11/2001 |
| JP | 2002-12959 A | 1/2002 |
| JP | 2002-180225 A | 6/2002 |
| JP | 2006-193791 A | 7/2006 |
| JP | 2010-70810 A | 4/2010 |
| JP | 2010-275634 A | 12/2010 |
| JP | 2015-214747 A | 12/2015 |
| WO | WO 2011/001662 A1 | 1/2011 |
| WO | WO-2011001662 A1 * | 1/2011 ............... C23C 2/06 |

OTHER PUBLICATIONS

Written Opinion of the International Searching Authority for PCT/JP2018/002595 (PCT/ISA/237) dated Apr. 3, 2018.

* cited by examiner

[Fig. 1]
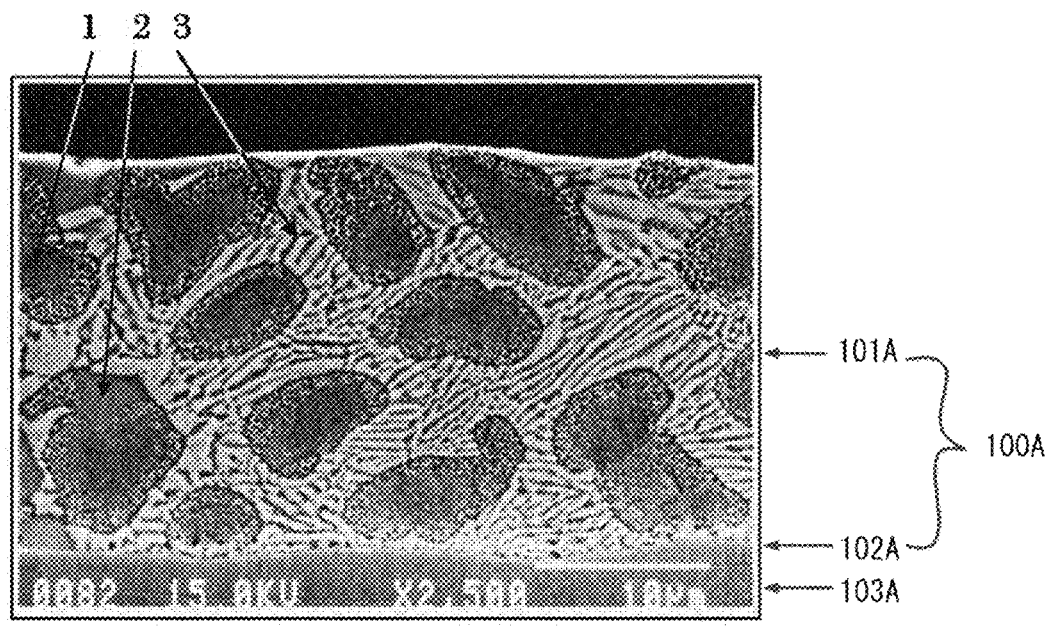
[Fig. 2]
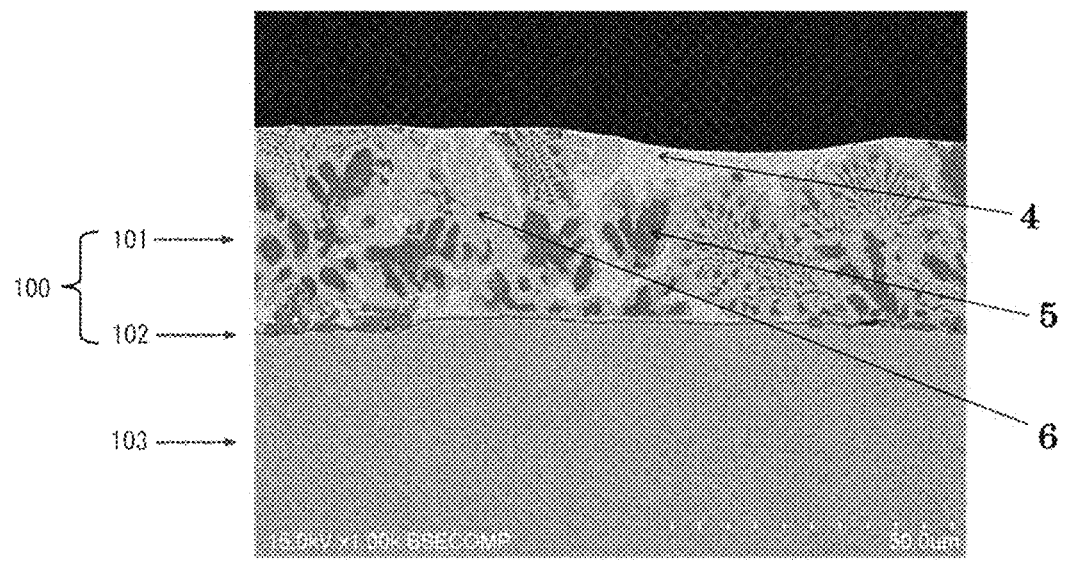

[Fig. 3]
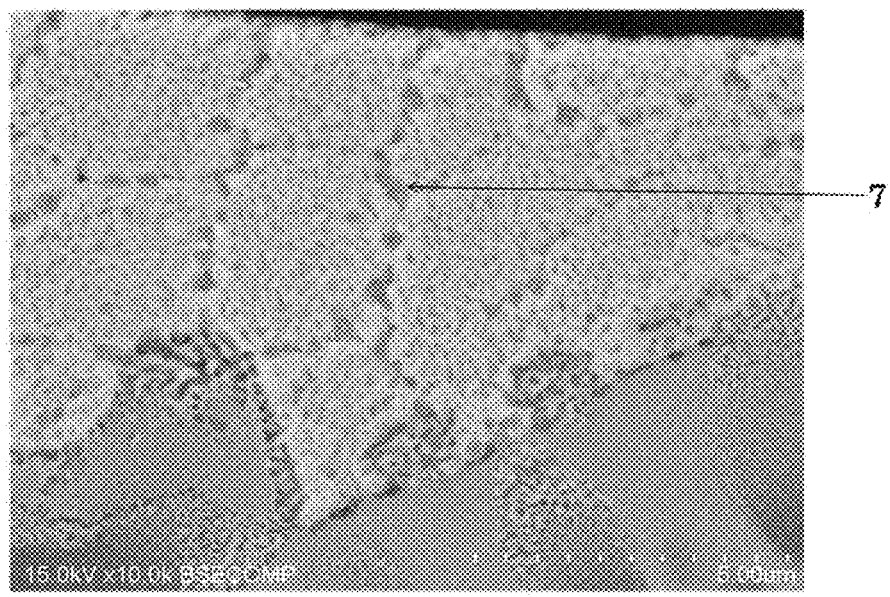
[Fig. 4]
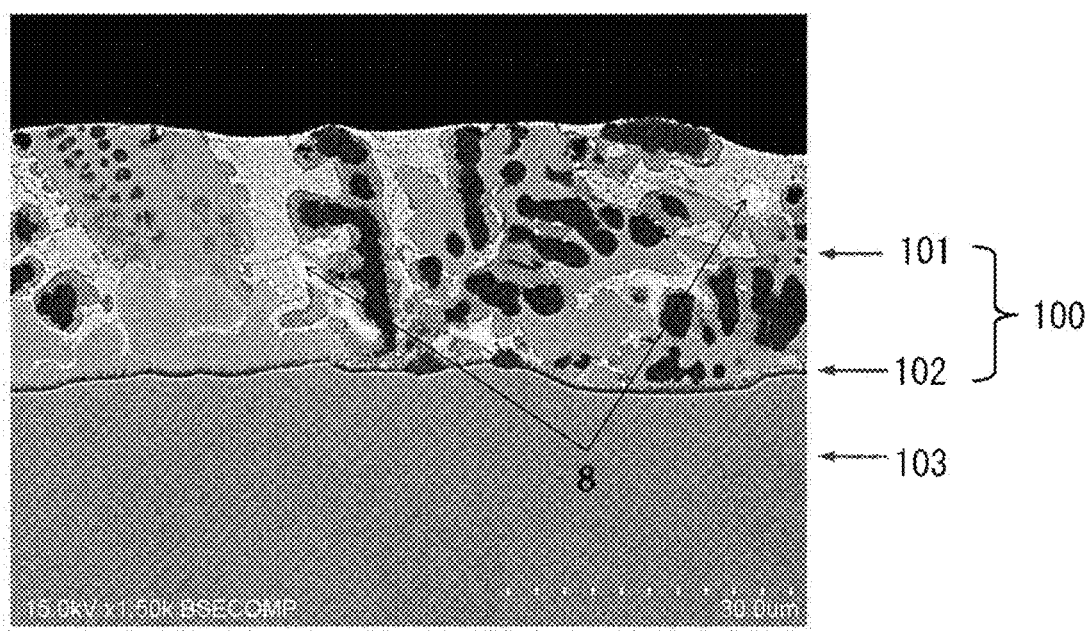

[Fig. 5]
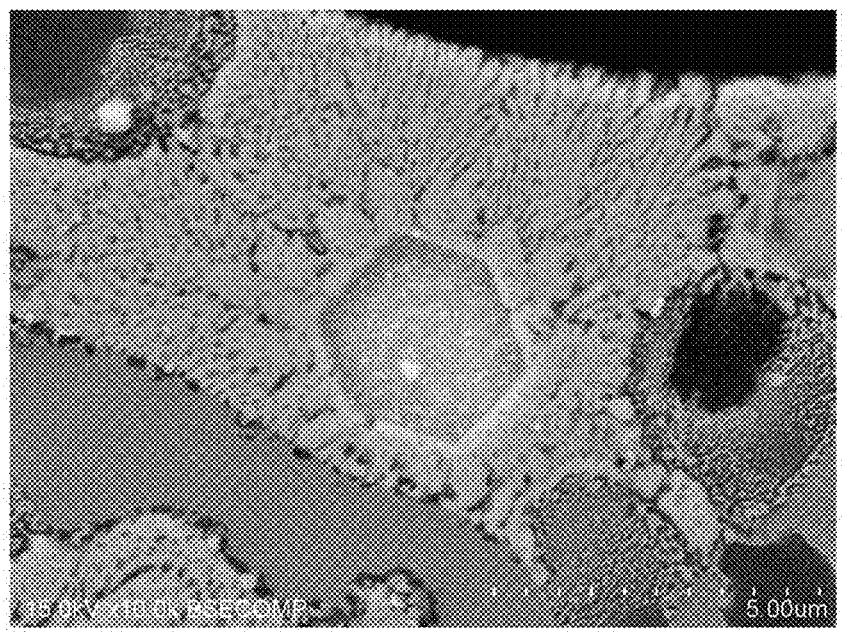
[Fig. 6]
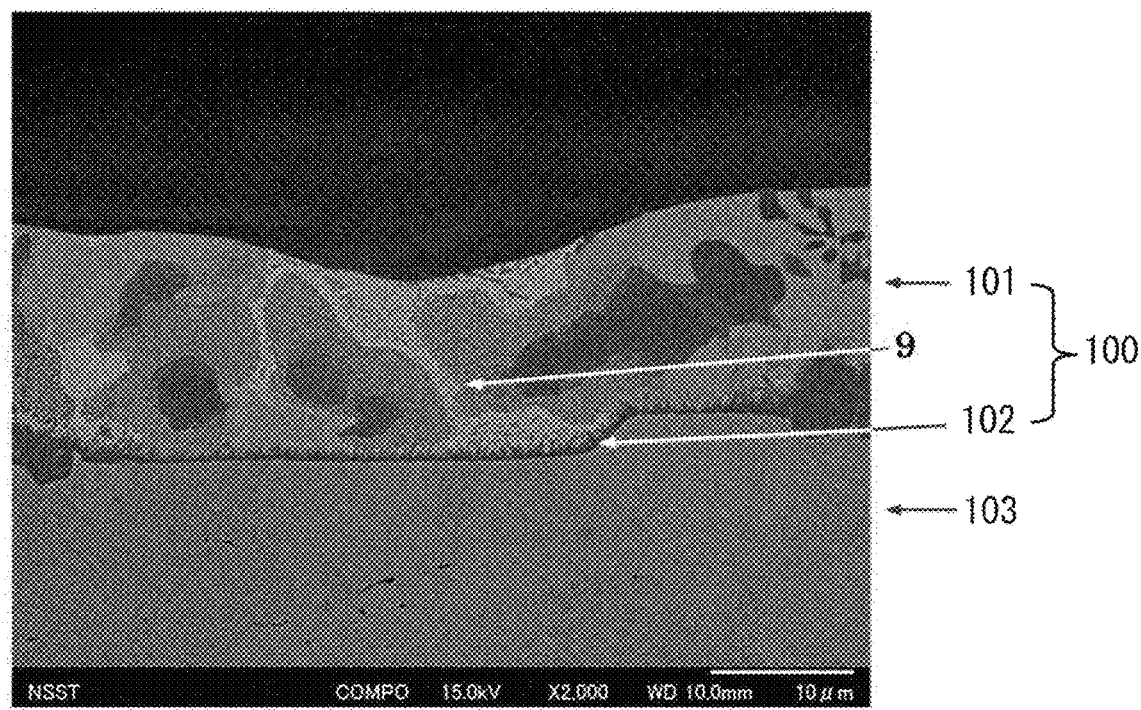

[Fig. 7]
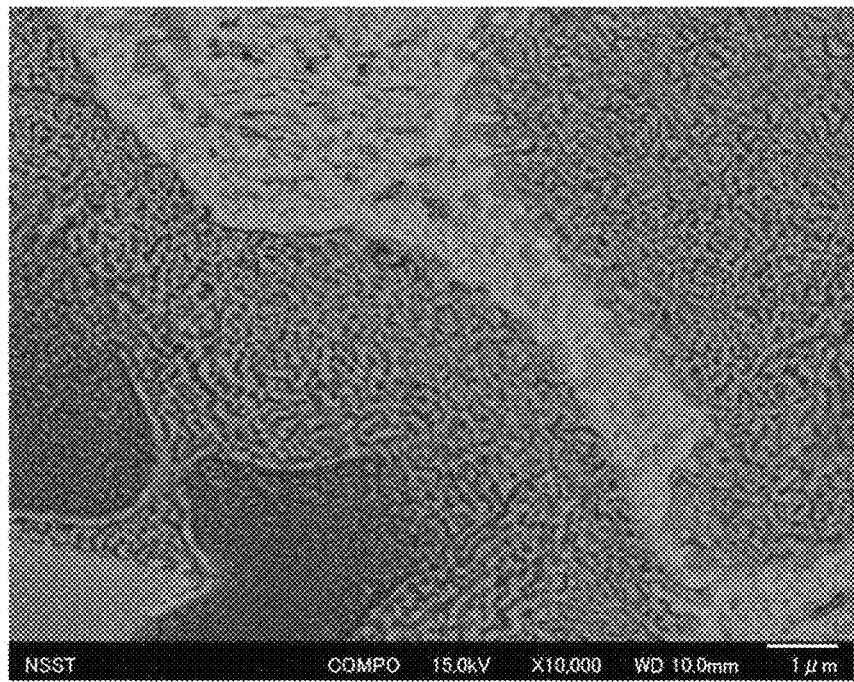
[Fig. 8]
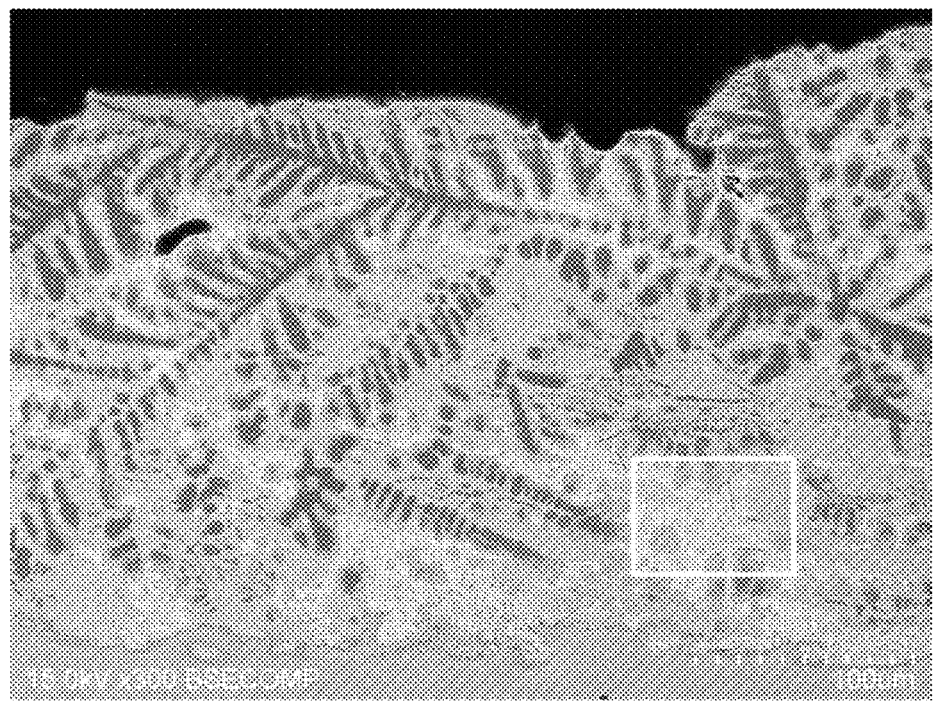

[Fig. 9]
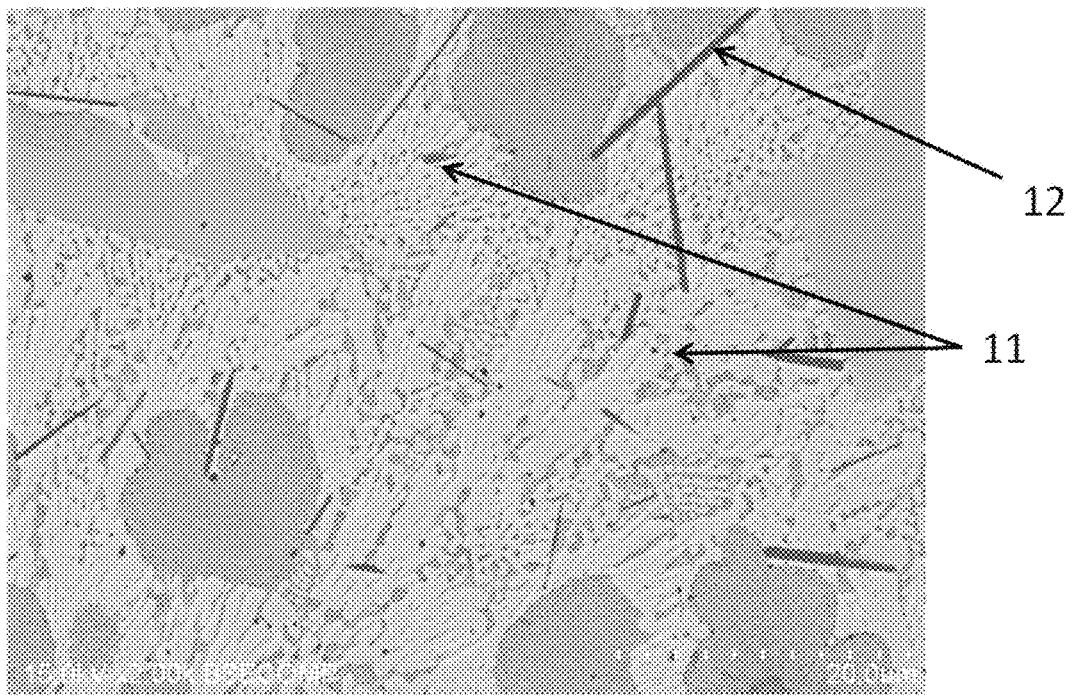
[Fig. 10]
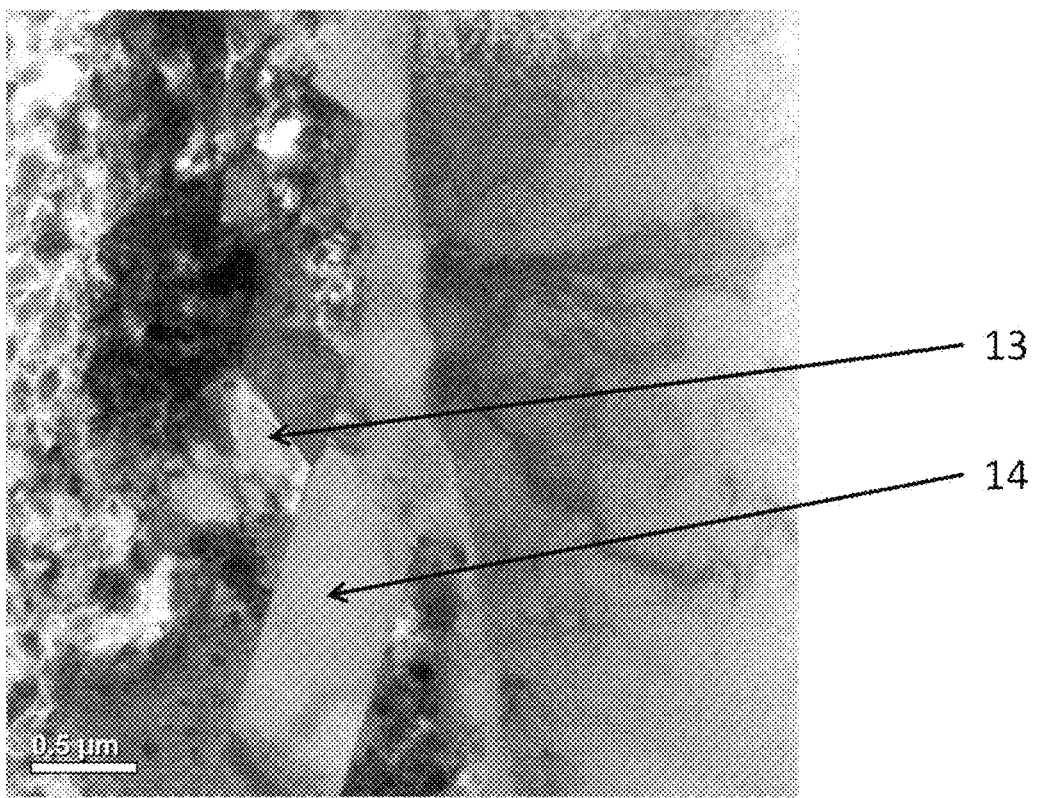

[Fig. 11A]
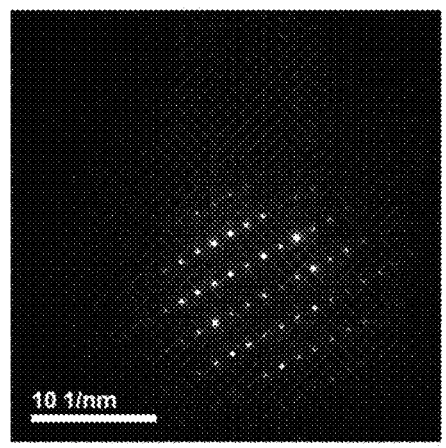
[0 1̄ 1]MgAlSi
[Fig. 11B]
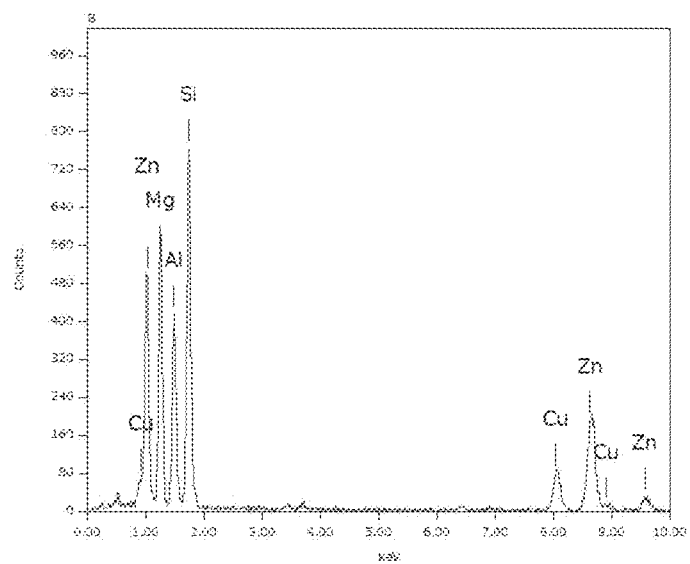

[Fig. 12A]
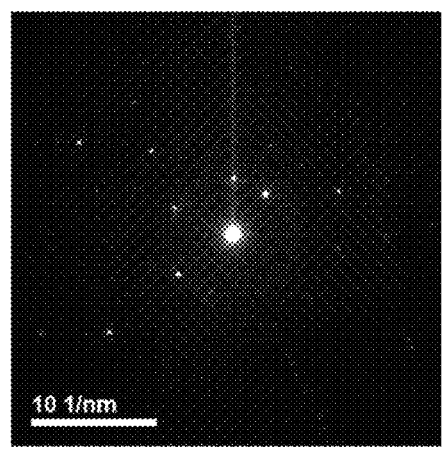
[Fig. 12B]
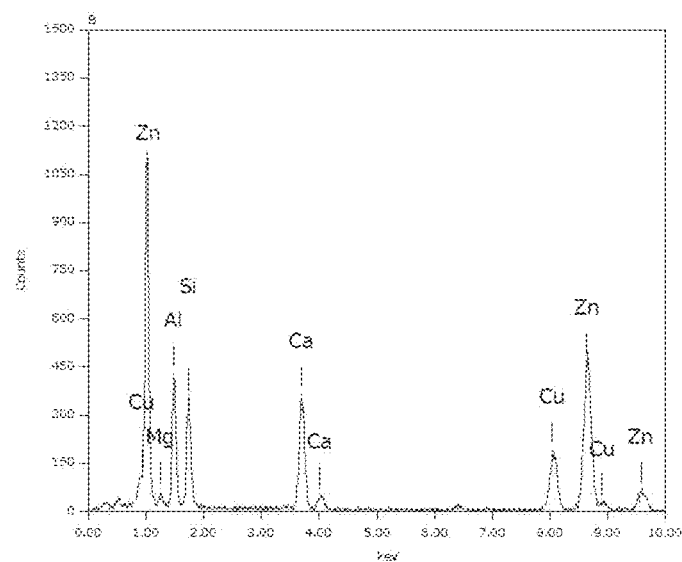

[Fig. 13]
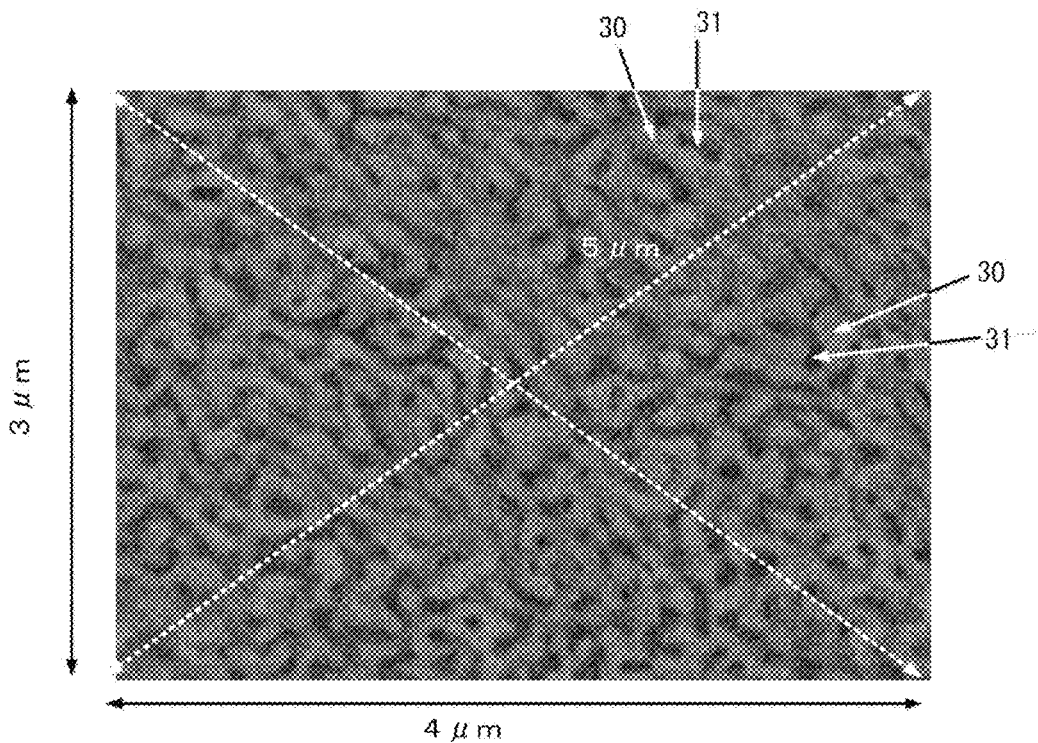
[Fig. 14]
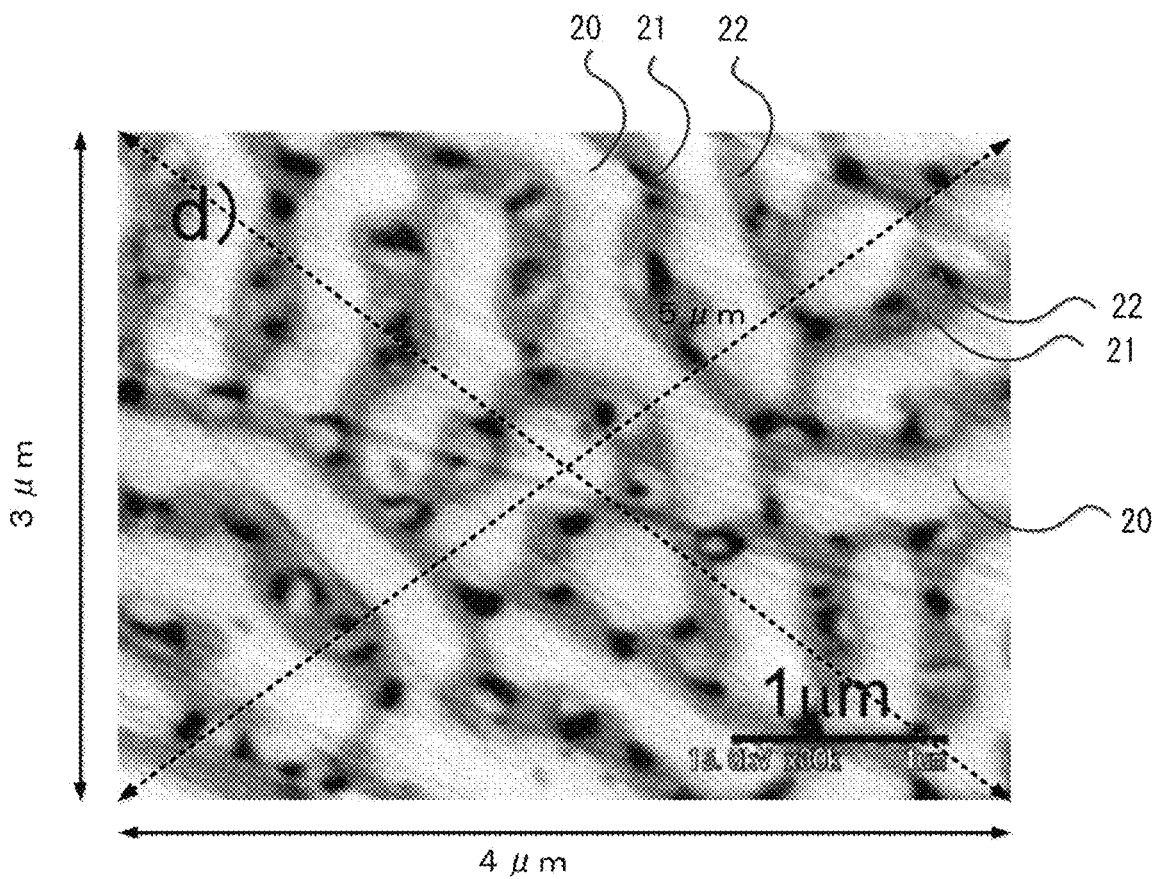

COATED STEEL PRODUCT

TECHNICAL FIELD

The present invention relates to a coated steel product.

BACKGROUND ART

A wide variety of coated steel products are used in the field of construction materials.

Many of them are Zn-coated steel products. From the long life needs of construction materials, research on high corrosion resistance of Zn-coated steel products has been conducted for a long time, and various coated steel products have been developed. The first high corrosion resistance coated steel product for construction materials is a Zn-5% Al-coated steel product (Galfan-coated (galvanized) steel product) in which Al is added to a Zn-based coating layer to improve the corrosion resistance. It is a well-known fact that Al is added to a coating layer to improve the corrosion resistance. An Al phase is formed in the coating layer (specifically an Zn phase) with the addition of 5% Al, and the corrosion resistance is improved. Basically, a Zn-55% Al-1.6% Si coated steel product (galvalume steel product) is also a coated steel product with improved corrosion resistance for the same reason.

Therefore, when the Al concentration is improved, basically, the plain surface corrosion resistance is improved. However, when the Al concentration is improved, it causes reduction of sacrificial corrosion protection ability.

Here, the attractive feature of a Zn-based coated steel product is the sacrificial corrosion protection effect on a base metal (steel product) In other words, in a cut end surface of a coated steel product, a cracked portion of a coating layer generated during processing, and an exposed portion of a base metal (steel product) which appears due to exfoliation of the coating layer, the coating layer is eluted in the vicinity of such portion before corrosion of the base metal (steel product), and the eluted coating component forms a protective film. This makes it possible to prevent red rust from the base metal (steel product) to some extent.

In general, a lower Al concentration and a higher Zn concentration are preferable for such effects. Therefore, a coated steel product having high corrosion resistance in which the Al concentration is suppressed at, for example, a relatively low concentration of from 5% to 25% has been available for practical use in recent years. In particular, a coated steel product, in which the Al concentration is suppressed at a low level and Mg is contained at about from 1% to 3%, has plain surface corrosion resistance and sacrificial corrosion protection ability superior to those of a Galfan-coated steel product. Therefore, such a coated steel product has become a market trend and is widely known in the market at present. For example, coated steel sheets disclosed in Patent Documents 1 and 2 have also been developed as coated steel products containing certain amounts of Al and Mg and achieving high corrosion resistance.

In the field of construction materials where long life is always desired, there is a demand to further improve plain surface corrosion resistance and sacrificial corrosion protection ability. A coated steel product having both properties is most preferable. In recent years, a favorable compatibility between both properties has been achieved by alloying a coating layer mainly containing Al and Mg. However, usually, alloying a coating layer causes an increase in the hardness of the coating layer, and processability is also significantly impaired as compared to the coating layer of a pure metal. Therefore, a coated steel product must have processability. Moreover, since the coating layer hardness is associated with wear resistance, it is preferable to make effective use of the properties obtained by alloying a coating layer.

However, these properties such as plain surface corrosion resistance, sacrificial corrosion protection ability, processability, and wear resistance are all difficult to be compatible with each other because, for example, once any of such properties is improved, the other properties deteriorate.

For example, as described above, it is particularly important to select the Al concentration from the viewpoint of plain surface corrosion resistance. An Al-coated steel sheet as described in Patent Document 3 and an Al—Zn-based coated steel sheet as described in Patent Document 4 are available as a coated steel product which is mainly composed of Al and treated by means of imparting sacrificial corrosion protection ability. Meanwhile, as a coated steel product in which the Al concentration is suppressed at a relatively low level of about 5% and plain surface corrosion resistance is imparted to the coating layer, coated steel sheets are disclosed in Patent Documents 5, 6, 7, and 8.

Patent Document 1: Japanese Patent Application Laid-Open (JP-A) No. 2006-193791
Patent Document 2: WO2011/001662
Patent Document 3: JP-A No. 2002-012959
Patent Document 4: JP-A No. 2015-214747
Patent Document 5: JP-A No. 2001-115273
Patent Document 6: JP-A No. 2001-316791
Patent Document 7: JP-A No. 2010-275634
Patent Document 8: JP-A No. 2001-64759

SUMMARY OF INVENTION

Problems to be Solved by the Invention

However, in the coated steel products described in Patent Document 3 and 4, since the coating layer mainly consists of Al, the amount of Zn is limited, and the sacrificial corrosion protection effect and the duration of the effect are significantly reduced. Therefore, it cannot be said that a favorable compatibility between plain surface corrosion resistance and sacrificial corrosion protection ability can be achieved while plain surface corrosion resistance is relatively dominant. As a result, a coated steel product that can replace the galvalume steel product has not yet spread in the market.

In addition, the coated steel products described in Patent Documents 5 to 8 also fail to allow the latest developed Zn—Al (5% or more)-Mg (1% or more)-based coated steel product to have plain surface corrosion resistance and additional sacrificial corrosion protection ability as comparable to Al-based coated steel products. Therefore, it cannot be said that attractive properties are given to the existing Zn—Al—Mg-based coated steel products.

In addition, it is hard to say that any of coated steel products achieves both processability and wear resistance.

An object in one aspect of the present disclosure is to provide a coated steel product which achieves the improvement of plain surface corrosion resistance and sacrificial corrosion protection ability and a favorable compatibility between processability and wear resistance.

Means for Solving the Problems

The means for solving the problems includes the following aspects.

<1> A coated steel product having a steel product and a coating layer including a Zn—Al—Mg alloy layer disposed on a surface of the steel product, wherein the Zn—Al—Mg alloy layer has a Zn phase, and the Zn phase includes a Mg—Sn intermetallic compound phase, wherein the coating layer consists of, in terms of percent (%) by mass Zn: more than 65.0%,
Al: from more than 5.0% to less than 25.0%,
Mg: from more than 3.0% to less than 12.5%,
Sn: from 0.1% to 20.0%,
Bi: from 0% to less than 5.0%,
In: from 0% to less than 2.0%,
Ca: from 0% to 3.00%,
Y: from 0% to 0.5%,
La: from 0% to less than 0.5%,
Ce: from 0% to less than 0.5%,
Si: from 0% to less than 2.5%,
Cr: from 0% to less than 0.25%,
Ti: from 0% to less than 0.25%,
Ni: from 0% to less than 0.25%,
Co: from 0% to less than 0.25%,
V: from 0% to less than 0.25%,
Nb: from 0% to less than 0.25%,
Cu: from 0% to less than 0.25%,
Mn: from 0% to less than 0.25%,
Fe: from 0% to 5.0%,
Sr: from 0% to less than 0.5%,
Sb: from 0% to less than 0.5%,
Pb: from 0% to less than 0.5%,
B: from 0% to less than 0.5%, and
impurities, and wherein the coating layer has a chemical composition that satisfies the following Formulas 1 to 5:

$$Bi+In<Sn \quad \text{Formula 1:}$$

$$Y+La+Ce \leq Ca \quad \text{Formula 2:}$$

$$Si<Sn \quad \text{Formula 3:}$$

$$0 \leq Cr+Ti+Ni+Co+V+Nb+Cu+Mn<0.25 \quad \text{Formula 4:}$$

$$0 \leq Sr+Sb+Pb+B<0.5 \quad \text{Formula 5:}$$

wherein, in Formulas 1 to 5, each element symbol represents a content of a corresponding element in terms of percent (%) by mass.

<2> The coated steel product according to <1>, wherein the Mg—Sn intermetallic compound phase has an average grain size of less than 1 µm.

<3> The coated steel product according to <1> or <2>, wherein, in a cross-section of the Zn—Al—Mg alloy layer, the Mg—Sn intermetallic compound phase having a grain size of less than 1 µm has an area fraction of from 10% to 50% with respect to the Zn phase including the Mg—Sn intermetallic compound phase.

<4> The coated steel product according to any one of <1> to <3>, wherein, in a cross-section of the Zn—Al—Mg alloy layer, the Zn phase including the Mg—Sn intermetallic compound phase is present with an area fraction of 3% or more with respect to the cross-section of the Zn—Al—Mg alloy layer.

<5> The coated steel product according to any one of <1> to <4>, wherein based on an X-ray diffraction image of a surface of the coating layer, the image being measured using a Cu-Kα ray with an X-ray output at 40 kV and 150 mA, a specific intensity I (Mg—Sn intermetallic compound phase)={I (22.8° intensity (cps))+I (23.3° intensity (cps))+I (24.2° intensity (cps))}/3×I (background intensity at 20° (cps)) is 1.5 or more.

<6> The coated steel product according to any one of <1> to <5>, wherein the coating layer has a Ca content of from 0.05% to 3.00% by mass, and the Zn phase contains, as the Mg—Sn intermetallic compound phase, a MgCaSn phase and a $Mg_9Sn_5$ phase, wherein, based on an X-ray diffraction image of a surface of the coating layer, the image being measured using a Cu-Kα ray with an X-ray output at 40 kV and 150 mA, a specific intensity I ($MgCaSn+Mg_9Sn_5$)={I (22.8° intensity (cps))+I (26.3° intensity (cps))}/I (23.3° intensity (cps)) is less than 0.3, and I (23.3° intensity (cps)) is 500 cps or more.

<7> The coated steel product according to <5>, wherein the coating layer has a Mg content of from more than 4.0% to less than 12.5% by mass, a Ca content of from 0.05% to 3.00% by mass, and an Si content of from 0.01% to 2.5% by mass, wherein, based on the X-ray diffraction image of the surface of the coating layer, the image being measured using a Cu-Kα ray with an X-ray output at 40 kV and 150 mA, a diffraction peak having a strongest intensity among diffraction peaks appearing at from 23.0° to 23.46° appears between 23.36° to 23.46°.

<8> The coated steel product according to any one of <1> to <7>, wherein the coating layer has a Ca content of from 0.05% to 3.00% by mass and an Si content of from 0.01% to 2.5% by mass, wherein the Zn—Al—Mg alloy layer has at least one selected from the group consisting of a Ca—Al—Si intermetallic compound phase having an average grain size of 1 µm or more and a Mg—Al—Si intermetallic compound phase having an average grain size of 1 µm or more.

<9> The coated steel product according to any one of <1> to <8>, wherein the coating layer has a Ca content of 0.05% to 3.00% by mass, wherein, in a cross-section of the Zn—Al—Mg alloy layer, a Ca—Zn—Al intermetallic compound phase having a grain size of 1 µm or more is present with an area fraction of 5% or more with respect to the cross-section of the Zn—Al—Mg alloy layer.

<10> The coated steel product according to any one of <1> to <9>, wherein the coating layer has an Sn content of from 3.00% to 20.00% by mass, and, the following Formula is satisfied:

0.05<Sn/Zn, wherein each of Sn and Zn represents the content of the corresponding element, wherein, in a cross-section of the Zn—Al—Mg alloy layer, a Mg—Sn intermetallic compound phase having a grain size of 1 µm or more is present with an area fraction of 3% or more with respect to the cross-section of the Zn—Al—Mg alloy layer.

<11> The coated steel product according to any one of <1> to <10>, wherein, in a cross-section of the Zn—Al—Mg alloy layer, a eutectoid structure composed of a Zn phase and an Al phase, and having a lamellar spacing of less than 300 nm, is present with an area fraction of 10% or more with respect to the cross-section of the Zn—Al—Mg alloy layer.

<12> The coated steel product according to any one of <1> to <11>, wherein a Zn—Al-$MgZn_2$ ternary eutectic structure has an area fraction of from 0% to 5% in a cross-section of the Zn—Al—Mg alloy layer.

<13> The coated steel product according to any one of <1> to <9>, wherein the Sn content of the coating layer is from 0.10% to less than 3.00%.

<14> The coated steel product according to any one of <1> to <13>, wherein the coating layer has an Al—Fe alloy layer between the steel product and the Zn—Al—Mg alloy layer.

Effect of the Invention

An object in one aspect of the disclosure is to provide a coated steel product which achieves the improvement of plain surface corrosion resistance and sacrificial corrosion protection ability and a favorable compatibility between processability and wear resistance.

BRIEF DESCRIPTION OF DRAWINGS

FIG. 1 is an example of the ternary eutectic structure in an existing Zn—Al—Mg-based coating layer (Zn-11% Al-3% Mg-0.2% Si).

FIG. 2 is an SEM reflection electron image showing an example of the coating layer according to the disclosure.

FIG. 3 is an SEM reflection electron image showing a magnified image of the Zn phase portion in FIG. 2.

FIG. 4 is an SEM reflection electron image showing another example of the coating layer according to the disclosure.

FIG. 5 is an SEM reflection electron image showing a magnified image of the vicinity of the massive Mg—Sn intermetallic compound phase in FIG. 4.

FIG. 6 is an SEM reflection electron image showing another example of the coating layer of the disclosure.

FIG. 7 is an SEM reflection electron image showing a magnified image of the eutectoid structure composed of the Zn phase and the Al phase, and having a lamellar spacing of less than 300 nm (fine Zn—Al eutectoid structure) in FIG. 6.

FIG. 8 is an SEM reflection electron image showing another example of the coating layer according to the invention.

FIG. 9 is a magnified image (SEM reflection electron image) of the coating structure in the frame in FIG. 8.

FIG. 10 is a magnified image (TEM image) of the vicinity of the Fe interface of the coating layer shown in FIG. 8.

FIG. 11A is an electron beam diffraction image of the amorphous intermetallic compound phase (13) in FIG. 10.

FIG. 11B is an EDS analysis spectrum of the amorphous intermetallic compound phase (13) in FIG. 10.

FIG. 12A is an electron beam diffraction image of the needle-like intermetallic compound phase (14) in FIG. 10.

FIG. 12B is an EDS analysis spectrum of the needle-like intermetallic compound phase (14) in FIG. 10.

FIG. 13 is an SEM reflection electron image for explaining a method of determining a eutectoid structure composed of a Zn phase and an Al phase, and having a lamellar spacing of less than 300 nm (fine Zn—Al eutectoid structure) and measuring an area fraction thereof.

FIG. 14 is an SEM reflection electron image for explaining a method of determining a Zn—Al—$MgZn_2$ ternary eutectic structure and measuring an area fraction thereof.

DESCRIPTION OF EMBODIMENTS

Hereinafter, one example of the disclosure will be described.

In the disclosure, the "%" indication of the content of each element of a chemical composition means "% by mass."

In addition, a numerical range expressed using "to" means a range that includes the numerical values before and after "to" as the lower limit and the upper limit.

A numerical range when the numerical value described before or after "to" is added with "over" or "less than" means a range which does not include the numerical value as the lower limit or the upper limit.

The content of an element of a chemical composition may be expressed as the element amount (for example, Zn amount or Mg amount) or element concentration (for example, Zn concentration or Mg concentration).

The term "step" includes not only an independent step but also a step even in a case in which the step cannot be clearly distinguished from other steps, as long as the intended purpose of the step is achieved.

The term "plain surface corrosion resistance" refers to the corrosion resistance property of a coating layer (specifically a Zn—Al—Mg alloy layer) itself.

The term "sacrificial corrosion protection ability" refers to the property of suppressing corrosion of an exposed portion of a base metal (steel product) (for example, a cut end surface of a coated steel product, a processing-induced crack in a coating layer, and a portion of a base metal (steel product) exposed due to exfoliation of a coating layer).

The coated steel product of the disclosure is a melt-coated steel sheet having a steel product and a coating layer including a Zn—Al—Mg alloy layer disposed on the surface of the steel product, in which the Zn—Al—Mg alloy layer has a Zn phase, the Zn phase contains a Mg—Sn intermetallic compound phase, and the coating layer has a given chemical composition.

The coated steel product of the disclosure having the above-described configuration achieves the improvement of plain surface corrosion resistance and sacrificial corrosion protection ability and a favorable compatibility between processability and wear resistance. The coated steel product of the disclosure was found based on the following findings.

The inventors obtained the following findings on various properties of the coating layer of a Zn—Al—Mg-based coated steel product.

In order to obtain plain surface corrosion resistance at a level equal to or higher than that of the most excellent corrosion-resistant Zn—Al—Mg-based coated steel sheet in recent years, the Al concentration needs to be at least more than 5% and the Mg concentration needs to be at least more than 3%. A favorable compatibility between plain surface corrosion resistance and sacrificial corrosion protection ability cannot be achieved for the existing Zn—Al—Mg-based coated steel sheets below these concentrations.

Meanwhile, the sacrificial corrosion protection ability can be imparted to a coating layer by allowing the coating layer to contain a certain amount of Sn to causing a change in the constitutional phase of the coating layer (specifically, the Zn—Al—Mg alloy layer), in addition to controlling the Al concentration and the Mg concentration. Specifically, sacrificial corrosion protection ability can be exerted at a level which could not be achieved by conventional molten Zn-based coated steel products by causing a Mg—Sn intermetallic compound phase to be deposited mainly in a Zn phase formed in the Zn—Al—Mg alloy layer.

Once a Mg—Sn intermetallic compound phase is contained in a Zn phase, the hardness of the Zn phase increases without deterioration of processability. Moreover, excellent wear resistance is also achieved because processability at a level equivalent to that of the conventional Zn—Al—Mg-based coated steel products is maintained by appropriately regulating the concentrations of Zn, Al, Mg, and Sn while the chemical composition of the coating layer is a high alloy composition, and the coating layer hardness is maintained at a high level by realizing the high alloy composition as the chemical composition of the coating layer.

Accordingly, it has been found that the coated steel sheet according to the disclosure can be a coated steel product which achieves the improvement of plain surface corrosion resistance and sacrificial corrosion protection ability and a favorable compatibility between processability and wear resistance.

In particular, since the coated steel product of the disclosure is excellent in sacrificial corrosion protection ability, cut end surface corrosion resistance is improved.

Here, the Mg—Sn intermetallic compound phase (hereinafter also referred to as "fine MCSB phase" for convenience) encompasses intermetallic compound phases corresponding to the following (1) to (5). The Mg—Sn intermetallic compound phase may form a solid solution with an interstitial element such as Si.

(1) $Mg_2Sn$ phase
(2) $Mg_9Sn_5$ phase
(3) Substituted $Mg_2Sn$ phase and $Mg_9Sn_5$ phase ($Mg_2Sn$ phase and $Mg_9Sn_5$ phase as a substituted phase) in which Sn is partially substituted by at least one of Bi, In, Cr, Ti, Ni, Co, V, Nb, Cu, or Mn.
(4) Substituted $Mg_2Sn$ phase and $Mg_9Sn_5$ phase ($Mg_2Sn$ phase and $Mg_9Sn_5$ phase as a substituted phase) in which Mg is partially substituted by at least one of Ca, Y, La, or Ce
(5) Substituted $Mg_2Sn$ phase and $Mg_9Sn_5$ phase ($Mg_2Sn$ phase and $Mg_9Sn_5$ phase as a substituted phase) in which Mg is partially substituted by at least one of Ca, Y, La, or Ce, and Sn is partially substituted by at least one of Bi, In, Cr, Ti, Ni, Co, V, Nb, Cu, or Mn These substituted phases of $Mg_2Sn$ phase and $Mg_9Sn_5$ phase may be collectively referred to as "substituted phase of $Mg_2Sn$ phase."

Hereinafter, the coated steel product of the disclosure will be described in detail.

A steel product to be coated will be described.

The shape of the steel product is not particularly limited. Examples of the steel product include forming-processed steel products such as steel pipes, civil engineering construction materials (such as fence conduits, corrugated pipes, drainage ditch lids, sand protection plates, bolts, wire mesh, guard rails, and water blocking walls), home electric appliance members (such as housings of air conditioner outdoor units), automobile parts (such as undercarriage members) as well as steel sheets. For example, various plastic processing methods such as press processing, roll forming, and bending processing can be utilized for forming processing.

There are no particular limitations to materials for the steel product. For example, various steel products such as general steel, Ni-precoated steel, Al-killed steel, extremely low carbon steel, high carbon steel, various products of high intensity steel, and some products of high alloy steel (such as steel containing a strengthening element such as Ni or Cr) are available.

In addition, the steel product is not particularly limited in terms of conditions for the steel product production method, the steel sheet production method, or the like (such as the hot rolling method, pickling method, or cold rolling method).

The steel product may be a precoated steel product prepared by precoating.

Next, a coating layer will be described.

A coating layer includes a Zn—Al—Mg alloy layer. A coating layer may include an Al—Fe alloy layer, in addition to a Zn—Al—Mg alloy layer. An Al—Fe alloy layer is present between a steel product and a Zn—Al—Mg alloy layer.

In other words, the coating layer may have a single layer structure of a Zn—Al—Mg alloy layer or a layered structure including a Zn—Al—Mg alloy layer and an Al—Fe alloy layer. In the case of the layered structure, the Zn—Al—Mg alloy layer is desirably a layer that constitutes the surface of the coating layer.

Note that an oxide film of elements constituting the coating layer is formed with a thickness of about 50 nm on the surface of the coating layer. However, as the thickness is thin with respect to the thickness of the entire coating layer, the oxide film is considered not to constitute the main body of the coating layer.

Here, the thickness of the Zn—Al—Mg alloy layer is, for example, from 2 μm to 95 μm (preferably from 5 μm to 75 μm).

Meanwhile, the thickness of the entire coating layer is, for example, about 100 μm or less. As the thickness of the entire coating layer depends on the coating conditions, the upper limit and the lower limit of the thickness of the entire coating layer are not particularly limited. For example, the thickness of the entire coating layer is associated with the viscosity and specific gravity of a coating bath in an ordinary melt coating method. Furthermore, the coating weight is adjusted by the drawing speed of a steel sheet (coating base sheet) and the intensity of wiping. It is therefore considered that the lower limit of the thickness of the entire coating layer is about 2 μm.

Meanwhile, due to the weight and uniformity of a coating metal, a coating layer which can be produced by melt coating method has a thickness of about 95 μm.

The thickness of a coating layer can be freely determined depending on the drawing speed from a coating bath and wiping conditions, indicating that the formation of a coating layer having a thickness of from 2 to 95 μm is not particularly difficult in terms of production.

Next, an Al—Fe alloy layer will be described.

An Al—Fe alloy layer is formed on the surface of a steel product (specifically between a steel product and a Zn—Al—Mg alloy layer), and the $Al_5Fe$ phase is a layer of the main phase of the structure. An Al—Fe alloy layer is formed by atomic diffusion between a base metal (steel product) and a coating bath. In a case in which the melt coating method is used as a production method, an Al—Fe alloy layer is likely to be formed in a coating layer containing Al as an element. Since the coating bath contains Al at a certain concentration or more, an $Al_5Fe$ phase is formed as the most dominant phase. However, atomic diffusion takes time, and a portion near the base metal may have a high Fe concentration. Therefore, the Al—Fe alloy layer may partially contain small amounts of an AlFe phase, an $Al_3Fe$ phase, an $Al_5Fe_2$ phase, and the like. In addition, since Zn is also contained at a certain concentration in the coating bath, the Al—Fe alloy layer also contains a small amount of Zn.

Regarding corrosion resistance, there is no significant difference among an $Al_5Fe$ phase, an $Al_3Fe$ phase, an AlFe phase, and an $Al_5Fe_2$ phase. The term "corrosion resistance" used herein means corrosion resistance at a site that is not affected by welding. The thickness of the Al—Fe alloy layer in the coating layer is small, and the degree of corrosion resistance is lower than that of the Zn—Al—Mg alloy layer. Thus, there is no significant difference in corrosion resistance of the entire coating layer even when the ratio of these phases varies.

Here, in a case in which Si is contained in the coating layer, Si is particularly easily incorporated into the Al—Fe alloy layer, which may result in an Al—Fe—Si intermetallic compound phase. There is an AlFeSi phase as an intermetallic compound phase to be identified. For example, α-, β-, q1-, and q2-AlFeSi phases exist as isomers. Therefore, these AlFeSi phases may be detected in the Al—Fe alloy layer. The Al—Fe alloy layer containing these AlFeSi phases is also referred to as "Al—Fe—Si alloy layer."

The Al—Fe—Si alloy layer is smaller in thickness than the Zn—Al—Mg alloy layer and thus has only a small impact on corrosion resistance of the entire coating layer.

In addition, in a case in which various precoated steel products are used as a coating base material (such as a coating base sheet), the structure of the Al—Fe alloy layer may change depending on the precoating adhesive amount. Specifically, there are cases such as a case in which a pure metal layer used for precoating remains around the Al—Fe alloy layer, a case in which an intermetallic compound phase (for example, an $Al_3Ni$ phase) in which the components of an Zn—Al—Mg alloy layer and precoating components are bound to each other forms an alloy layer, a case in which an Al—Fe alloy layer containing elements replacing some of Al atoms and Fe atoms is formed, and a case in which an Al—Fe—Si alloy layer containing elements replacing some of Fe atoms and Si atoms is formed. In any case, these alloy layers are also smaller in thickness than the Zn—Al—Mg alloy layer and thus has only a small impact on corrosion resistance of the entire coating layer.

In other words, the Al—Fe alloy layer is a layer including alloy layers in the above-described various aspects, in addition to an alloy layer mainly composed of the $Al_5Fe$ phase.

The Al—Fe alloy layer has a thickness of, for example, from 0 µm to 5 µm (usually from 100 nm to 5 µm).

This means that the Al—Fe alloy layer is not necessarily formed. However, in general, when a coating layer is formed by the melt coating method with a coating composition as specified in the disclosure, an Al—Fe alloy layer having a thickness of 100 nm or more is formed between the steel product and the Zn—Al—Mg alloy layer. The lower limit of the thickness of the Al—Fe alloy layer is not particularly limited. It has been found that an Al—Fe alloy layer is inevitably formed when forming a melt coating layer containing Al. In addition, it is empirically determined that a thickness of around 100 nm is the thickness in a case in which the formation of an Al—Fe alloy layer is most suppressed, which is a thickness that ensures sufficient adhesion between a coating layer and a base metal (steel product). It is difficult to form an Al—Fe alloy layer thinner than 100 nm with the melt coating method because the Al concentration is always high unless special measures are taken. However, even in a case in which the Al—Fe alloy layer has a thickness of less than 100 nm or no Al—Fe alloy layer is formed, it would not have a large impact on coating performance.

Meanwhile, in a case in which the Al—Fe alloy layer has a thickness of 5 µm or more, there is lack of the Al component in an Zn—Al—Mg alloy layer to formed on the Al—Fe alloy layer, and the adhesion and processability of the coating layer tend to extremely deteriorate. Therefore, the thickness of the Al—Fe alloy layer is limited to 5 µm or less The Al—Fe alloy layer is also closely associated with the Al concentration and the Sn concentration. In general, as the Al concentration and the Sn concentration increase, the growth rate tends to increase.

The Al—Fe alloy layer is often composed mainly of an $Al_5Fe$ phase. Therefore, an example of the chemical composition of the Al—Fe alloy layer is a composition including Fe: from 25% to 35%, Al: from 65% to 75%, Zn: 5% or less, and balance: impurities.

Usually, the Zn—Al—Mg alloy layer is greater in thickness than the Al—Fe alloy layer. Therefore, the Al—Fe alloy layer as a coated steel sheet contributes to plain surface corrosion resistance to a smaller extent than the Zn—Al—Mg alloy layer. However, the Al—Fe alloy layer contains Al and Zn as corrosion-resistant elements at certain concentrations or more, as estimated from the component analysis results. Therefore, the Al—Fe alloy layer has certain levels of sacrificial corrosion protection ability and corrosion barrier effects on the base metal (steel product).

It is difficult to confirm to what extent a thin Al—Fe alloy layer alone contributes to corrosion resistance by quantitative determination. However, for example, in the case of a sufficiently thick Al—Fe alloy layer, it is possible to evaluate corrosion resistance of the Al—Fe alloy layer alone by carefully removing a Zn—Al—Mg alloy layer on the Al—Fe alloy layer by cutting from the surface of a coating layer using end milling or the like and conducting a corrosion test. An Al—Fe alloy layer contains an Al component and a small amount of a Zn component. In a case in which an Al—Fe alloy layer is present, red rust is formed as spots, which differs from a case in which a base metal (steel product) is exposed without an Al—Fe alloy layer and entirely covered with red rust.

In addition, when a cross-section of the coating layer which has reached a stage immediately before red rust formation on the base metal (steel product) is observed during the corrosion test, it can be confirmed that even though the Zn—Al—Mg alloy layer as the upper layer is eluted and rusted, the Al—Fe alloy layer is exclusively left to prevent corrosion of the base metal (steel product). This is because the Al—Fe alloy layer is electrochemically superior to the Zn—Al—Mg layer but inferior to the base metal (steel product). From these facts, it can be judged that the Al—Fe alloy layer also has a certain level of corrosion resistance.

From the viewpoint of corrosion, it is more preferable that the Al—Fe alloy layer is thicker. This is effective for delaying the time of red rust formation. However, since a thick Al—Fe alloy layer causes significant deterioration in coating processability, the thickness is preferably equal to or less than a certain thickness. An appropriate thickness is known from the viewpoint of processability. The Al—Fe alloy layer has a thickness of preferably 5 µm or less such that cracks generated from the Al—Fe alloy layer for coating during a V-bending test or the like and the amount of powdering are reduced. The thickness is more preferably 2 µm or less.

Next, a chemical composition of a coating layer will be described.

The component composition of a Zn—Al—Mg alloy layer contained in a coating layer is substantially maintained even in a case in which the component composition ratio of the coating bath corresponds to the Zn—Al—Mg alloy layer. In the melt coating method, a reaction for forming an Al—Fe alloy layer is completed in a coating bath. Therefore, usually, such an Al—Fe alloy layer formation causes only slight decreases in the Al and Zn components of a Zn—Al—Mg alloy layer.

In order to achieve the improvement of plain surface corrosion resistance and sacrificial corrosion protection ability and a favorable balance between processability and wear resistance, the chemical composition of the coating layer is determined as follows.

In particular, the coating layer is allowed to contain given amounts of Mg and Sn at a Zn concentration of more than 65.0% as in the chemical composition described below, thereby making it possible to remarkably improve the sacrificial corrosion protection ability of the Zn phase in the Zn—Al—Mg alloy layer and acquire high-level sacrificial corrosion protection ability and high-level plain surface corrosion resistance in the presence of Al. It is also possible to achieve processability and wear resistance.

Specifically, the chemical composition of the coating layer is a chemical composition consisting of
Zn: more than 65.0%,
Al: from more than 5.0% to less than 25.0%,
Mg: from more than 3.0% to less than 12.5%,
Sn: from 0.1% to 20.0%,
Bi: from 0% to less than 5.0%,
In: from 0% to less than 2.0%,
Ca: from 0% to 3.00%,
Y: from 0% to 0.5%,
La: from 0% to less than 0.5%,
Ce: from 0% to less than 0.5%,
Si: from 0% to less than 2.5%,
Cr: from 0% to less than 0.25%,
Ti: from 0% to less than 0.25%,
Ni: from 0% to less than 0.25%,
Co: from 0% to less than 0.25%,
V: from 0% to less than 0.25%,
Nb: from 0% to less than 0.25%,
Cu: from 0% to less than 0.25%,
Mn: from 0% to less than 0.25%,
Fe: from 0% to 5.0%,
Sr: from 0% to less than 0.5%,
Sb: from 0% to less than 0.5%,
Pb: from 0% to less than 0.5%,
B: from 0% to less than 0.5% in terms of percent (%) by mass and impurities.

Note that the chemical composition of the coating layer satisfies the following Formulas 1 to 5.

$$Bi+In<Sn \quad \text{Formula 1:}$$

$$Y+La+Ce \leq Ca \quad \text{Formula 2:}$$

$$Si<Sn \quad \text{Formula 3:}$$

$$0 \leq Cr+Ti+Ni+Co+V+Nb+Cu+Mn<0.25 \quad \text{Formula 4:}$$

$$0 \leq Sr+Sb+Pb+B<0.5 \quad \text{Formula 5:}$$

In Formulas 1 to 5, each element symbol represents the content of the corresponding element in terms of percent (%) by mass.

In the chemical composition of the coating layer, Bi, In, Ca, Y, La, Ce, Si, Cr, Ti, Ni, Co, V, Nb, Cu, Mn, Fe, Sr, Sb, Pb, and B are optional components. In other words, these elements are not necessarily included in the coating layer. In a case in which these optional components are included, the content of each optional element is preferably within the corresponding range described below.

Here, the chemical composition of the coating layer is the average chemical composition of the entire coating layer (in a case in which the coating layer has a single layer structure of a Zn—Al—Mg alloy layer, a case in which the coating layer has the average chemical composition of a Zn—Al—Mg alloy layer and the coating layer has a layered structure of an Al—Fe alloy layer and a Zn—Al—Mg alloy layer, or a case in which the coating layer has the average chemical composition of an Al—Fe alloy layer and a Zn—Al—Mg alloy layer combined together).

Usually, in the melt coating method, the chemical composition of the Zn—Al—Mg alloy layer is substantially the same as the coating bath because the coating layer formation reaction is completed in the coating bath in almost every case. In addition, in the melt coating method, the Al—Fe alloy layer is instantaneously formed and grown immediately after being immersed in the coating bath. The Al—Fe alloy layer formation reaction is completed in the coating bath, and the Al—Fe alloy layer is often sufficiently smaller in thickness than the Zn—Al—Mg alloy layer.

Therefore, unless special heat treatment such as heating alloy treatment is conducted, the average chemical composition of the entire coating layer is substantially equal to the chemical composition of the Zn—Al—Mg alloy layer, and thus, the components of the Al—Fe alloy layer can be ignored.

Hereinafter, each element of the coating layer will be described below.

<Zn: more than 65.0%>

Zn is an element necessary for achieving sacrificial corrosion protection ability as well as plain surface corrosion resistance. Regarding the Zn concentration in consideration of the atomic composition ratio, as the coating layer is composed together with low-specific-gravity elements such as Al and Mg, Zn needs to have the largest proportion in the atomic composition ratio.

When the Zn concentration is 65.0% or less, an Al phase is mainly formed in the Zn—Al—Mg alloy layer, resulting in lack of a Zn phase for ensuring sacrificial corrosion protection ability. In addition, when an Al phase increases, since Al tends to form a solid solution with various elements as compared to Zn, types of constituent phases of the coating layer vary.

Besides, a desired distribution structure of intermetallic compound phases cannot be maintained.

Therefore, the Zn concentration is set to more than 65.0%. The Zn concentration is preferably 70% or more. The upper limit of the Zn concentration is the concentration of elements other than Zn and balance other than impurities.

<Al: from more than 5.0% to less than 25.0%>

Al is an element necessary for allowing the coating layer (particularly the Zn—Al—Mg layer) to contain elements other than Zn. It is originally difficult for the Zn coating layer (Zn layer) to contain other elements. For example, elements such as Mg, Ca, and Si cannot be added at high concentrations. However, it is possible to produce a Zn—Al—Mg alloy layer containing these elements by allowing the Zn coating layer (Zn layer) to contain Al.

Al forms an Al phase that imparts plain surface corrosion resistance and plastic deformability, and also contributes to the formation of an Al—Fe alloy layer. Al is an essential element also for ensuring adhesiveness.

When the Al concentration is 5.0% or less, it tends to be difficult for a coating layer to contain alloy elements that impart properties, in addition to Mg and Ca. In addition, a low Al density results in the formation of an Al phase in a large phase amount with respect to the mass-based content as compared to Zn. However, when the Al concentration is 5.0% or less, the Zn—Al—Mg alloy layer tends to mainly consist of a Zn phase. This may lead to a significant reduction in plain surface corrosion resistance. From the viewpoint of corrosion resistance, it is not preferable that a Zn phase becomes the first phase of the Zn—Al—Mg alloy layer. In a case in which a Zn phase becomes the first phase as described later, a Zn—Al—MgZn$_2$ ternary eutectic structure having poor plain surface corrosion resistance and processability is likely to be formed, resulting in a tendency to deteriorate plain surface corrosion resistance and processability.

In addition, when the Al concentration is 5.0% or less, a $MgZn_2$ phase having poor plastic deformability tends to grow coarsely as a primary crystal in the Zn—Al—Mg alloy layer, and the processability of the coating layer tends to significantly deteriorate.

Therefore, the lower limit of the Al concentration is set to more than 5.0% (preferably 10.0% or more).

Meanwhile, when the Al concentration increases, the proportion of an Al phase rapidly increases in the Zn—Al—Mg alloy layer, and the proportions of a Zn phase and a $MgZn_2$ phase necessary for imparting sacrificial corrosion protection ability decrease. As a result, plain surface corrosion resistance and processability are improved.

However, the resulting configuration is close to a configuration with lack of sacrificial corrosion protection ability. Further, when the Al concentration excessively increases, a wide variety of elements are incorporated into an Al phase as described above, which does not lead to the formation of a Zn phase including a fine MCSB phase. In a case in which a coating layer is formed by the melt coating method, the thickness of an Al—Fe alloy layer tends to increase. As a result, the Al phase contains large amounts of Mg and Zn, resulting in the formation of an Al phase having very poor corrosion resistance and plastic deformability. The formation of such an Al phase is not preferable from the viewpoint of ensuring processability.

Therefore, the upper limit of the Al concentration is set to less than 25.0% (preferably 23.0% or less).

<Mg: from more than 3.0% to less than 12.5%>

Mg is an element necessary for imparting sacrificial corrosion protection ability. Mg is an element also necessary for allowing a fine MCSB phase to be formed in a Zn phase. Usually, when Mg is contained in the Zn—Al—Mg alloy layer, a $MgZn_2$ phase having sacrificial corrosion protection ability is formed. However, the sacrificial corrosion protection ability of the $MgZn_2$ phase is inferior to that of the fine MCSB phase, and the $MgZn_2$ phase is a very fragile intermetallic compound phase. Therefore, the amount of $MgZn_2$ phase is preferably small.

When the Mg concentration is 3.0% or less, it is impossible to form the intermetallic compound phase (including the fine MCSB phase and the $MgZn_2$ phase) necessary for imparting plain surface corrosion resistance and sacrificial corrosion protection ability in a sufficient amount. In addition, as the amount of the Zn phase increases, the Zn phase becomes the first phase and the proportion of the Zn—Al—$MgZn_2$ ternary eutectic structure increases, which is not preferable in view of processability and corrosion resistance.

Therefore, the lower limit of the Mg concentration is set to more than 3.0%.

Considering the amount of the fine MCSB phase formed, it is preferable that the Mg concentration is sufficiently high, and Mg is contained at a concentration one-third (⅓) or more the Sn concentration based on specific gravity calculation. In addition, from the viewpoints of plain surface corrosion resistance and sacrificial corrosion protection ability, it is preferable that Mg is contained at a concentration one-third (⅓) or more the Sn concentration. Therefore, the lower limit of the Mg concentration is preferably more than 5.0%.

Meanwhile, when the Mg concentration is 12.5% or more, the amount of the $MgZn_2$ phase rapidly increases, resulting in loss of plastic deformability of the Zn—Al—Mg alloy layer and deterioration of processability.

Therefore, the upper limit of the Mg concentration is set to less than 12.5% (preferably 10.0% or less).

<Sn: from 0.1% to 20.0%, Bi: from 0% to less than 5.0%, In: from 0% to less than 2.0%, provided that Bi+In<Sn>

Sn is an element which is included in a Zn phase and is necessary for forming a fine MCSB phase that imparts high-level sacrificial corrosion protection ability.

Here, Sn, Bi, and In do not form an intermetallic compound phase together with Al and Zn in a coating bath, and always bind to Mg so as to form an intermetallic compound phase. Specifically, in a case in which Sn, Bi, and In are separately contained in a coating bath, compounds such as $Mg_2Sn$, $Mg_9Sn_5$, $Mg_3Bi_2$, and $Mg_3In$ are formed, respectively.

When Sn, Bi, and In are contained at 0.10% or more, these intermetallic compound phases are formed. Among these intermetallic compound phases, $Mg_2Sn$ is most excellent considering the fact that $Mg_2Sn$ has plain surface corrosion resistance and sacrificial corrosion protection ability, and it is easily incorporated in a Zn phase rich in plastic deformability which is soft enough to process. $Mg_3Bi_2$ and $Mg_3In$ are relatively inferior to $Mg_2Sn$ in terms of a balance among properties such as plain surface corrosion resistance, sacrificial corrosion protection ability, and processability.

Therefore, for the formation of at least $Mg_2Sn$ as a fine MCSB phase, Sn is an essential element and the lower limit of the Sn concentration is set to 0.1% or more (preferably 3.0 or more).

Although Bi and In are optional elements, when Bi and In are contained together with Sn, Sn in $Mg_2Sn$ is partially substituted by Bi and In. In other words, a substituted $Mg_2Sn$ phase (fine MCSB phase) in which Sn is partially substituted by at least one of Bi or In is formed. The formation of such a substituted $Mg_2Sn$ phase makes it possible to adjust the optimal amount of Mg to be eluted for imparting plain surface corrosion resistance and sacrificial corrosion protection ability. For the formation of the substituted $Mg_2Sn$ phase, Sn, Bi, and In need to be contained under conditions that satisfy Bi+In<Sn. Unless the conditions are satisfied, a compound such as $Mg_3Bi_2$ or $Mg_3In$ is independently formed, resulting in deterioration of plain surface corrosion resistance and processability.

In a case in which Bi and In are contained, the lower limits of the Bi and In concentrations are each preferably 0.1% or more, more preferably 0.3% or more.

Meanwhile, large contents of Sn, Bi, and In cause an increase in the rate of Mg elution from the Zn—Al—Mg alloy layer and deterioration of plain surface corrosion resistance. In particular, large contents of Bi and In impair the processability of the coating layer. Therefore, these elements need to satisfy Sn≤20.0%, Bi<5.0%, and In<2.0% (preferably, Sn≤5%, Bi<0.5%, and In<0.3%), respectively.

In a case in which the Sn concentration is from 3.00% to 20.00% and Sn and Zn represent their element concentrations, when the Formula: 0.05<Sn/Zn is satisfied, the concentration of Sn contained in the Zn—Al—Mg alloy layer relatively increases. Accordingly, a fine MCSB phase is contained in the Zn phase in the Zn—Al—Mg alloy layer, and an MCSB phase having a grain size of 1 μm or more (also referred to as "massive MCSB phase") is deposited. The effect of incorporation of an MCSB phase will be described later.

In addition, when the Sn concentration is from 0.1% to less than 3.0%, there is a greater tendency to improve sacrificial corrosion protection ability in T-bending. In general, in a case in which the Sn concentration is high, excellent sacrificial corrosion protection ability is imparted. However, regarding the properties involving multiple factors such as plain surface corrosion resistance, processability (hardness), and sacrificial corrosion protection ability of the coating layer as in the case of T-bending, it is preferable to suppress the Sn concentration at a low level so as to slightly reduce the effects of sacrificial corrosion protection ability.

<Ca: from 0% to 3.00%, Y: from 0% to 0.5%, La: from 0% to less than 0.5%, Ce: from 0% to less than 0.5%, provided that Y+La+Ce≤Ca>

Mg in $Mg_2Sn$ is partially substituted by Ca, Y, La, and Ce. In other words, a substituted $Mg_2Sn$ phase (fine MCSB phase) in which Mg is partially substituted by at least one of Ca, Y, La, or Ce is formed. The formation of such a substituted $Mg_2Sn$ phase also makes it possible to adjust the optimal amount of Mg to be eluted for imparting plain surface corrosion resistance and sacrificial corrosion protection ability.

For the formation of the substituted $Mg_2Sn$ phase, it is preferable that the lower limit of the Ca concentration is 0.05% or more, the lower limit of the Y concentration is 0.1% or more, and the lower limit of each of the La and Ce concentrations is 0.1% or more.

Meanwhile, the Ca content can be up to 3.00%, the Y content can be up to 0.5%, each of the La and Ce contents can be up to less than 0.5% (preferably the Ca content can be up to 1.00%, the Y content can be up to 0.3%, and each of the La and Ce contents can be up to 0.3%). When the concentrations of Ca, Y, La, and Ce exceeds these ranges, each of the Ca, Y, La, and Ce elements tends to form an intermetallic compound phase mainly composed thereof, resulting in deterioration of corrosion resistance and processability. In addition, Y+La+Ce≤Ca must be satisfied from the relation of substitution positions in the fine MCSB phase. In a case in which the conditions are not met, each of the Y, La, and Ce elements forms the intermetallic compound phase mainly composed thereof, and plain surface corrosion resistance extremely deteriorates.

The effect of substitution causes $Mg_2Sn$ to undergo a structural change, resulting in excellent long-term sacrificial corrosion protection ability. Although it is difficult to make a clear distinction between substituted $Mg_2Sn$ phases (substituted $Mg_2Sn$ phases including a substitution with at least one of Bi, In, Ca, Y, La, or Ce), it is thought that the rate of Mg elution from a $Mg_2Sn$ phase can be appropriately controlled by substitution with any of the elements. Moreover, it is thought that the substitution with any of the elements causes a $Mg_2Sn$ phase to be changed to have a $Mg_9Sn_5$ structure described later. Once Bi, In, Ca, Y, La, or Ce (particularly Ca) is contained, it causes a substituted $Mg_2Sn$ phase to be simply formed, and also causes a $Mg_2Sn$ phase to have a change in its crystal form, thereby facilitating the formation of a $Mg_9Sn_5$ phase. Such formation effects will be described later.

As described above, in a case in which a coating layer is designed so as to exert high-level sacrificial corrosion protection ability over a long period of time, it is preferable to allow the coating layer to contain these elements.

<Si: from 0% to less than 2.5%, Si<Sn>

Si is an element having a small atomic size, and a small amount of Si forms an interstitial solid solution in a fine MCSB phase. Since Si is a small element as compared to atoms such as Ca, Y, La, Ce, Bi, and In, it does not serve as a substitutional-type element in a fine MCSB phase but forms an interstitial solid solution, and causes some changes in the crystal structure of the fine MCSB phase (for example, a $Mg_2Sn$ phase, MgCaSn phase, or $Mg_9Sn_5$ phase) while details are unconfirmed. Although slight changes in the crystal structure cannot be captured by XRD, TEM, or the like, it is often confirmed by EPMA that Si contained in a small amount is identified in the same position as the fine MCSB phase.

In general, it is known that a small amount of Si has an effect of suppressing the growth of an Al—Fe alloy layer, and also has a confirmed effect of improving corrosion resistance. Si forms an interstitial solid solution in an Al—Fe alloy layer as well. The detailed description of the formation of an Al—Fe—Si intermetallic compound phase or the like in an Al—Fe alloy layer is as described above.

Si also forms an interstitial solid solution in a Ca—Zn—Al intermetallic compound phase described later. The solid solution effect of Si in a Ca—Zn—Al intermetallic compound phase has not been confirmed yet. The amount of a Ca—Zn—Al intermetallic compound phase containing Si tends to relatively decrease in a Zn—Al—Mg alloy layer. In order to form a Zn—Al—Mg alloy layer taking advantage of the features of the Ca—Zn—Al intermetallic compound phase, it is preferable that the Si concentration is reduced.

Meanwhile, excess Si causes the solid solution structure of a fine MCSB phase to collapse, resulting in the formation of an intermetallic compound phase such as a $Mg_2Si$ phase in a Zn—Al—Mg alloy layer. In addition, in a case in which at least one of Ca, Y, La, or Ce is contained, an intermetallic compound phase such as a $Ca_2Si$ phase is formed.

In addition, Si forms a strong Si-containing oxide film on the surface of a Zn—Al—Mg alloy layer. This Si-containing oxide film has a structure in which the Zn—Al—Mg alloy layer is less likely to be eluted, resulting in reduction of sacrificial corrosion protection ability. In particular, reduction of sacrificial corrosion protection ability at the initial stage of corrosion before the collapse of an Si-containing oxide film barrier gives a significant impact.

Further, the condition Si<Sn must be satisfied. In a case in which the condition Si<Sn is satisfied, Si is contained in a fine MCSB phase such that reduction of sacrificial corrosion protection ability due to the contained Si can be avoided. Meanwhile, in the case of Sn<Si, a needle-like crystalline $Mg_2Si$ phase that differs from a Ca—Al—Si intermetallic compound phase and a Mg—Al—Si intermetallic compound phase is formed in a large amount, which makes it impossible to maintain the structure of a Zn phase including a fine MCSB phase. In addition, as a $Mg_2Si$ phase promotes the formation of a Zn—Al—$MgZn_2$ ternary eutectic structure, plain surface corrosion resistance also slightly deteriorates. Therefore, it is preferable that a fine MCSB phase is formed in a larger amount than a $Mg_2Si$ phase in a Zn—Al—Mg alloy layer.

Accordingly, the Si concentration is set to less than 2.5%. The Si concentration is preferably less than 0.5%, more preferably less than 0.3%, from the viewpoints of plain surface corrosion resistance and sacrificial corrosion protection. In particular, it is preferable that the Si concentration is suppressed to less than 0.01% from the viewpoints of plain surface corrosion resistance and sacrificial corrosion protection ability.

Meanwhile, when it is expected that a Ca—Al—Si intermetallic compound phase and a Mg—Al—Si intermetallic compound phase are effective for improving the effects of preventing cracking and exfoliation in a processed portion, the Si concentration is preferably 0.05% or more, more preferably 0.1% or more. The same also applies to the Ca concentration. The effects of the oxide film barrier in the presence of Si are limited, which are exhibited at the initial stage of corrosion. Sacrificial corrosion protection ability tends to be improved gradually over time.

Here, Si forms a solid solution in a fine MCSB phase, which is an interstitial solid solution in a fine MCSB phase. Thus, when Si forms a solid solution in a fine MCSB phase, the crystal structure of the fine MCSB phase is distorted, which allows detection by XRD or the like. For such purpose, it is preferable that Si is contained in the coating layer at a concentration of 0.05% or more. When the Si concentration is 0.05% or more, Si contained in a fine MCSB phase becomes saturated. Even when Si is contained in a fine MCSB phase, sacrificial corrosion protection ability is ensured against long-term corrosion. In particular, it is preferable that Si is contained in a fine MCSB phase in terms of corrosion resistance in a processed portion. Similarly, it is also preferable in terms of sacrificial corrosion protection ability (especially cut end surface corrosion resistance).

<Cr: from 0% to less than 0.25%, Ti: from 0% to less than 0.25%, Ni: from 0% to less than 0.25%, Co: from 0% to less than 0.25%, V: from 0% to less than 0.25%, Nb: from 0% to less than 0.25%, Cu: from 0% to less than 0.25%, Mn: from 0% to less than 0.25%, provided that 0≤Cr+Ti+Ni+Co+V+Nb+Cu+Mn<0.25>

Sn in $Mg_2Sn$ is partially substituted by Cr, Ti, Ni, Co, V, Nb, Cu, and Mn as long as their contents are small. In other words, a substituted $Mg_2Sn$ phase (fine MCSB phase) in which Sn is partially substituted by at least one of Cr, Ti, Ni, Co, V, Nb, Cu, or Mn is formed. The concentration of any of these elements must be lower than the Sn concentration. It is difficult to confirm an obvious change in sacrificial corrosion protection ability, which is observed in, for example, a substituted $Mg_2Sn$ phase (fine MCSB phase) including a substitution of Sn by Ca, Y, La, Ce, Bi, or In. However, since Sn substituted as above further binds to another Mg to form a fine MCSB phase. This allows the total amount of fine MCSB phase to increase. Besides, as it is possible to increase Mg to be consumed for the formation of a fine MCSB phase, the sacrificial corrosion protection effect is slightly increased, and the corrosion potential tends to shift to a relatively lower side.

Note that the amount of Sn that can be substituted is limited. In a case in which the concentration of any of the elements becomes 0.25% or more or the total concentration thereof does not satisfy Cr+Ti+Ni+Co+V+Nb+Cu+Mn<0.25, an intermetallic compound phase mainly composed of the elements contained is formed rather than a fine MCSB phase. This makes it impossible to ensure the sufficient formation of a fine MCSB phase. For example, an intermetallic compound phase containing only one Mg element, such as a $MgCu_2$ phase, is formed, resulting in reduction of sacrificial corrosion protection ability. In addition, a coupling reaction proceeds, and corrosion resistance extremely deteriorates. Processability also becomes poor.

Therefore, the concentrations of Cr, Ti, Ni, Co, V, Nb, Cu, and Mn are set to less than 0.25% such that 0≤Cr+Ti+Ni+Co+V+Nb+Cu+Mn<0.25 is satisfied.

<Fe: from 0% to 5.0%>

In a case in which a coating layer is formed by the melt coating method, Fe is contained at a certain concentration in a Zn—Al—Mg alloy layer and an Al—Fe alloy layer.

It has been confirmed that Fe contained in a coating layer (particularly a Zn—Al—Mg alloy layer) at a concentration of up to 5.0% does not disadvantageously influence the properties. In many cases, since Fe is mainly contained in an Al—Fe alloy layer, the Fe concentration usually increases as the thickness of this layer increases.

<Sr: from 0% to less than 0.5%, Sb: from 0% to less than 0.5%, Pb: from 0% to less than 0.5%, B: from 0% to less than 0.5%, provided that 0≤Sr+Sb+Pb+B<0.5>

It is unknown whether Sr, Sb, Pb, and B influence the formation of an intermetallic compound phase such as a fine MCSB phase. Small amounts of these elements may form a solid solution in a Zn phase in a Zn—Al—Mg alloy layer and may also be detected in a fine MCSB phase. Therefore, they may play a role as a substitutional element. Although it is not particularly observed that these elements cause changes in the properties, the elements can change the appearance of a coating layer, thereby allowing a spangle pattern to be formed on the surface of the coating layer.

When the concentration of each of these elements is 0.5% or more, the element cannot form a solid solution in a Zn phase, although it does not affect the formation of a fine MCSB phase. As a result, various intermetallic compound phases are formed, resulting in deterioration of processability and corrosion resistance.

Therefore, the concentrations of Sr, Sb, Pb, and B are set to less than 0.5%. Further, it is also required to satisfy Sr+Sb+Pb+B<0.5 as an index that prevents substitution for the formation of a fine MCSB phase while facilitating the formation of an intermetallic compound phase.

<Impurities>

Impurities are components that are contained in starting materials or mixed in production steps without an intention to add such components. For example, minute amounts of components other than Fe are incidentally mixed as impurities in a coating layer due to atomic diffusion between a steel product (base metal) and a coating bath.

Next, phases that constitute a Zn—Al—Mg alloy layer will be described.

A Zn—Al—Mg alloy layer has a Zn phase. The Zn phase has a fine MCSB phase (Mg—Sn intermetallic compound phase). In other words, the fine MCSB phase is contained (included) in the Zn phase.

The Zn—Al—Mg alloy layer may have a $MgZn_2$ phase and an Al phase. In addition, it is desirable that the Zn—Al—Mg alloy layer does not include a Zn—Al—$MgZn_2$ ternary eutectic structure or includes only a minute amount of a Zn—Al—$MgZn_2$ ternary eutectic structure.

Specifically, it is desirable that the Zn—Al—Mg alloy layer has a structure having a $MgZn_2$ phase, an Al phase, and a Zn phase including a fine MCSB phase. Regarding the amounts of the phases, it is desirable that the total amounts of the $MgZn_2$ phase and the Al phase exceeds the amount of the Zn phase including a fine MCSB phase in terms of area proportion. For example, it is desirable that the total area proportion of the $MgZn_2$ phase and the Al phase is from 40% to 85% (preferably from 50% to 75%), and the area proportion of the Zn phase including a fine MCSB phase is from 3% to 35% (preferably from 10% to 30%).

As each phase has a high level of corrosion resistance, a structure excellent in plain surface corrosion resistance is formed. Although the fine MCSB phase portion is easily eluted also from the Zn phase including a fine MCSB phase, a corrosion product to be formed has the antirust effect, which eventually results in improved corrosion resistance. Thus, corrosion resistance comparable or superior to that of the Zn phase is acquired.

In a case in which a coating layer contains Ca and Si, a Ca—Al—Si intermetallic compound phase and a Mg—Al—Si intermetallic compound phase may exist in a Zn—Al—Mg alloy layer. However, these metallic compound phases are finely dispersed in small amounts in the coating layer, and do not constitute the main phase of the Zn—Al—Mg alloy layer as with the fine MCSB phase.

Assuming that the amount of a Zn phase accounts for a half or more of the phase amount of a Zn—Al—Mg alloy layer (particularly when any of conditions such as an Al concentration of less than 20.0%, a Mg concentration of less than 5.0%, and an Sn concentration of less than 3.0% is met), a fine Zn—Al—MgZn$_2$ ternary eutectic structure is likely to be formed in the Zn—Al—Mg alloy layer. Since this ternary eutectic structure is susceptible to corrosion due to a coupling reaction, corrosion tends to progress faster than corrosion occurring in a coating structure in which each crystal structure becomes a coarse structure. In addition, when MgZn$_2$ having poor processability forms a ternary eutectic structure and is finely dispersed in a Zn—Al—Mg alloy layer, it is likely to become the origin of cracking. In particular, white rust formation is likely to occur early from countless cracks reaching a base metal (steel product) at a processed portion or the like. Therefore, it is preferable to avoid formation of this ternary eutectic structure as much as possible.

Here, most of the existing Zn—Al—Mg-based coated steel products has a Zn—Al—Mg alloy layer which includes a ternary eutectic structure (FIG. 1).

Meanwhile, it becomes easier to avoid the formation of a ternary eutectic structure by: 1) restricting the chemical composition of the coating layer according to the disclosure to a certain range (particularly the concentrations of Zn, Al, and Mg) so as to increase the phase amounts of the MgZn$_2$ phase and the Al phase; 2) including elements that constitute a fine MCSB phase (Sn and other elements); and 3) appropriately controlling production conditions in the melt coating method. As a result, it is possible to eliminate or reduce this ternary eutectic structure.

FIG. 2 is an SEM reflection electron image of a representative example of the coating layer according to the disclosure. As shown in FIG. 2, for example, a Zn phase, an Al phase, and a MgZn$_2$ phase are present in a Zn—Al—Mg alloy layer. In addition, as Sn or the like is contained, the Zn phase includes a fine MCSB phase. As a result, the formation of a Zn—Al—MgZn$_2$ ternary eutectic structure is suppressed.

It is thought that this is because the chemical composition of the coating layer according to the disclosure caused the formation of a Zn—Al—MgZn$_2$ phase by the ternary eutectic reaction to be changed to the formation of a fine MCSB phase in the final solidification reaction. In addition, as a result of loss or reduction of the ternary eutectic structure, sufficient processability is imparted even to a relatively hard coated steel product in which originally, a large amount of a MgZn$_2$ phase is formed with a large amount of Mg in a Zn—Al—Mg alloy layer, which makes it difficult to process.

Next, a fine MCSB phase (Mg—Sn intermetallic compound phase) will be described in detail.

A fine MCSB phase is a hard phase (grain) compared to a Zn phase, and is a soft phase compared to a MgZn$_2$ phase. Usually, a hard intermetallic compound phase has poor plastic deformability. However, when it is finely deposited in a Zn phase, deterioration of its plastic deformability is significantly reduced. Therefore, in a case in which a fine MCSB phase is contained in a Zn phase, hardness of the Zn phase increases while processability is unlikely to deteriorate.

Meanwhile, when a fine MCSB phase increases, the phase amount of a MgZn$_2$ phase having extremely poor plastic deformability slightly decreases. Therefore, when a fine MCSB phase increases, the effects leading to the improvement of processability are exhibited.

These phenomena result in a coating layer having high hardness and excellent wear resistance, which also achieves processability even with high hardness.

Similar to the fine MCSB phase, a Ca—Al—Si intermetallic compound phase and a Mg—Al—Si intermetallic compound phase are also hard substances, but are soft phases as compared to the MgZn$_2$ phase. Therefore, processability is less likely to deteriorate even when including these intermetallic compound phases.

Here, it is desirable that the hardness of a coating layer is at least 150 Hv in average Vickers hardness. A coating layer having an average Vickers hardness value of 150 Hv or more is usually a coating layer which is harder than the existing Zn—Al—Mg-based coating layers and usually difficult to process. However, by controlling the structure of the Zn—Al—Mg alloy layer in the disclosure, coating layer processing such as V-bending in a range of constant R values is realized and processability equivalent to that of the existing Zn—Al—Mg-based coated steel sheets can be achieved.

By allowing a fine MCSB phase to be contained in a Zn phase, it is possible to appropriately control the elution rate of a coating layer. When a fine MCSB phase is not incorporated into a Zn phase, the localized fine MCSB phase is eluted early, resulting in immediate loss of the effects of the fine MCSB phase. In addition, since Zn is not eluted, a corrosion product suitable for corrosion protection is not formed.

As a Zn phase containing a fine MCSB phase is formed, a ternary eutectic reaction of a Zn—Al—MgZn$_2$ phase is not produced. Therefore, the ternary eutectic structure and the Zn phase containing a fine MCSB phase are unlikely to coexist. It has been experimentally found that as long as a Zn phase including a fine MCSB phase is present in a Zn—Al—Mg alloy layer at an area fraction of 3% or more, particularly 5% or more, in a cross-section of the Zn—Al—Mg alloy layer, it means that a ternary eutectic structure has been almost lost. In addition, as a result of the loss of a ternary eutectic structure, plain surface corrosion resistance and processability have been improved. Further, plain surface corrosion resistance can be exerted at a level higher than that of the commercially available Zn—Al—Mg-based coating even with a high Mg content, making it possible to ensure processability equivalent to that of the commercially available Zn—Al—Mg-based coating.

However, in order to maintain plain surface corrosion resistance, it is necessary to strictly comply with the chemical composition of the coating layer specified in the disclosure and suppress the formation of an intermetallic compound phase that causes extreme deterioration of plain surface corrosion resistance other than a fine MCSB phase, a Ca—Zn—Al intermetallic compound phase, a Ca—Al—Si intermetallic compound phase, and a Mg—Al—Si intermetallic compound phase. Once such an intermetallic compound phase is formed, plain surface corrosion resistance may be deteriorated even under the presence of a Zn phase including a fine MCSB phase.

The loss of a Zn—Al—MgZn$_2$ ternary eutectic structure in the presence of a Zn phase including a fine MCSB phase is confirmed based on that the final solidification reaction is carried out not by the solidification of a Zn—Al—MgZn$_2$ phase by a ternary eutectic reaction, but by the formation of a fine MCSB phase, in accordance with the coating layer chemical component and the coating production method according to the disclosure as mentioned above. In order to confirm whether or not a ternary eutectic structure is formed in a coating layer, it is most preferable to observe an optional sectional structure of an arbitrary coating layer for structure observation by SEM (for example, at an acceleration voltage of 15 kV or less, a filament current of from 2 to 3 A, an emission current of 100 to 200 μA, and a magnification of about 1000 times).

Here, FIG. 3 shows an example of a fine MCSB phase included in a Zn phase. As shown in FIG. 3, a single fine MCSB phase itself is a very fine phase, and almost every fine MCSB phase does not reach a grain size of 1 μm and exists a lot in the Zn phase. This is because a decrease in the solid solubility limit accompanying a decrease in the temperature of the Zn phase causes Mg, Ca, Sn, Bi, and the like to be released during the process of solidification of a coating layer, and a fine MCSB phase is formed as a result of binding of these elements. The fine MCSB phase deposited through this process is always contained in the Zn phase. In the melt coating method, it is empirically found that the fine MCSB phase often has a grain size of less than 1 μm and is deposited as spots.

Therefore, it is preferable that the fine MCSB phase contained in the Zn phase has an average grain size of less than 1 am. The lower limit of the average grain size of the fine MCSB phase is not particularly limited, but it is, for example, 0.05 μm or more.

Note that when a fine MCSB phase is mainly formed and preserved in a temperature range that allows atomic diffusion (around from 150° C. to 350° C.) for a long period of time, an MCSB phase with a grain size of 1 μm or more is also observed. However, its location is always mainly in the Zn phase, merely indicating that fine MCSB phases, which were finely dispersed in the initial state, have grown and aggregated with each other, and the grain size has increased. Therefore, there is almost no influence on plain surface corrosion resistance and the like.

Here, plain surface corrosion resistance and sacrificial corrosion protection ability are contradictory to each other, and in a case in which an importance is placed on both properties, it is preferable that a fine MCSB phase is present. Meanwhile, in a case in which a coating layer for which an importance is placed on sacrificial corrosion protection ability is designed, it is preferable to allow some MCSB phases to have a grain size of 1 μm or more to grow largely in a Zn—Al—Mg layer.

Such MCSB phases having a grain size of 1 μm or more correspond to a massive MCSB phase described later.

The corrosion potential of a coating layer drops drastically when a Zn phase containing a fine MCSB phase is present. Specifically, for example, the corrosion potential of the coating layer drops from the corrosion potential exhibited by a typical Zn—Al—Mg-based melt coating layer [−1.0 to −1.1 V (vs. an Ag/AgCl reference electrode in a 5% NaCl aqueous solution)] to around −1.5 V at minimum depending on the content of a fine MCSB phase. Electrochemical measurement is effective means for confirming the corrosion behavior at the very early stage. When the presence of a fine MCSB phase causes a decrease in the corrosion potential of a coating layer, an element having anticorrosion effects (such as Mg or Ca) is dissolved earlier than an ordinary Zn—Al—Mg-based melt coating layer, and it covers, in particular, a base metal (steel product) and suppresses red rust formation on the base metal (steel product). Reduction of the potential allows an element having anticorrosion effects (such as Mg or Ca) to migrate a long distance from its location. Therefore, an anticorrosion effect on a cutting end surface, which has been impossible to obtain with a conventional Zn—Al—Mg-based melt-coating layer, can be expected.

It is possible to confirm whether a fine MCSB phase is contained in a Zn phase by X-ray diffraction (XRD) using a Cu-Kα ray. Usually, the diffraction peak of $Mg_2Sn$ in XRD is represented by, for example, JCPDS cards: PDF #00-007-0274, #00-006-0190, and #00-002-1087. However, in a Zn—Al—Mg-based coating layer, the optimum diffraction peak for identifying a fine MCSB phase is a diffraction peak at 22.8° which does not overlap diffraction peaks of a Zn phase, a $MgZn_2$ phase, and an Al phase. In addition to the peak at 22.8°, favorable diffraction peaks used for identifying a fine MCSB phase are diffraction peaks at 23.3° and 24.2°, which do not overlap diffraction peaks of the other constituent phases of a coating layer and are convenient for identifying a fine MCSB phase.

In a case in which, Bi, In, Ca, and the like are contained, in addition to Sn, a $MgZn_2$ phase (or a Mg phase), which originally exists as a massive $MgZn_2$ phase in an existing Zn—Al—Mg-based coating layer or exists as a Zn—Al—$MgZn_2$ ternary eutectic structure, decreases and is replaced by a fine MCSB phase. For example, PDF #00-034-0457 is typical for identification of a $MgZn_2$ phase, and its strongest diffraction peak at 41.30 is an indicator of abundance. Usually, as the abundance of a fine MCSB phase increases, this peak intensity decreases.

Specifically, when based on an X-ray diffraction image of the surface of the coating layer, the image being measured using a Cu-Kα ray with an X-ray output at 40 kV and 150 mA, specific intensity I (fine MCSB phase)={I (22.8° intensity (cps))+I (23.3° intensity (cps))+I (24.2° intensity (cps))}/3×I (background intensity at 20° (cps)) is 1.5 or more (more preferably more than 3.0), it can be an index for the sufficient presence of Mg in the fine MCSB phase. The corrosion potential lower than the corrosion potential (−1.0 to −1.1 V) shown by the existing Zn—Al—Mg-based coating layer is clearly observed. In other words, it is indicated that there is a distinguishable diffraction peak of the fine MCSB phase against the background. The presence of the fine MCSB phase makes it possible to clearly confirm the improvement of sacrificial corrosion resistance (especially, the improvement of corrosion resistance on the cut end surface).

In recent years, there is software that can perform, for example, background removal as a method of calculating the background intensity. From the obtained diffraction peak intensity data, 2θ and an intensity (cps) graph are generated to create an approximate line (straight line) of the flat portion confirmed at 15° to 25°. Since the diffraction peak does not appear at 15° and 25° from the surface of the coating layer according to the disclosure, when simply taking an average value of intensity (cps) at 15° and 25°, it gives a background intensity at 20°. In a case in which there is a possibility that some diffraction peaks may overlap at 15° and 25°, an average of values at 15° (±1°) and 25° or an average of values at 15° and 25° (±1°) is adopted.

When a fine MCSB phase is present in a Zn phase, it attracts ions such as Cl— and OH— along with pre-corrosion of the fine MCSB phase, resulting in corrosion of surrounding areas. Therefore, a certain amount of a Zn phase itself, which is originally less soluble as compared to Mg and Ca, is dissolved, and Zn is also eluted as well as Mg and Ca, which also adds antirust effects of Zn. In addition, in the Zn—Al—Mg alloy layer, Sn, Bi, and the like, from which Mg and Ca are separated, remain as single metals without migrating. This results in an environment in which there exists a partially electrochemically superior portion in the Zn phase, and Zn surrounding the portion is easily corroded. Mg and Ca are originally present as $Mg(OH)_2$ and $Ca(OH)_2$ on a base metal (steel product), and thus have high solubility in water and are difficult to stably maintain on the coating surface and the base metal.

However, as Zn ions are eluted together with Mg and Ca, a Zn-based corrosion product is formed in an alkaline environment in the presence of $Mg(OH)_2$ and $Ca(OH)_2$. By incorporating Mg and Ca elements into the Zn-based corrosion product, it becomes possible to form a film of a Zn—Mg—Ca intermetallic compound phase that protects a base metal in a short period of time.

Therefore, a structure in which a fine MCSB phase is included in a Zn phase has high-level sacrificial corrosion protection ability and the corrosion content thereof increases as compared to a structure in which a fine MCSB phase is simply included (in other words, a structure in which a fine MCSB phase is formed outside of a Zn phase). However, as a highly corrosion-resistant film is formed immediately, corrosion resistance is rather improved in many cases. By controlling the phase amounts of the fine MCSB phase and the Zn phase, the effects (the elution range and the period of corrosion protection) can be controlled.

In particular, when a Zn phase containing a fine MCSB phase is present with an area fraction of 3% or more (preferably 10% or more) (with respect to a cross-section of a Zn—Al—Mg alloy layer), elements eluted from a coating layer at an early stage has an increased tendency to form an antirust film immediately. Therefore, sacrificial corrosion protection ability (particularly cut end surface corrosion resistance) is further improved.

Meanwhile, in a Zn phase containing a fine MCSB phase, when a fine MCSB phase (in other words, a Mg—Sn intermetallic compound phase having a grain size of less than 1 μm) is present with an area fraction (area fraction with respect to a Zn phase containing a fine MCSB phase) of from 10% to 50% (preferably from 15% to 35%), elements eluted from a coating layer at an early stage has an increased tendency to form an antirust film immediately.

Accordingly, sacrificial corrosion protection ability (particularly cut end surface corrosion resistance) is further improved.

Therefore, in a cross-section of a Zn—Al—Mg alloy layer, the area fraction of a fine MCSB phase (in other words, a Mg—Sn intermetallic compound phase having a grain size of 1 m) with respect to a Zn phase containing a fine MCSB phase is preferably from 10% to 50%.

Next, the "Ca-containing effect" for effectively improving sacrificial corrosion protection ability will be described.

When Ca is contained in a Zn—Al—Mg alloy layer, Mg in $Mg_2Sn$ is partially substituted by Ca. For example, when the Ca concentration is from 0.05% to 3.00%, the formation of an "MgCaSn phase" or the like which is a substituted $Mg_2Sn$ phase (fine MCSB phase) is observed. As the amount of a $Mg_2Sn$ phase increases, the amount of a $Mg_2Sn$ phase that is allowed to be changed to a MgCaSn phase increases. The crystal structure of a non-substituted $Mg_2Sn$ is changed to transform to $Mg_9Sn_5$. As the amount of $Mg_2Sn$ increases, $Mg_9Sn_5$ also increases.

In other words, when the Ca concentration is from 0.05% to 3.00%, a MgCaSn phase and a $Mg_9Sn_5$ phase are contained in a Zn phase as a fine MCSB phase.

As the formation of a MgCaSn phase and transformation to a $Mg_9Sn_5$ phase progress, sacrificial corrosion protection ability of a coating layer is improved and long-term sacrificial corrosion protection ability is enhanced. An index for incorporation of all contained Ca into $Mg_2Sn$ and an index for transformation to a $Mg_9Sn_5$ phase are required. For the detection of a fine MCSB phase into which Ca is incorporated, it is preferable to confirm that Ca is originally detected at a position identical to the position of Mg by TEM or EPMA. However, it can be confirmed based on an X-ray diffraction image of the surface of a coating layer subjected to measurement using a Cu-Kα ray with an X-ray output at 40 kV and 150 mA.

Usually, the XRD diffraction peak of $Mg_2Sn$ can be applied to a Zn—Al—Mg-based coating layer, and diffraction peaks at 22.8°, 26.3° and 37.6° are $Mg_2Sn$-specific differential peaks which are representative diffraction peaks used for detection. Meanwhile, for example, MgCaSn is represented by JCPDS card: #01-072-5710, $Mg_9Sn_5$ is represented by JCPDS card: #01-073-8010. A diffraction peak at 23.3° is a diffraction peak detected in either $Mg_2Sn$, MgCaSn, or $Mg_9Sn_5$ regardless of the presence of Ca.

Here, diffraction peaks at 22.8° and 26.3° become smaller as the Ca concentration increases, and the peaks become hardly detectable after Ca substitution. The same tendency is also seen for a diffraction peak at 37.6°. However, since the peak is surrounded by large difference peaks, it is not suitable for identification.

The degree of Ca substitution, which means the amounts of a MgCaSn phase and a $Mg_9Sn_5$ phase formed, can be measured using intensities at these degrees as indexes. Specifically, when the following Formula: specific intensity I $(MgCaSn+Mg_9Sn_5)=\{I~(22.8°~\text{intensity (cps)})+I~(26.3°~\text{intensity (cps)})\}/I~(23.3°~\text{intensity (cps)})$ yields less than 0.3 (preferably less than 0.1), and I (23.3° intensity (cps)) is 500 cps or more, it means that a $Mg_2Sn$ phase (fine MCSB phase) exists in a Zn—Al—Mg alloy layer, Ca substitution takes place at almost every position of Mg in the existing $Mg_2Sn$, and thus, the main phase consists of the MgCaSn phase and the $Mg_9Sn_5$ phase.

In a case in which I (23.3° intensity (cps)) is less than 500 cps, since the amount of the $Mg_2Sn$ phase (fine MCSB phase) originally existing in the Zn—Al—Mg alloy layer is not sufficient, it is preferable that specific intensity I $(MgCaSn+Mg_9Sn_5)$ is set to 0.3 or more.

The properties of a $Mg_2Sn$ phase (fine MCSB phase) by Ca substitution are changed as described below. When Ca is incorporated into a $Mg_2Sn$ phase such that a MgCaSn phase is formed, the amount of Mg eluted can be appropriately suppressed without changing the sacrificial corrosion protection ability (corrosion potential) of the $Mg_2Sn$ phase. As a result, high-level sacrificial corrosion protection effects can be obtained for a longer period of time.

Similar effects are obtained also for a $Mg_9Sn_5$ phase. These effects can be confirmed by various corrosion tests and the like as well as electrochemical measurement.

The effects of including Y, Ce, La, Bi, and In other than Ca can be confirmed by the same method. In addition, although a small amount of a metallic Sn phase may be detected around a MgCaSn phase and a $Mg_9Sn_5$ phase due to changes in the crystal structure, since the amount is small, changes in the properties are not significant and thus can be ignored.

Next, the Si-containing effects will be described.

When Si is contained, Si forms an interstitial solid solution in a fine MCSB phase as described above, which makes the resulting crystal structure more complicated. At such time, the preferred crystal orientation of the fine MCSB phase is easily changed. Therefore, for example, in a case in which there exists the "MgCaSn phase and $Mg_9Sn_5$ phase" corresponding to the fine MCSB phase, there is an exceptional coating layer that can obtain the sacrificial corrosion protection effect, although the above-described evaluation indexes are not satisfied.

For example, in a case in which Ca, Si, and high-concentration Mg are contained (specifically a case in which a Mg concentration of from more than 4.0% to less than 12.5%, a Ca concentration of from 0.05% to 3.00%, and an Si concentration of from 0.01% to 2.5% are satisfied), an exceptional coating layer, which does not correspond to some of the above-described indexes, appears. Even in such a coating layer, when Ca, Si, and Mg satisfy the above-described chemical components, it is possible to define the effect of allowing a fine MCSB phase to contain Si by setting a new index for the obtained XRD intensity.

Here, the above-described specific intensity I (fine MCSB phase)={I (22.8° intensity (cps))+I (23.3° intensity (cps))+I (24.2° intensity (cps))}/3×I (background intensity at 20° (cps)) is 1.5 or more, and among diffraction peaks appearing at 23.0° to 23.46°, a diffraction peak with the strongest intensity appears between 23.36° and 23.46°, which serve as preconditions. Even in a case in which the above-described specific intensity I (MgCaSn+Mg$_9$Sn$_5$) is not satisfied, high-level effects of sacrificial corrosion protection can be confirmed. In other words, in a case in which the angle with the strongest intensity (2θ) of a diffraction peak derived from the Si-containing fine MCSB phase (diffraction peak originating from 23.3°) appears between 23.36° to 23.46°, high-level effects of sacrificial corrosion protection can be confirmed.

For example, in a case in which a MgCaSn phase and a MgCaSn phase, which usually correspond to a fine MCSB phase, do not contain Si, the strongest intensity of the diffraction peak originating from 23.3° appears between 23.25° and 23.35°. Meanwhile, in a case in which the MgCaSn phase and the MgCaSn phase contain Si, as a crystal lattice made of the MgCaSn phase and the MgCaSn phase is distorted, the strongest intensity appears between 23.36° to 23.46°. This Si-containing fine MCSB phase (the Si-containing MgCaSn phase and the Si-containing MgCaSn phase) has effects similar to the effects of the Si-free MgCaSn phase and the Si-free Mg$_9$Sn$_5$ phase. In other words, the corrosion rate of the fine MCSB phase is optimized in terms of long-term sacrificial corrosion protection ability.

Si is likely to bind to a Ca—Al intermetallic compound phase and a Mg—Al intermetallic compound phase. Inclusion of such Si-bound intermetallic compound phases allows imparting special properties.

Specifically, when Ca and Sn are contained at a Ca concentration of from 0.05% to 3.00% and an Si concentration of from 0.01% to 2.5%, respectively, it is possible to confirm the formation of at least one phase selected from the group consisting of a Ca—Al—Si intermetallic compound phase and a Mg—Al—Si intermetallic compound phase in a Zn—Al—Mg alloy layer by SEM or the like.

The average grain size of a Ca—Al—Si intermetallic compound phase and a Mg—Al—Si intermetallic compound phase is 1 μm or more. An average grain size of 1 μm or more is a grain size sufficient for allowing a Ca—Al—Si intermetallic compound phase and a Mg—Al—Si intermetallic compound phase to be identified by TEM. Therefore, there is no threshold of the lower limit of the average grain size of a Ca—Al—Si intermetallic compound phase and a Mg—Al—Si intermetallic compound phase in terms of special properties. Meanwhile, although the upper limit of the average grain size of a Ca—Al—Si intermetallic compound phase and a Mg—Al—Si intermetallic compound phase is not particularly limited, it is set to, for example, 30 μm or less.

The growth behavior or location of a Ca—Al—Si intermetallic compound phase and that of a Mg—Al—Si intermetallic compound phase vary according to the production method or the chemical composition of a coating layer. In a case in which quenching is performed during solidification of a coating layer, many fine Ca—Al—Si intermetallic compound phases and fine Mg—Al—Si intermetallic compound phases having small grain sizes are formed. Meanwhile, in a case in which slow cooling is performed, the grain size increases and the number of fine intermetallic compound phases decreases.

In addition, a Ca—Al—Si intermetallic compound phase is usually in the needle- or rod-like form in many cases. A Mg—Al—Si intermetallic compound phase is in the amorphous or spherical form in many cases. However, there are some exceptions, and even a Ca—Al—Si intermetallic compound phase may become amorphous. Meanwhile, even a Mg—Al—Si intermetallic compound phase may be in the rod-like or needle-like form.

In a case in which a Ca—Al—Si intermetallic compound phase and a Mg—Al—Si intermetallic compound phase are in the "needle- or rod like form," the length of the longest line (such as a diagonal line) is determined to be the grain size of the Ca—Al—Si intermetallic compound phase and the Mg—Al—Si intermetallic compound phase. In a case in which a Ca—Al—Si intermetallic compound phase and a Mg—Al—Si intermetallic compound phase are in the "amorphous or spherical form other than the needle- or rod-like form," the area-equivalent circle diameter is determined to be the grain size of the Ca—Al—Si intermetallic compound phase and the Mg—Al—Si intermetallic compound phase.

Here, FIG. 8 shows an SEM reflection electron image of a cross-section of one example of the coating layer according to the disclosure, which is a cross-section of a coating layer that contains Ca and Sn at a Ca concentration of from 0.05% to 3.00% and an Si concentration of from 0.01% to 2.5%, respectively (SEM reflection electron image of an oblique cross-section of a coating layer at a tilt of 10°).

FIG. 10 shows a magnified image (SEM reflection electron image) of the coating layer structure in the white frame in FIG. 8.

As shown in FIGS. 8 and 9, when Ca and Sn are contained at a Ca concentration of from 0.05% to 3.00% and an Si concentration of from 0.01% to 2.5%, respectively, for example, a granular or amorphous Mg—Al—Si intermetallic compound phase and a needle-like Ca—Al—Si intermetallic compound phase are present in a coating layer.

In addition, FIG. 10 shows a magnified image (TEM image) of the vicinity of the interface between the coating layer and the base metal (steel product) shown in FIG. 8.

FIG. 11A shows an electron beam diffraction image of the amorphous intermetallic compound phase (13) in FIG. 10, and FIG. 11B shows an EDS analysis spectrum of the amorphous intermetallic compound phase (13) in FIG. 10.

FIG. 12A shows an electron beam diffraction image of the needle-like intermetallic compound phase (14) in FIG. 10, and FIG. 11B shows an EDS analysis spectrum of the needle-like intermetallic compound phase (14) in FIG. 10.

In FIG. 10, the amorphous intermetallic compound phase (13) is detected as containing Mg, Al, and Si as shown in the electron beam diffraction image (FIG. 11A) and the EDS analysis spectrum (FIG. 11B) (Zn is derived from the background, and Cu is derived from the analysis method). Therefore, the amorphous intermetallic compound phase (13) is identified as a Mg—Al—Si compound phase (MgAlSi phase as one example).

In FIG. 10, the needle-like intermetallic compound phase (14) is detected as containing Ca, Al, and Si as shown in the electron beam diffraction image (14A) and the EDS analysis spectrum (FIG. 12B) (Zn is derived from the background, and Cu is derived from the analysis method). Therefore, the needle-like intermetallic compound phase (14) is identified as a Ca—Al—Si compound phase.

As described above, a Ca—Al—Si intermetallic compound phase and a Mg—Al—Si intermetallic compound phase often cannot be matched as an intermetallic compound phase discovered in the past as shown in FIGS. 11A and 12A even in a case in which they are analyzed based on electron beam diffraction images by TEM or the like. Meanwhile, as shown in FIGS. 11B and 12B, as Ca, Al, and Si or Mg, Al, and Si are simultaneously detected by EDS analysis, a Ca—Al—Si intermetallic compound phase and a Mg—Al—Si intermetallic compound phase can be identified as an intermetallic compound phase containing such elements.

In other words, a Ca—Al—Si intermetallic compound phase and a Mg—Al—Si intermetallic compound phase can be distinguished based on an electron beam diffraction image by TEM or the like or by EDS analysis. In a case in which Ni is contained in a coating layer, in addition to Zn, elements such as Zn and Ni can also be simultaneously detected.

A Ca—Al—Si intermetallic compound phase and a Mg—Al—Si intermetallic compound phase are formed preferentially as compared to a fine MCSB phase, which may cause the fine MCSB phase to decrease, and may also cause Ca, Y, La, or Ce to be released from the fine MCSB phase. However, in a case in which the Ca concentration is sufficient, for example, 0.05% or more, there is no need to pay particular attention.

A Ca—Al—Si intermetallic compound phase and a Mg—Al—Si intermetallic compound phase are relatively hard and have poor ductility. When these intermetallic compound phases having an average grain size of 1 μm or more exist in large amounts in a Zn—Al—Mg alloy layer, it causes a coating layer to be cracked finely during processing. For example, a coating layer is finely broken by conducting a T-bending test or the like, compared to a case in which these intermetallic compound phases are not present at the external (tensile-side) top of a bent-processed portion (for example, Ca and Si are not contained). In general, as an alloy-based coating layer has poor ductility compared to a base metal (steel product), many exposed portions of a base metal (steel product) appear under cracks in a coating layer.

When the width of a single crack is large, the coating layer experiences excessive sacrificial corrosion protection. Sacrificial corrosion protection ability is reduced and processed portion corrosion resistance deteriorates at a processed portion until a crack-induced exposed portion of the base metal is covered with rust.

Meanwhile, when the width of a single crack is small (meaning that a coating layer is finely cracked), appropriate sacrificial corrosion protection is achieved. Therefore, appropriate sacrificial corrosion protection ability is also achieved at a processed portion, resulting in suppressed degradation of processed portion corrosion resistance.

In other words, the effect of improving corrosion resistance during processing can be obtained under the presence of a Ca—Al—Si intermetallic compound phase having an average grain size of 1 μm or more and a Mg—Al—Si intermetallic compound phase having an average grain size of 1 μm or more.

As described above, from the viewpoint of the improvement of processed portion corrosion resistance, it is preferable that at least one selected from the group consisting of a Ca—Al—Si intermetallic compound phase having an average grain size of 1 μm or more and a Mg—Al—Si intermetallic compound phase having an average grain size of 1 μm or more is present in a Zn—Al—Mg alloy layer.

In addition, from the viewpoint of effectively improving processed portion corrosion resistance, the area fraction (area fraction with respect to a cross-section of a Zn—Al—Mg alloy layer) of each of a Ca—Al—Si intermetallic compound phase having a grain size of 1 μm or more and a Mg—Al—Si intermetallic compound phase having a grain size of 1 μm or more is preferably from more than 0% to less than 1%. Each of a Ca—Al—Si intermetallic compound phase and a Mg—Al—Si intermetallic compound phase does not account for a large area fraction (1% or more) in the chemical composition of the coating layer according to the disclosure.

Regarding a T-bending test, in general, processing is further intensified in 0T-bending (complete bending, 180-degree bending) than 4T-bending or the like (a space with a thickness of four sheets is left inside the bend), and crack-induced degradation of processed portion corrosion resistance is likely to be observed in 0T-bending. When at least one of a Ca—Al—Si intermetallic compound phase or a Mg—Al—Si intermetallic compound phase is finely dispersed in a Zn—Al—Mg alloy layer, a coating layer is finely cracked in any processing situation. Therefore, the alloy layer is less susceptible to the strength of a processed portion.

Next, a Ca—Zn—Al intermetallic compound phase will be described.

In a case in which the Ca concentration is from 0.05% to 3.00% (preferably from 0.10% to 1.00%), there is sufficient Ca for Sn, indicating that there is no position for Mg substitution in a fine MCSB phase, and thus, Ca may bind to Zn and Al in a Zn—Al—Mg alloy layer. This is because Ca originally tends to bind to Zn so as to form a Ca—Zn intermetallic compound phase (such as the $CaZn_2$ phase, $CaZn_5$ phase, or $CaZn_{11}$ phase). In a case in which the Ca concentration is high, as segregation is highly likely to occur, an intermetallic compound phase in which binding takes place is not limited to any of the above kinds. In the case of the chemical composition according to the disclosure, a Ca—Zn—Al intermetallic compound phase in which Zn in a Ca—Zn metallic phase is substituted by Al (hereinafter also referred to as "CZA phase") is formed.

A CZA phase has little effect on imparting sacrificial corrosion protection ability. However, once a CZA phase is contained in a Zn—Al—Mg alloy layer, plain surface corrosion resistance is improved. In addition, in a case in which a CZA phase is deposited, the hardness of a coating layer slightly increases because a soft Al phase decreases, resulting in the improvement of wear resistance. In general, as plain surface corrosion resistance is improved, elution of constituent elements of a coating layer having the antirust effects is reduced, resulting in reduction of the sacrificial corrosion protection effects. However, since a CZA phase has no influence on the elution of a fine MCSB phase, it does not cause reduction of sacrificial corrosion protection ability.

In particular, when a CZA phase having a grain size 1 μm or more is present in a cross-section of a Zn—Al—Mg alloy layer with an area fraction of 5% or more (preferably 10% or more) with respect to the cross-section of the Zn—Al—Mg alloy layer, plain surface corrosion resistance is improved. For example, the amount of white rust formed in a salt spray test (SST) that is an accelerated corrosion test decreases.

Meanwhile, when the area fraction of a CZA phase having a grain size of 1 μm or more exceeds 5.0%, conversely, corrosion resistance tends to decrease. In addition, since a CZA phase is originally a very hard phase, Vickers hardness of a coating layer sharply increases, and processability tends to decrease. Accordingly, the lower limit value of the area fraction of a CZA phase having a grain size of 1 μm or more is preferably 5.0% or less, more preferably 2.0% or less.

The upper limit of the grain size of such a CZA phase is not limited, but it is, for example, 10 μm or less.

A CZA phase usually may have a different shape (such as a cubic, needle-like, rod-like, or amorphous shape) in a Zn—Al—Mg alloy layer. When a CZA phase is formed into a "square, needle, or rod," the length of the longest line (such as a diagonal line) is determined to be the grain size of a Ca—Zn—Al intermetallic compound phase. In a case in which a CZA phase has an "amorphous shape other than a square, needle, or rod shape," the area-equivalent circle diameter is determined to be the grain size of the CZA phase.

It is preferable to confirm the presence of a CZA phase by TEM. In addition, the presence of a CZA phase can also be confirmed by confirming Al that is not detected at a position identical to the Zn position of a Ca—Zn intermetallic compound phase by EPMA. Further, the presence of a CZA phase can be confirmed by X-ray diffraction (XRD) using a Cu-Kα ray.

Usually, the diffraction peaks of CZA in XRD are represented by JCPDS cards: PDF #00-028-0257 for $CaZn_2$ and PDF #00-010-0239 for CaZns. However, CZA-derived differential peaks also appear at 33.3° and 35.0°.

In addition, in a case in which there is sufficient Ca for Sn, $Mg_2Sn$ is substantially changed to have the crystal structure of $Mg_9Sn_5$ as described above. In view of this, it is possible to adopt, as an indicator for the presence of a CZA phase, the detection of the difference peak originating from 10.4° confirmed only in the presence of $Mg_9Sn_5$.

The intensities of these angles can be used as indexes for measuring the degree of formation of a CZA phase with respect to a fine MCSB phase. It has been revealed that the area fraction of the CZA phase is 5% or more when based on an X-ray diffraction image of the surface of the coating layer upon measurement using a Cu-Kα ray with an X-ray output at 40 kV and 150 mA, the value obtained by the following Formula is 0.5 or more: specific intensity I (Ca-ZnAl)={I (10.4° intensity (cps))+I (33.3° intensity (cps)+I (35.0° intensity (cps))}/I (23.3° intensity (cps)).

Next, an MCSB phase (massive MCSB phase) having a grain size of 1 μm or more will be described.

It is desirable that an MCSB phase having a grain size of 1 μm or more is present in a Zn—Al—Mg alloy layer. For example, for a steel product or the like including many exposed portions of a base metal, it is possible to instantly suppress corrosion from an exposed portion of a base metal (steel product) by improving sacrificial corrosion protection ability rather than plain surface corrosion resistance. Therefore, it is preferable to allow an MCSB phase to partially form a large mass rather than to allow the entire MCSB phase to be finely deposited.

When a massive MCSB phase exists, further excellent sacrificial corrosion protection ability can be ensured. Although the upper limit of the grain size of a massive MCSB phase is not particularly limited, it is set to, for example, 20 μm or less.

In a case in which the Sn concentration is strictly controlled (specifically when the Sn content is from 3.00% to 20.00% by mass and Sn and Zn represent their element contents, control is made to satisfy the following Formula: 0.05<Sn/Zn), the concentration of Sn contained in a Zn—Al—Mg alloy layer relatively increases. Accordingly, a massive MCSB phase is deposited in a Zn—Al—Mg alloy layer (see FIGS. 4 and 5). FIGS. 4 and 5 show that a polygonal MCSB phase having a grain size of 1 μm or more is precipitated.

A massive MCSB phase is larger than an MCSB phase having a grain size of less than 1 μm, but often exists in a Zn phase or adjacent to a Zn phase (see FIGS. 4 and 5).

Therefore, a massive MCSB phase is presumed to be formed by aggregation in the precipitation process.

In particular, in order to prolong the antirust period of a base metal (steel product) or the like with further excellent sacrificial corrosion protection ability, it is preferable that a massive MCSB phase is present in a cross-section of a Zn—Al—Mg alloy layer with an area fraction of 3% or more (preferably 5% or more) with respect to the cross-section of the Zn—Al—Mg alloy layer.

Note that although the upper limit of the area fraction of the massive MCSB phase is not particularly limited, it is set to, for example, 20% or less.

Next, a eutectoid structure (hereinafter also referred to as "fine Zn—Al eutectoid structure") having a lamellar spacing of less than 300 nm, which is composed of a Zn phase and an Al phase, will be described.

The chemical composition of the coating layer according to the disclosure contains various alloy components, resulting in high hardness as described above. Processability in the range of constant R values can ensure processability equal to the existing Zn—Al—Mg without powdering. However, for example, in the case of intensified processing such as unbending for which a hard coating layer is disadvantageous, processability becomes slightly inferior.

Note that even in the case of the chemical composition of the coating layer according to the disclosure, it is possible to obtain a coating layer rich in plastic deformability by changing the existence form of a Zn phase and an Al phase in a Zn—Al—Mg alloy layer by a specific manufacturing method. In other words, the coating layer is allowed to include a phase rich in processability.

Specifically, in order to allow the coating layer to contain a phase rich in processability, it is desirable for the coating layer to have a structure in which an Al phase showing dendrite-like growth is lost or reduced while a fine Zn—Al eutectoid structure is increased (see FIGS. 6 and 7).

The fine Zn—Al eutectoid structure has a lamellar structure (also referred to as "labyrinth structure" or "fine three-dimensional mesh structure") and is a eutectoid structure in which a Zn phase and an Al phase are co-deposited alternately at a lamellar spacing of less than 300 nm (see FIG. 7).

When a fine Zn—Al eutectoid structure is present in a cross-section of a Zn—Al—Mg alloy layer with an area fraction of 10% or more (preferably 15% or more) with respect to the cross-section of the Zn—Al—Mg alloy layer, a coating layer has improved processability and shows resistance against powdering, exfoliation, or the like upon intensified processing such as bending/unbending.

Therefore, it is desirable that the fine Zn—Al eutectoid structure is present with an area fraction of 10% or more (preferably 15% or more) with respect to the cross-section of the Zn—Al—Mg alloy layer.

Note that although the upper limit of the area fraction of the fine Zn—Al eutectoid structure is not particularly limited, it is set to, for example, 25% or less.

Next, a Zn—Al—$MgZn_2$ ternary eutectic structure will be described below.

A ternary eutectic structure includes an Al phase, a Zn phase, and a MgZn phase.

The shape of each phase is amorphous because its size changes according to the component composition. However, since the eutectic structure transforms at isothermal temperatures and the migration of elements during solidification is suppressed, individual phases form an intricate shape, and usually each phase is finely deposited (see FIG. 14).

Usually, the respective phases often form a configuration in which a Zn phase is largest and forms an island, a MgZn phase is second-largest and fills a gap between Zn phases, and an Al phase is dispersed as a spot in a $MgZn_2$ phase. A constituent phase which does not change while being deposited in the island form may be a $MgZn_2$ phase or it may be an Al phase or a $MgZn_2$ phase depending on the component composition. The positional relationship depends on component changes immediately before solidification.

A method of specifying a ternary eutectic structure will be described later.

The presence of such a ternary eutectic structure composed of fine phases results in deterioration of plain surface corrosion resistance and processability as mentioned above.

Therefore, the area fraction of a $Zn$—$Al$—$MgZn_2$ ternary eutectic structure is set to from 0% to 5%, preferably from 0% to 2%. The area fraction of a ternary eutectic structure is most preferably 0%.

Next, an example of a method of producing the coated steel product of the disclosure will be described below.

The coated steel product of the disclosure is obtained by forming a coating layer on the surface (one side or both sides) of a coating base material (such as a coating base sheet) by the melt coating method.

A pure metal or alloy of a specific component composition prepared in a vacuum melting furnace or the like is used for a coating bath, blended in a given amount to achieve the target composition, and dissolved in the air. In order to carry out the melt coating method, an operating temperature above the melting point is usually required.

In the preparation of the coated steel product, for example, after rolling by the Sendzimir method, a steel product reduced with hydrogen is directly immersed in the coating bath at 800° C. in a non-oxidizing environment. The sufficient immersion time is usually 0.5 seconds at most while immersion also affects the thickness of an Al—Fe alloy layer as a coating layer. After immersion, the adhesive amount of spraying $N_2$ gas is adjusted.

In the method of producing the coated steel product of the disclosure, temperature control is essential for the coating bath temperature and the solidification process for structure control.

In order to allow a Zn phase to contain a fine MCSB phase, it is necessary to carry out temperature control for the control of the appropriate order of phase solidification, and also for the formation and disappearance of a dendrite structure in an Al phase, formation of a fine structure in a Zn phase and an Al phase.

For example, it is difficult to deduce the solidification process of a quaternary or higher structure including Ca and the like as well as Zn, Al, Mg, and Sn based on the phase diagram, and it is necessary to interpret solidification according to each experiment. The melting point of a fine MCSB phase is about 775° C. (melting point of a $Mg_2Sn$ as a main component), the melting point of Al is 660° C., the melting point of $MgZn_2$ is about 550° C., and the melting point of Zn is 420° C. In addition, the melting point of a CZA phase is 700° C. to 750° C. Although the melting point of a Ca—Al—Si intermetallic compound phase and that of a Mg—Al—Si intermetallic compound phase cannot be clearly defined, each melting point is estimated to be around 700° C. to 1000° C.

Those with high melting points generally tend to be deposited in the early stage of the solidification process, although it depends on the composition. In particular, when the Mg concentration is in a range of 5% or more and the Sn concentration is in a range of 0.5% or more, a fine MCSB phase is more likely to be deposited, and it is deposited earlier (at high temperatures) in the solidification process. Cooling performed in such a solidification process results in the formation of a liquid phase in which a fine MCSB phase is not sufficiently contained in a Zn phase and the final solidification portion becomes a liquid phase containing Zn, Al, and Mg. Eventually, a $Zn$—$Al$—$MgZn_2$ ternary eutectic structure that degrades plain surface corrosion resistance and processability is also formed.

Here, a fine MCSB phase which is not contained in a Zn phase is localized and coarsely present on the coating layer surface or near the Al—Fe alloy layer. This is particularly likely to occur when the Sn concentration is 3% or more. The reason is that the growth rate of a fine MCSB phase is extremely high. A fine MCSB phase localized on the coating layer surface or near the Al—Fe alloy layer is easily dissolved during corrosion. Therefore, coating exfoliation and the like tend to occur in the corrosion process, which is an unpreferable coating property. Furthermore, an Al phase and a fine MCSB phase are likely to be deposited simultaneously at an Sn concentration of up to 3%, and the fine MCSB phases tend to be surrounded by the Al phase. Therefore, in a case in which a fine MCSB phase is hardly soluble in a coating layer or a case in which Sn cannot achieve a sufficiently high level of sacrificial corrosion protection ability, it may result in a case in which the Sn concentration in the coating layer becomes extremely low such that a $Zn$—$Al$—$MgZn_2$ ternary eutectic structure is likely to be formed.

In other words, in order to allow a fine MCSB phase to properly function, it is desirable to allow a fine MCSB phase to be finely dispersed in a Zn phase.

It has been revealed in terms of the chemical composition of the coating layer according to the disclosure that for example, when the coating bath temperature is set as a coating production condition to the coating bath melting point+20° C., and slow cooling is performed from the coating bath melting point to 150° C. at a cooling rate of from 5° C. to 10° C./sec, a fine MCSB phase is often deposited as a primary crystal and coarsened, which prevents the fine MCSB phase from being deposited in a Zn phase. In other words, the above-described state in which a fine MCSB phase is localized or surrounded by an Al phase is likely to be realized. This means that a fine MCSB phase is less likely to be deposited in a Zn phase upon production under general coating production conditions.

In addition, the coating bath temperature causes a certain change in the coating solidification process, and it is likely to cause a change in the structure formation. It is preferable that regarding coating production conditions, production is carried out under recommended conditions. However, since a coating structure is formed based on a combination of a chemical composition, transformation point (temperature), and a plurality of temperature histories, it is possible to form a structure similar to a recommended structure by procedures other than production procedures recommended below as long as the chemical composition of a coating layer has been determined.

In addition, also under coating production conditions preferable for coating production (for example, 1) the case of coating welding with a top roll, 2) the case of quenching using mist cooling to prevent spangle failures during solidification of a coating layer, or 3) the case of cooling from the coating bath melting point to 150° C. at a cooling rate of 30° C./sec or more after coating treatment at a coating bath temperature (coating bath melting point +20° C.)), an Al phase containing alloy elements, a Zn-oversaturated solid solution of an Al phase (Al phase containing a Zn phase in a large amount), a $MgZn_2$ phase having poor plastic deformability, and the like are formed in large amounts in a Zn—Al—Mg alloy layer, and a fine MCSB phase is not deposited in a Zn phase, resulting in a coating layer having poor processability. This means that although the above-described temperature process conditions correspond to a temperature process that is relatively often considered for melt coating, a fine MCSB phase is unlikely to be deposited in a Zn phase even by such a temperature process.

This is a general solidification phenomenon that for example, elements having higher melting points are deposited earlier, or equilibrium separation does not take a sufficient time. Therefore, in order to allow a fine MCSB phase to be deposited in a Zn phase, it is necessary to allow an Al phase and a $MgZn_2$ phase to be deposited in advance, decrease the Al concentration in a melt, increase the Zn, Mg, and Sn concentrations, melt Mg and Sn in a molten Zn phase (melt other elements such as Ca, in addition to Mg and Sn, according to the purpose), and allow each element to be slowly released along with a decrease in the dissolution limit due to a temperature decrease, thereby allowing the fine MCSB phase to be deposited in the Zn phase. By adopting this solidification process, it is possible to replace a Zn—Al—$MgZn_2$ ternary eutectic structure, which is originally formed as the final solidification portion of a coating, by a fine MCSB phase which is formed by a reaction of deposition from a Zn phase, thereby forming a coating layer with improved processability and corrosion resistance.

In one example to achieve the above, it is preferable to set the coating bath temperature to a temperature higher than the melting point of the coating bath +50° C. or higher, and cool to just below 400° C. by quenching above 25° C./sec. Specifically, it is preferable to set the coating bath temperature to the coating bath melting point +50° C. or more and perform quenching in a temperature range between the coating bath temperature and 375° C. at an average cooling rate of more than 25° C./sec after coating treatment (after raising the steel product from the coating bath). In a case in which the coating bath temperature that is set to the coating bath melting point +50° C. or more reaches a level of less than 500° C., it is preferable to increase the coating bath temperature to 500° C. or more.

Accordingly, the Al phase is solidified as a primary crystal, and then, the $MgZn_2$ phase is solidified. The Zn phase is in the semi-molten state. When the Al phase is deposited, it releases elements as the solid solubility limit decreases sharply. In this state, as the Zn phase is in the liquid state, alloy element migrates into the Zn phase in the molten state. By realizing this state, it is possible to obtain a Zn phase containing oversaturated elements such as Mg, Sn, and Ca. However, in a case in which cooling is performed by quenching to less than 325° C., equilibrium separation of a fine MCSB phase cannot be achieved, and thus, a Zn phase is formed as an oversaturated solid solution. Therefore, a slow cooling solidification temperature range in which a fine MCSB phase is deposited must be provided during the process. In other words, when there is a certain time, a Zn phase in the molten state containing alloy elements, in particular, a large amount of Sn is formed.

In addition, when cooling is performed in a temperature range between the coating bath temperature and 375° C. at a rate of 25° C./sec or less, although a fine MCSB phase is present, the fine MCSB phase cannot be incorporated in a Zn phase, which may prevent the formation of a desired coating layer structure. Further, a ternary eutectic structure is likely to be formed, and therefore, corrosion resistance and sacrificial corrosion protection ability, in particular, long-term sacrificial corrosion protection ability tend to deteriorate.

The temperature range in which a fine MCSB phase is finely and explosively deposited as a result of equilibrium separation from a Zn phase is a temperature range between 375° C. and 325° C. which is a temperature range of 350° C.±25° C. In this temperature range, only the Zn phase is in the semi-molten state in the structure of a coating layer, and elements such as Mg, Ca, and Sn migrate to the Zn phase from the Al phase and the $MgZn_2$ phase with a decrease in the solid solubility limit due to complete solidification. In addition, as the Zn phase is sufficiently softened, elements such as Mg, Ca, and Sn contained therein can be widely dispersed in the grain boundary of the Zn phase along with a decrease in the temperature of the Zn phase. The temperature is also sufficiently high to an extent that allows these elements to be dispersed.

Therefore, cooling is performed in a temperature range between 375° C. and 325° C. at a rate of less than 12.5° C./sec (more preferably 10° C./sec or less, still more preferably 7.5° C./sec or less). Such a temperature history makes it possible to finely disperse a fine MCSB phase in a Zn phase. In a case in which the Sn concentration is high, the finely dispersed fine MCSB phase may partially aggregate and become coarse. When cooling is performed at a cooling rate of 12.5° C./sec or more, a fine MCSB phase cannot be separated and solidified, and an oversaturated solid solution is formed, which may result in extremely poor processability.

In a case in which the Ca concentration is high, a CZA phase is formed. However, a CZA phase is deposited earlier than an Al phase and a $MgZn_2$ phase when the above-described temperature control is carried out, and the CZA phase is mainly formed near the interface. It is thought that this is because there are some factors of early deposition such as high crystal conformation with a base metal.

In a case in which Ca and Si are contained, a Ca—Al—Si intermetallic compound phase and a Mg—Al—Si intermetallic compound phase are formed in a coating layer. These intermetallic compound phases are formed immediately after coating solidification. The size depends on the temperature history up to around 350° C. When the cooling rate during coating solidification is high, an intermetallic compound phase tends to be slightly concentrated near the interface of a coating layer, and an intermetallic compound phase with a small grain size of 1 μm or less is formed in a large amount. Meanwhile, when the cooling rate is small upon coating solidification, an intermetallic compound phase having a grain size of more than 1 μm is also observed, the number of such an intermetallic compound phase decreases, and the intermetallic compound phase is dispersed throughout the coating layer. Usually, it is more preferable for processability of the coating layer that intermetallic compound phases are widely dispersed throughout the Zn—Al—Mg alloy layer. Therefore, the rate of cooling to 350° C. may be set to less than 100° C./sec. In other words, unless the water cooling process and mist cooling process are performed immediately after solidification of the coating layer, these intermetallic compound phases are basically present and widely dispersed in the Zn—Al—Mg alloy layer.

In order to allow a coating layer to have excellent plastic deformability, it is desirable that the above-described Al phase formed by quenching to just below 400° C. which has grown in the dendrite shape (provided that there is no particular concern about a dendrite-shaped Al phase formed by slow cooling) is made to disappear, thereby forming a fine Zn—Al eutectoid structure. In order to realize such a fine Zn—Al eutectoid structure, it is preferable to retain the temperature in a range between 325° C. and 250° C. for more than 20 seconds, preferably more than 60 seconds.

In other words, the average cooling rate in a temperature range between 325° C. to 250° C. is preferably 3.75° C./sec or less. As the retention time in a temperature range between 325° C. and 250° C. is prolonged, the phase amount of a fine Zn—Al eutectoid structure increases. In this temperature range, Zn elements dissolved in the Al phase are released, and eutectoid transformation is induced. Once Zn is released from the Al phase, a part of the dendrite-shaped Al phase is deformed so as to transform to a fine Zn—Al eutectoid structure. When this temperature range is maintained within 20 seconds or less, the content of the fine Zn—Al eutectoid structure tends to decrease.

The Al—Fe alloy layer to be formed on the base metal (steel product) is rapidly formed and grown in a time period of less than 1 second immediately after coating immersion. The growth rate increases as the temperature increases, and the growth rate further increases as the time required for immersion in the coating bath is prolonged. When the Sn concentration reaches 1% or more, the growth rate further increases. Therefore, when the Sn concentration is high, it is necessary to select the appropriate immersion time according to the thickness of a desired Al—Fe alloy layer. Once the coating bath temperature reaches a temperature of less than 500° C., the growth is substantially terminated. Therefore, it is preferable to reduce the immersion time or immediately shift to the cooling process after solidification.

In addition, a coated steel product is solidified once and reheated to remelt the coating layer thereof such that all constituent phases disappear and the coated steel product is in the form of liquid phase. Accordingly, for example, even a coated steel product which has been treated once by quenching or the like can be subjected to structure control as specified herein in the step of appropriate heat treatment by reheating in an off-line mode. In this case, it is preferable to set the temperature for reheating the coating layer to immediately above the melting point of a coating bath, which is in a temperature range in which the Al—Fe alloy layer does not excessively grow.

Next, various measuring methods regarding the characteristics of a coating layer will be described.

The chemical component of a coating layer is measured by the following method.

An acid solution is obtained by exfoliating and dissolving a coating layer with an acid containing an inhibitor that suppresses corrosion of a base metal (steel product). Then, by measuring the obtained acid solution by ICP analysis, it is possible to obtain the chemical composition of the coating layer (in a case in which the coating layer has a single layer structure of a Zn—Al—Mg alloy layer, a case in which the coating layer has the chemical composition of a Zn—Al—Mg alloy layer and the coating layer has a layered structure of an Al—Fe alloy layer and a Zn—Al—Mg alloy layer, a case in which the coating layer has the chemical composition of an Al—Fe alloy layer and a Zn—Al—Mg alloy layer combined together). The acid species is not particularly limited as long as an acid can dissolve the coating layer. The chemical composition is measured as an average chemical composition.

When it is desirable to obtain the respective chemical compositions of the Al—Fe alloy layer and the Zn—Al—Mg alloy layer, a calibration curve of quantitative analysis of each element by GDS (high frequency glow discharge spectrometry) is obtained. Thereafter, the chemical component in the depth direction of the target coating layer can be measured. For example, several 30-mm square pieces are taken from a sample of the prepared coated steel sheet and used as GDS samples. Argon ion sputtering is performed from the surface layer of the coating layer so as to obtain an element intensity plot in the depth direction. Further, a standard sample of a pure metal sheet of each element is prepared and an element intensity plot is obtained in advance. Thus, it is possible to convert the concentration from the intensity plot. In a case in which GDS is used for analysis of the chemical composition, it is preferable to set the analysis area to φ4 mm or more, perform measurement 10 times or more, and adopt the average value of the component at each location.

The sputtering rate is preferably in a range of from about 0.04 to 0.1 am/sec. In a case in which the component analysis value of the Zn—Al—Mg alloy layer portion is adopted at each GDS analysis point, in order to eliminate the influence of the oxidized layer as the top surface layer, it is preferable to ignore the component plot at a depth of 1 am of the surface layer and adopt the component average value of each element concentration at a depth of from 1 to 10 μm (5-μm width).

In a case in which the chemical composition of an Al—Fe alloy layer is determined, a position where the Fe element intensity is 95% or more of the entire element analysis is designated as the position of the interface between a base metal (steel product) and a coating layer (Al—Fe alloy layer), and the coating layer surface side from the interface position is designated as an Al—Fe alloy layer. In addition to the above, the average component value at each element concentration with a width corresponding to the thickness width of the Al—Fe alloy layer is adopted based on the matching with the thickness of the Al—Fe alloy layer obtained by SEM observation or the like.

It is also possible to easily obtain individual chemical compositions of the Al—Fe alloy layer and the Zn—Al—Mg alloy layer from quantitative analysis values using EPMA.

A method of identifying each phase in a Zn—Al—Mg alloy layer (each phase excluding a Zn—Al—MgZn$_2$ ternary eutectic structure) is as follows.

In order to observe the structure of a Zn—Al—Mg alloy layer, it is possible to measure the thickness of an Al—Fe alloy layer and that of an Zn—Al—Mg alloy layer by polish a cross-section of the Zn—Al—Mg alloy layer and observing the structure after nital etching. It is possible to observe the structure of the Zn—Al—Mg alloy layer more precisely by CP processing. It is preferable to use FE-SEM for observation of the Zn—Al—Mg alloy layer.

The area fraction of each phase in a Zn—Al—Mg alloy layer (each phase excluding a Zn—Al—MgZn$_2$ ternary eutectic structure) is measured by the following method.

In order to measure the area fraction of each phase in a Zn—Al—Mg alloy layer, FE-SEM and TEM equipped with EDS (energy dispersive X-ray spectrometry device) are used. An EPMA system may be used for identifying each phase.

An optional section (a section cut in the thickness direction) of a Zn—Al—Mg alloy layer to be measured is processed using CP (CROSS SECTION POLISHER). After processing by CP, an SEM reflection electron image of the Zn—Al—Mg alloy layer section is obtained The SEM reflection electron image is determined to be an image (about the thickness of a Zn—Al—Mg alloy layer in Lm×about 150 µm) obtained when observing three or more areas for area measurement at a magnification of 1000 tunes in an optional square region having a size of about 100 µm or more (thickness direction: selected field of view in which the Zn—Al—Mg alloy layer fits)×2000 µm (in the direction parallel to the surface of a steel product).

Next, an optional section (a section cut in the thickness direction of the Zn—Al—Mg alloy layer) of the same Zn—Al—Mg alloy layer to be measured is processed by FIB (focused ion beam). After FIB processing, an electron diffraction image of a sectional structure of the Zn—Al—Mg alloy layer is obtained by TEM (transmission electron microscope). Thereafter, metals or intermetallic compounds contained in the Zn—Al—Mg alloy layer are identified.

Next, the SEM reflection electron image is compared with the identification results of the TEM electron diffraction image, and each phase of the Zn—Al—Mg alloy layer is identified based on the SEM reflection electron image. In identifying each phase of the Zn—Al—Mg alloy layer, it is recommended that EDS point analysis is performed to compare the results of EDS point analysis with the identification results of the TEM electron diffraction image.

Next, in the SEM reflection electron image, the three values of lightness, hue, and contrast of the gray scale indicated by each phase in the Zn—Al—Mg alloy layer are determined.

The three values of lightness, hue, and contrast indicated by each phase reflect the atomic number of the element contained in each phase. Therefore, in general, a phase having large contents of Al and Mg with small atomic numbers tends to have a black color, and a phase having a large content of Zn tends to have a white color.

Based on the above-described EDS matching results, computer image processing that changes the color only in the range of the above-described three values indicated by each phase contained in the Zn—Al—Mg alloy layer is performed so as to achieve consistency with the SEM reflection electron image (for example, the area (number of pixels) of each phase in the visual field is calculated by displaying only a specific phase as a white image). By performing this image processing for each phase, the area fraction of each phase in the Zn—Al—Mg alloy layer in the SEM reflection electron image is determined.

The area fraction of each phase of the Zn—Al—Mg alloy layer is determined to be the average value of area fraction of each phase obtained by the above-described operation in at least three fields of view of an optional cross-section of the Zn—Al—Mg alloy layer (a section obtained by cutting in the thickness direction of the Zn—Al—Mg alloy layer).

The area fraction of a Zn phase including a fine MCSB phase is determined to be the area fraction of a Zn phase including a fine MCSB phase, which is a Zn phase in which the fine MCSB phase has been confirmed in the closed Zn phase region.

In addition, "the area fractions of a Zn phase, a $MgZn_2$ phase, and an Al phase" are area fractions other than the area fractions of "an Al phase and a Zn phase" present in the fine Zn—Al eutectoid structure and "a $MgZn_2$ phase, an Al phase, and a Zn phase" present in the Zn—Al—$MgZn_2$ ternary eutectic structure.

Here, as shown in FIGS. 2 and 4, every SEM image of the cross-section of a Zn—Al—Mg alloy layer was taken as a reflection electron image. Usually, phases constituting a Zn—Al—Mg alloy layer (such as an Al phase, a $MgZn_2$ phase, and a Zn phase) can be readily distinguished because their atomic numbers are obviously different.

A fine MCSB phase and a massive MCSB phase contained in a Zn phase can also be easily distinguished because, as compared to the Zn phase, Mg and Sn having small atomic numbers are bound to each other, and thus, they can be confirmed with darker contrast than the Zn phase.

Other intermetallic compound phases (such as a Ca—Al—Si intermetallic compound phase, a Mg—Al—Si intermetallic compound phase, and a CAZ phase) may show contrast similar to that of a $MgZn_2$ phase. However, these phases can be relatively easily distinguished because of their unique shapes.

For the area fraction of each phase, a phase that falls within the range of the grain size of interest is selected, and the area fraction thereof is determined.

In a case in which it is difficult to distinguish each phase, electron beam diffraction by TEM or EDS point analysis is performed.

Each of an Al phase, a $MgZn_2$ phase, a Zn phase, and a CZA phase is often observed with a grain size of 1 µm or more and easily identified using EDS. A Ca—Al—Si intermetallic compound phase and a Mg—Al—Si intermetallic compound phase also vary in shape. However, usually, each of them is often observed in a size of 1 µm or more, and is easily identified using EDS.

Here, for the area ratio of a fine MCSB phase having a grain size of less than 1 µm in a Zn phase (in other words, the area fraction of a fine MCSB phase having a grain size of less than 1 µm with respect to a Zn phase containing a fine MCSB phase), the magnification of the field of view used herein is 10000 times because the fine MCSB phase is finely deposited in a distributed manner in the Zn phase. When observing a Zn phase in a field of view with a magnification of about 10000 times, it is possible to easily confirm a fine MCSB phase contained in the Zn phase and also the grain size thereof.

The area fraction of a fine MCSB phase is determined in a field of view of 3 µm×3 µm (magnification of 10000 times) including the Zn phase. The same operation is performed in 20 fields of view or more. The average value of the obtained area fractions is determined to be the area fraction of the fine MCSB phase in the Zn phase.

The average grain size of the fine MCSB phase in the Zn phase is measured by the following method.

Upon SEM observation for measuring the area fraction of the fine MCSB phase described above, among the recognized fine MCSB phases, fine MCSB phases having the top 5 grain sizes of less than 1 µm are selected. This operation is performed for 5 fields of view.

The arithmetic average of 25 grain sizes in total is determined to be the average grain size of a fine MCSB phase having a grain size of less than 1 µm.

In other words, the average grain size of a fine MCSB phase means the average grain size for a phase having a grain size of less than 1 µm even in a case in which a massive MCSB phase (massive Mg—Sn intermetallic compound phase) having a grain size of 1 µm or more is included therein.

The average grain size of a Ca—Al—Si intermetallic compound phase and that of a Mg—Al—Si intermetallic compound phase are measured by the following method.

Upon SEM observation for measuring the area fraction of each phase described above, among the confirmed compound phases, compound phases having the top 5 grain sizes are selected. This operation is performed for 5 fields of view. The arithmetic average of 25 grain sizes in total is determined to be the average grain size of a Ca—Zn—Al intermetallic compound phase or that of a Ca—Zn—Al—Si intermetallic compound phase.

The fine Zn—Al eutectoid structure (eutectoid structure having a lamellar spacing of less than 300 nm composed of a Zn phase and an Al phase) is identified and the area fraction thereof is determined by the following method.

A structure in which two phases, an Al phase and a Zn phase, are co-deposited is identified based on an SEM reflection electron image by the same method as measuring the area fraction of each phase in the Zn—Al—Mg alloy layer (see FIGS. 6 and 7). A part of the structure is observed in a rectangular field of view having a size of 3 μm×4 μm (5-μm diagonal line) at a magnification of 30000 times (see FIG. 13). At this time, when two diagonal lines are drawn in a rectangular field of view, the observed structure is determined to be a fine Zn—Al eutectoid structure in a case in which each diagonal line crosses a Zn phase and an Al phase 10 times or more, and the average value of the center-to-center distance between two adjacent Zn phases via an Al phase, which is a diagonal length, is less than 300 nm.

Next, the above-described operation is repeatedly performed on the SEM reflection electron image (image having a size of thickness of the Zn—Al—Mg alloy layer×about 150 μm observed at a magnification of 1000 times) the same as used for measurement of the area fraction of each phase in the Zn—Al—Mg alloy layer so as to confirm continuity of the fine Zn—Al eutectoid structure and understand the contour of the fine Zn—Al eutectoid structure (region). Then, the area fraction of the fine Zn—Al eutectoid structure in the Zn—Al—Mg alloy layer in the obtained SEM reflection electron image is determined.

The area fraction of the fine Zn—Al eutectoid structure is determined to be the average area fraction of the fine Zn—Al eutectoid structure obtained by the above-described operation in at least three fields of view of an optional cross-section of the Zn—Al—Mg alloy layer (section obtained by cutting in the thickness direction of the Zn—Al—Mg alloy layer).

The Zn—Al—$MgZn_2$ ternary eutectic structure in the Zn—Al—Mg alloy layer is identified and the area fraction thereof is measured by the following methods.

A structure in which three phases, an Al phase, a Zn phase, and a $MgZn_2$ phase, are co-deposited is identified based on an SEM reflection electron image by the same method as measuring the area fraction of each phase in the Zn—Al—Mg alloy layer. A part of the structure is observed in a rectangular field of view having a size of 3 μm×4 μm (5-μm diagonal line) at a magnification of 30000 times (see FIG. 14). At this time, when two diagonal lines are drawn in a rectangular field of view, the structure is determined to be a ternary eutectic structure in a case in which each diagonal line crosses the Zn phase 5 times or more and the $MgZn_2$ phase or Al phase extending around the Zn phase 5 times or more. This determination is based on that the structure is a "structure in which three phases are each finely dispersed" particular to a ternary eutectic structure.

Note that the structure is determined to be a ternary eutectic structure in a case in which the ternary eutectic structure is localized, a case in which the ternary eutectic structure cannot have a region of 3 μm×4 μm because of a composition that is unlikely to form a ternary eutectic structure, or a case in which the structure is divided into 1-μm square grids, and each grid contains at least one of each phase.

Next, the above-described operation is repeatedly performed on the SEM reflection electron image (image having a size of thickness of the Zn—Al—Mg alloy layer×about 150 μm observed at a magnification of 1000 times) the same as used for measurement of the area fraction of each phase in the Zn—Al—Mg alloy layer so as to confirm continuity of the ternary eutectic structure and understand the contour of the ternary eutectic structure (region). The area fraction of the ternary eutectic structure in the Zn—Al—Mg alloy layer in the SEM reflection electron image is determined.

The area fraction of the ternary eutectic structure is determined to be the average area fraction of the ternary eutectic structure obtained by the above-described operation in at least three fields of view of an optional cross-section of the Zn—Al—Mg alloy layer (section obtained by cutting in the thickness direction of the Zn—Al—Mg alloy layer).

Next, X-ray diffraction (XRD) measurement conditions will be described.

Regarding the X-ray diffraction intensity, Cu, Co, and the like can be used for the radiation source. However, it is eventually required to calculate and change the diffraction angle according to the Cu radiation source. The X-ray output at 40 kV and 150 mA is set.

The measurement range is preferably from 5° to 90°, and the step is preferably about 0.01°. In order to achieve the intensity (cps) at a particular diffraction angle, an average value of around +0.05° is obtained. In other words, for an intensity of 23.3°, an average value of from 22.25° to 22.35° is obtained. It is necessary to obtain each intensity index by not taking measures such as background removal for clarifying the peak before calculating the average value of intensity.

Hereinafter, aftertreatment that can be applied to the coated steel sheet of the disclosure will be described.

A film may be formed on the coating layer of the coated steel sheet of the disclosure.

A film having one or more layers can be formed. Examples of a film formed immediately above the coating layer include, for example, a chromate film, a phosphate film, and a chromate-free film. Chromate treatment, phosphate treatment, and chromate-free treatment for forming these films can be carried out by known methods.

Examples of chromate treatment include electrolytic chromate treatment to form a chromate film by electrolysis, reactive chromate treatment to form a film using a reaction with a material and then wash away an excess treatment solution, and coating-type chromate treatment to apply a treatment solution to a coated object and dry the solution to form a film without washing with water. Any of the treatments can be adopted.

An example of electrolytic chromate treatment is electrolytic chromate treatment using chromic acid, silica sol, a resin (such as phosphoric acid, acrylic resin, vinyl ester resin, vinyl acetate acrylic emulsion, carboxylated styrene butadiene latex, or diisopropanolamine-modified epoxy resin), and hard silica.

Examples of phosphate treatment include, for example, zinc phosphate treatment, zinc calcium phosphate treatment, and manganese phosphate treatment.

Chromate-free treatment is particularly suitable because it is free of environmental burden. Examples of chromate-free treatment include electrolytic chromate-free treatment to form a chromate-free film by electrolysis, reactive chromate-free treatment to form a film using a reaction with a material and then wash away an excess treatment solution, and coating-type chromate-free treatment to apply a treatment solution to an coated object and dry the solution to form a film without washing with water. Any of the treatments can be adopted.

In addition, one or more layers of an organic resin film may be provided on the film immediately above the coating layer. The organic resin is not limited to a specific type, and examples thereof include, for example, polyester resin, polyurethane resin, epoxy resin, acrylic resin, polyolefin resin, and denatured products of these resins. Here, the term "denatured product" refers to a resin obtained by reacting a reactive functional group contained in the structure of any of these resins with a different compound (such as a monomer or a crosslinking agent) containing a functional group capable of reacting with the functional group.

As such an organic resin, one or more types of organic resins (non-denatured) may be mixed for use, or one or more types of organic resins obtained by denaturing at least one different organic resin in the presence of at least one organic resin may be mixed and used in combination. In addition, an organic resin film may optionally contain a coloring pigment and/or an antirust pigment. It is also possible to use a water-based organic resin obtained by dissolving or dispersing the resin in water.

EXAMPLES

Examples of the disclosure will be described. However, the conditions in the examples are adopted in conditional examples to confirm the feasibility and effects of the disclosure, and the disclosure is not limited to the conditional examples. The disclosure can adopt various conditions as long as the purpose of the disclosure is achieved without departing from the scope of the disclosure.

Example A

In order to obtain coating layers of the chemical compositions shown in Tables 1-1 to 1-8, a given amount of pure metal ingot was used and melted in a vacuum melting furnace, followed by initial make-up of coating bath in the air. For preparation of coated steel sheets, a batch-type melt coating system was used.

No. 119 is a commercially available Zn—Al—Mg-based coated steel sheet prepared as a comparative material. 2.3-mm general hot-rolled carbon steel (C concentration of <0.1%) was used for a coating base sheet, and degreasing and pickling were performed immediately before the coating step.

In any sample preparation, the same reduction treatment method was applied to the coating base sheet until immersion in the coating bath. In other words, the coating base sheet was heated from room temperature to 800° C. by electric heating in a $N_2$—$H_2$ (5%) environment (dew point of −40° C. or less, oxygen concentration of less than 25 ppm), retained for 60 seconds, cooled to the coating bath temperature+10° C. by $N_2$ gas spraying, and immediately immersed in the coating bath. The coating bath immersion time for each coating steel sheet was set to 1 second. The $N_2$ gas wiping pressure was adjusted to prepare a coated steel sheet such that the coating thickness was set to 30 μm (±1 μm).

The coating step was carried out in the five different ways described below.

Production method A: The coating bath temperature was set to the melting point of the coating bath +20° C. The coating bath immersion time was set to 1 second. A coating layer was obtained in the cooling process in which after raising the coating base sheet from the coating bath, the average rate of cooling from the coating bath temperature to 375° C. was set to 20(±5)° C./sec, the average rate of cooling from 375° C. to 325° C. was set to 15(±2.5)° C./sec, the average rate of cooling from 325° C. to 250° C. was set to 12.5(±2.5)° C./sec, and the average rate of cooling from 250° C. to 100° C. was set to from 5° C. to 12° C./sec.

Production method B: The coating bath temperature was set to the coating bath melting point +50° C. (note that in a case in which the temperature was less than 500° C., it was set to 500° C.). The coating bath immersion time was set to 1 second. A coating layer was obtained in the cooling process in which after raising the coating base sheet from the coating bath, the average rate of cooling from the coating bath temperature to 375° C. was set to 20(±5)° C./sec, the average rate of cooling from 375° C. to 325° C. was set to 10(±2.5)° C./sec, the average rate of cooling from 325° C. to 250° C. was set to 5(±1.25)° C./sec, and the average rate of cooling from 250° C. to 100° C. was set to from 5° C. to 12° C./sec.

Production method C: The coating bath temperature was set to the coating bath melting point +50° C. (note that in a case in which the temperature was less than 500° C., it was set to 500° C.). The coating bath immersion time was set to 1 second. A coating layer was obtained in the cooling process in which after raising the coating base sheet from the coating bath, cooling was performed at an average cooling rate of 30(±5)° C./sec from the coating bath temperature to 375° C., and then cooling by mist cooling was immediately performed at an average cooling rate of from 12.5° C. to 1000° C./sec or more from 375° C. to 25° C.

Production method D: The coating bath temperature was set to the coating bath melting point +50° C. (note that in a case in which the temperature was less than 500° C., it was set to 500° C.). The coating bath immersion time was set to 1 second. A coating layer was obtained in the cooling process in which after raising the coating base sheet from the coating bath, the average rate of cooling from the coating bath temperature to 375° C. was set to 30(±5)° C./sec, the average rate of cooling from 375° C. to 325° C. was set to 10(±2.5)° C./sec, the average rate of cooling from 325° C. to 250° C. was set to 5(±1.25)° C./sec, and the average rate of cooling from 250° C. to 100° C. was set to from 5° C. to 12° C./sec.

Production method E: The coating bath temperature was set to the coating bath melting point +50° C. (note that in a case in which the temperature was less than 500° C., it was set to 500° C.). The coating bath immersion time was set to 1 second. A coating layer was obtained in the cooling process in which after raising the coating base sheet from the coating bath, the average rate of cooling from the coating bath temperature to 375° C. was set to 30(±5)° C./sec, the average rate of cooling from 375° C. to 325° C. was set to 10(±2.5) ° C./sec, the average rate of cooling from 325° C. to 250° C. was set to 2.5(±1.25)° C./sec, and the average rate of cooling from 250° C. to 100° C. was set to from 5° C. to 12° C./sec.

—X-Ray Diffraction Analysis—

A 20×20 mm square was cut out from each resulting coated steel sheet, and an X-ray diffraction image from the surface of the coating layer was obtained. Measurement conditions included the use of an X-ray diffractometer (RINT 1500) and RINT 1000 wide-angle goniometer manufactured by Rigaku Corporation with an X-ray output at 40 kV and 150 mA, scan speed of 2°/min, and a step of 0.01° in a scan range of from 5° to 90°. The incident slit was set to 10, and the light receiving slit was set to 10, 0.15 mm. Specific intensity I (fine MCSB phase), specific intensity I (MgCaSn+Mg$_9$Sn$_5$), and specific intensity I (CaZnAl) (written as I (MCSB), I (MgCaSn), and I (CaZnAl), respectively, in Tables) were calculated.

In addition, for I (MgCaSn) in Table 1, when the amount of MCSB phase was small and the numerical value could not be calculated, it was written as "-." I (23.3° intensity (cps)) is also shown in the column of "I (23.3°)" in Table 1.

A 20×20 mm square was cut out from the resulting coated steel sheet, and the position of a diffraction peak of the strongest intensity around between 23.00° and 23.46° was determined based on the X-ray diffraction image from the coating layer surface. In a case in which a diffraction peak of the strongest intensity appeared in a range between 23.36° and 23.46°, it was written as "OK," and in a case in which such a diffraction peak was not obtained, it was written as "NG."

—Measurement of Area Fraction of Each Phase—

A sample piece having a cross-section of the coating layer (section cut along the thickness direction of the coating layer) was cut out from each obtained coated steel sheet. The area fractions of the following phases present in the Zn—Al—Mg alloy layer were measured according to the method described above.

Area fraction of a Zn phase including a fine MCSB phase (written as "Zn+MCSB" in Tables)
Area fraction of a fine MCSB phase contained in a Zn phase (written as "MCSB/Zn" in Tables)
Area fraction of a fine Zn—Al eutectoid structure (written as "ZnAl fine structure" in Tables)
Area fraction of an Al phase
Area fraction of a MgZn$_2$ phase
Area fraction of a Zn—Al—MgZn$_2$ ternary eutectic structure (written as "ternary eutectic structure" in Tables)

—Measurement of Average Grain Size of Fine MCSB Phase Contained in Zn Phase—

A sample piece having a cross-section of the coating layer (section cut along the thickness direction of the coating layer) was cut out from each obtained coated steel sheet. The average grain size of the fine MCSB phase contained in the Zn phase was determined according to the method described above. The average grain size of the fine MCSB phase is shown in the column of "Dc of MCSC/Zn" for the area fraction.

—Flat Surface Corrosion Resistance—

To compare the plain surface corrosion resistance, each production sample was subjected to 60 cycles of an accelerated corrosion test (JASO M609-91) to remove white rust, and the plain surface corrosion resistance was evaluated based on the thickness reduction due to corrosion. Pass criteria were determined based on the commercially available Zn—Al—Mg-based coated steel sheet (comparative material No. 119), and a thickness reduction of less than 10 μm, which was smaller than the amount of corrosion of the Zn—Al—Mg-based coated steel sheet, was evaluated as "A," and a thickness reduction of 10 μm or more was evaluated as "B."

—Cut End Surface Corrosion Resistance—

To compare the cut end surface corrosion resistance, a 2.3-mm thick material (25 μm) was sheared into a 30 mm square and placed in a constant temperature and humidity chamber (placed flat, horizontally (0°)). A cycle was as follows: (50° C., 99%, 24 hours)→transition for 6 hours→ (50° C., 35%, 66 hours). An appearance test was conducted after one cycle, the average red rust area fraction of the cut end surface of the coated steel sheet was obtained from the four-sided cut cross-section of the coated steel sheet. Pass criteria were determined based on the commercially available Zn—Al—Mg-based coated steel sheet (comparative material No. 119), and the red rust area fraction at the bottom of the cut end surface was measured.

In other words, a red rust area fraction of 70% or more, which was greater than the red rust area fraction of the Zn—Al—Mg-based coated steel sheet, was evaluated as "B," a red rust area fraction of from 35% to 70% was evaluated as "A," a red rust area fraction of from 10% to 35% was evaluated as "AA," and a red rust area fraction of less than 10% was evaluated as "AAA."

The red rust area fraction at the bottom of the cut end surface after the elapse of 5 cycles of the same cycle type was also measured. A red rust area fraction of 90% or more, which was greater than the red rust area fraction of the commercially available Zn—Al—Mg-based coated steel sheet, was evaluated as "B," a red rust area fraction of from 45% to 90% was evaluated as "A," and a red rust area fraction of less than 45% was evaluated as "AAA."

—Corrosion Potential—

The corrosion potential of the coated steel sheet was measured in a 5% aqueous NaCl solution using Ag/AgCl as a reference electrode and an electrochemical measurement cell. The average value of the corrosion potential was measured for 30 seconds immediately after immersion.

—Salt Spray Test (written as "SST" in Tables)—

To evaluate white rust resistance of the plain surface of the coated steel sheet, the coated steel sheet was subjected to a salt spray test (JIS Z 2371) to measure the coated-surface white rust area fraction after 120 hours. Pass criteria were determined based on the commercially available Zn—Al—Mg-based coated steel sheet (comparative material No. 119), and a white rust area fraction of 50% or more, which was greater than a white rust area fraction of 50% for the Zn—Al—Mg-based coated steel sheet, was evaluated as "B," a white rust area fraction of from 20% to 50% was evaluated as "A," and a white rust area fraction of less than 20% was evaluated as "AAA."

To evaluate processability of the coating layer, the coated steel sheet was subjected to a 5R-90° V-bending test, and cellophane tape having a width of 24 mm was pressed against and pulled away from a V-shaped valley fold so as to visually judge powdering.

A case in which the powder exfoliated due to powdering was adhering to the tape was evaluated as "B."

A case in which the powder exfoliated due to powdering was adhering in spots to the tape was evaluated as "A."

A case in which powdering exfoliation did not occur was evaluated as "AAA."

—Powdering—

In order to evaluate further intensified processing, after molding with a 2R-90° V-shaped die press, unbending processing was further performed on a flat plate with a flat die. After V-shaped processing, cellophane tape having a width of 24 mm was pressed against and pulled away from a valley fold so as to visually judge powdering.

A case in which no exfoliation part was generated was evaluated as "AAA."

A case in which exfoliation parts were partially observed as spots was evaluated as "A."

A case in which exfoliation parts were observed as lines was evaluated as "B."

—Draw Bead Test—

A draw bead test was performed to evaluate processability of the coating layer. The pressing load was set to 3, 6, and 9 kN, and NOX-RUST 550 NH was used as oil at a drawing speed of 100 mm/min, and mold SKD (R=4) was used. In a case in which the dynamic friction coefficient of the existing Zn—Al—Mg-based coated steel sheet was less than 0.12 with no galling, it was evaluated as "A," and in a case in which the dynamic friction coefficient was 0.12 or galling was observed, it was evaluated as "B."

—Coating Layer Hardness (Vickers Hardness)—

The coating layer hardness of each coated steel sheet was measured using a Vickers hardness tester (MITUTOYO-HM221) to measure the hardness from the coated surface side. The test load was set to 10 gf, and the 50 point average value was measured.

Tables 1-1 to 1-12 show lists of Example A.

TABLE 1-1

| No. | Category | Coating bath melting point (°C) | Coating bath temperature (°C) | Production method | Component (mass %) |||||||||||||||||||||||
|---|---|---|---|---|---|---|---|---|---|---|---|---|---|---|---|---|---|---|---|---|---|---|---|---|---|---|---|
| | | | | | Zn | Al | Mg | Sn group ||| Ca group ||||| Cr group ||||||||| Sr group ||||
| | | | | | | | | Sn | Bi | In | Ca | Y | La | Ce | Si | Cr | Ti | Ni | Co | V | Nb | Cu | Mn | Fe | Sr | Sb | Pb | B |
| A1 | C | 380 | 500 | Production method D | 87.7 | 5 | 5 | 1 | 0.2 | 0 | 0.1 | 0 | 0 | 0 | 0 | 0 | 0 | 0 | 0 | 0 | 0 | 0 | 0 | 1 | 0 | 0 | 0 | 0 |
| A2 | E | 380 | 500 | Production method D | 84.8 | 5.5 | 3.5 | 5 | 0 | 0 | 0.5 | 0.1 | 0 | 0 | 0 | 0 | 0 | 0 | 0 | 0 | 0 | 0 | 0 | 0.2 | 0 | 0 | 0.4 | 0 |
| A3 | E | 380 | 500 | Production method D | 85.2 | 5.5 | 3.5 | 5 | 0 | 0 | 0.5 | 0.1 | 0 | 0 | 0 | 0 | 0 | 0 | 0 | 0 | 0 | 0 | 0 | 0.2 | 0 | 0 | 0 | 0.4 |
| A4 | E | 370 | 500 | Production method D | 87.5 | 5.5 | 4 | 2 | 0 | 0 | 0 | 0.1 | 0 | 0 | 0 | 0 | 0 | 0 | 0 | 0 | 0 | 0 | 0 | 1 | 0 | 0 | 0 | 0 |
| A5 | C | 380 | 500 | Production method D | 84.4 | 5.5 | 3.5 | 5 | 0 | 0 | 0.5 | 0.1 | 0 | 0 | 0 | 0 | 0 | 0 | 0 | 0 | 0 | 0 | 0 | 0.5 | 0 | 0 | 0.5 | 0 |
| A6 | C | 380 | 500 | Production method D | 84.9 | 5.5 | 3.5 | 5 | 0 | 0 | 0.5 | 0 | 0 | 0 | 0 | 0 | 0 | 0 | 0 | 0 | 0 | 0 | 0 | 0.5 | 0 | 0 | 0 | 0.5 |
| A7 | E | 355 | 500 | Production method D | 69 | 6 | 4.5 | 20 | 0 | 0 | 0 | 0 | 0 | 0 | 0 | 0 | 0 | 0 | 0 | 0 | 0 | 0 | 0 | 0.5 | 0 | 0 | 0 | 0 |
| A8 | E | 410 | 500 | Production method D | 84.4 | 9 | 4.5 | 1 | 0 | 0 | 0.1 | 0 | 0 | 0 | 0 | 0 | 0 | 0 | 0 | 0 | 0 | 0 | 0 | 1 | 0 | 0 | 0 | 0 |
| A9 | C | 410 | 430 | Production method A | 84.4 | 9 | 4.5 | 1 | 0 | 0 | 0.1 | 0 | 0 | 0 | 0 | 0 | 0 | 0 | 0 | 0 | 0 | 0 | 0 | 1 | 0 | 0 | 0 | 0 |
| A10 | C | 410 | 500 | Production method B | 84.4 | 9 | 4.5 | 1 | 0 | 0 | 0.1 | 0 | 0 | 0 | 0 | 0 | 0 | 0 | 0 | 0 | 0 | 0 | 0 | 1 | 0 | 0 | 0 | 0 |
| A11 | C | 410 | 500 | Production method C | 84.4 | 9 | 4.5 | 1 | 0 | 0 | 0.1 | 0 | 0 | 0 | 0 | 0 | 0 | 0 | 0 | 0 | 0 | 0 | 0 | 1 | 0 | 0 | 0 | 0 |
| A12 | E | 410 | 500 | Production method D | 84.1 | 9 | 4.5 | 1 | 0 | 0 | 0.1 | 0 | 0 | 0 | 0 | 0 | 0 | 0 | 0 | 0 | 0 | 0 | 0 | 1 | 0.1 | 0.1 | 0.1 | 0 |
| A13 | C | 410 | 500 | Production method D | 83.8 | 9 | 4.5 | 1 | 0 | 0 | 0.1 | 0 | 0 | 0 | 0 | 0 | 0 | 0 | 0 | 0 | 0 | 0 | 0 | 1 | 0.2 | 0.2 | 0.2 | 0 |
| A14 | E | 400 | 500 | Production method D | 79.7 | 10 | 6 | 4 | 0 | 0 | 0 | 0 | 0 | 0 | 0 | 0 | 0 | 0 | 0 | 0 | 0 | 0 | 0 | 0.3 | 0 | 0 | 0 | 0 |
| A15 | C | 410 | 500 | Production method D | 84.6 | 10 | 4.5 | 0.2 | 0 | 0 | 0 | 0 | 0 | 0 | 0.3 | 0 | 0 | 0 | 0 | 0 | 0 | 0 | 0 | 0.4 | 0 | 0 | 0 | 0 |
| A16 | E | 410 | 500 | Production method D | 83.9 | 10 | 4.5 | 0.5 | 0 | 0 | 0 | 0 | 0 | 0 | 0.3 | 0 | 0 | 0 | 0 | 0 | 0 | 0 | 0 | 0.4 | 0 | 0.4 | 0 | 0 |
| A17 | C | 410 | 500 | Production method D | 83.8 | 10 | 4.5 | 0.5 | 0 | 0 | 0 | 0 | 0 | 0 | 0.3 | 0 | 0 | 0 | 0 | 0 | 0 | 0 | 0 | 0.4 | 0 | 0.5 | 0 | 0 |
| A18 | E | 410 | 500 | Production method D | 83.8 | 10 | 4.5 | 1 | 0 | 0 | 0 | 0 | 0 | 0 | 0.3 | 0 | 0 | 0 | 0 | 0 | 0 | 0 | 0 | 0.4 | 0 | 0 | 0 | 0 |

TABLE 1-1-continued

| No. | Category | Coating bath melting point (°C) | Coating bath temperature (°C) | Production method | Zn | Al | Mg | Sn | Bi | In | Ca | Y | La | Ce | Si | Cr | Ti | Ni | Co | V | Nb | Cu | Mn | Fe | Sr | Sb | Pb | B |
|---|---|---|---|---|---|---|---|---|---|---|---|---|---|---|---|---|---|---|---|---|---|---|---|---|---|---|---|---|
| A19 | E | 405 | 500 | Production method D | 82.8 | 10 | 4.5 | 2 | 0 | 0 | 0 | 0 | 0 | 0 | 0.3 | 0 | 0 | 0 | 0 | 0 | 0 | 0 | 0 | 0.4 | 0 | 0 | 0 | 0 |
| A20 | E | 400 | 500 | Production method D | 78.47 | 11 | 5 | 5 | 0 | 0 | 0.03 | 0 | 0 | 0 | 0 | 0 | 0 | 0 | 0 | 0 | 0 | 0 | 0 | 0.5 | 0 | 0 | 0 | 0 |
| A21 | C | 410 | 500 | Production method D | 77.25 | 11 | 5 | 5 | 0 | 0 | 0.05 | 0.7 | 0 | 0 | 0 | 0 | 0 | 0 | 0 | 0 | 0 | 0 | 0 | 1 | 0 | 0 | 0 | 0 |
| A22 | E | 420 | 500 | Production method D | 81.85 | 11 | 6 | 0.1 | 0 | 0 | 0.05 | 0 | 0 | 0 | 0 | 0 | 0 | 0 | 0 | 0 | 0 | 0 | 0 | 1 | 0 | 0 | 0 | 0 |
| A23 | E | 420 | 500 | Production method D | 78.7 | 11 | 6 | 0.3 | 0 | 0 | 3 | 0 | 0 | 0 | 0 | 0 | 0 | 0 | 0 | 0 | 0 | 0 | 0 | 1 | 0 | 0 | 0 | 0 |
| A24 | E | 420 | 500 | Production method E | 78.5 | 11 | 6 | 0.5 | 0 | 0 | 3 | 0 | 0 | 0 | 0 | 0 | 0 | 0 | 0 | 0 | 0 | 0 | 0 | 1 | 0 | 0 | 0 | 0 |
| A25 | C | 420 | 440 | Production method A | 79.5 | 11 | 6 | 0.5 | 0 | 0 | 3 | 0 | 0 | 0 | 0 | 0 | 0 | 0 | 0 | 0 | 0 | 0 | 0 | 1 | 0 | 0 | 0 | 0 |
| A26 | C | 420 | 500 | Production method B | 79.5 | 11 | 6 | 0.5 | 0 | 0 | 3 | 0 | 0 | 0 | 0 | 0 | 0 | 0 | 0 | 0 | 0 | 0 | 0 | 1 | 0 | 0 | 0 | 0 |
| A27 | C | 420 | 500 | Production method C | 79.5 | 11 | 6 | 0.5 | 0 | 0 | 3 | 0 | 0 | 0 | 0 | 0 | 0 | 0 | 0 | 0 | 0 | 0 | 0 | 1 | 0 | 0 | 0 | 0 |
| A28 | E | 420 | 500 | Production method E | 75.5 | 11 | 7 | 4 | 0 | 0 | 1 | 0.5 | 0 | 0 | 0 | 0 | 0 | 0 | 0 | 0 | 0 | 0 | 0 | 1 | 0 | 0 | 0 | 0 |
| A29 | E | 410 | 500 | Production method E | 80.4 | 11 | 5.5 | 2 | 0 | 0 | 0.3 | 0 | 0.2 | 0 | 0.2 | 0 | 0 | 0 | 0 | 0 | 0 | 0 | 0 | 0.4 | 0 | 0 | 0 | 0 |
| A30 | C | 410 | 500 | Production method E | 78.8 | 11 | 5.5 | 2 | 0 | 0 | 1 | 0 | 0.5 | 0.2 | 0 | 0 | 0 | 0 | 0 | 0 | 0 | 0 | 0 | 1 | 0 | 0 | 0 | 0 |

TABLE 1-2

| No. | Category | Coating bath melting point (° C.) | Coating bath temperature (° C.) | Production method | Component (mass %) Zn | Al | Mg | Sn group Sn | Bi | In | Ca group Ca | Y | La | Ce | Si | Cr | Ti | Ni | Cr group Co | V | Nb | Cu | Mn | Fe | Sr group Sr | Sb | Pb | B |
|---|---|---|---|---|---|---|---|---|---|---|---|---|---|---|---|---|---|---|---|---|---|---|---|---|---|---|---|---|
| A31 | E | 410 | 500 | Production method E | 79.1 | 11 | 5.5 | 2 | 0 | 0 | 1 | 0 | 0.4 | 0 | 0 | 0 | 0 | 0 | 0 | 0 | 0 | 0 | 0 | 1 | 0 | 0 | 0 | 0 |
| A32 | C | 410 | 500 | Production method D | 79 | 11 | 5.5 | 2 | 0 | 0 | 0 | 0 | 0 | 0.5 | 0 | 0 | 0 | 0 | 0 | 0 | 0 | 0 | 0 | 1 | 0 | 0 | 0 | 0 |
| A33 | E | 410 | 500 | Production method D | 79.1 | 11 | 5.5 | 2 | 0 | 0 | 1 | 0 | 0 | 0.4 | 0 | 0 | 0 | 0 | 0 | 0 | 0 | 0 | 0 | 1 | 0 | 0 | 0 | 0 |
| A34 | E | 405 | 500 | Production method D | 77.8 | 11 | 5.5 | 5 | 0 | 0 | 0 | 0 | 0 | 0 | 0.2 | 0 | 0 | 0 | 0 | 0 | 0 | 0 | 0 | 0.5 | 0 | 0 | 0 | 0 |
| A35 | E | 405 | 500 | Production method D | 77.6 | 11 | 5.5 | 5 | 0 | 0 | 0 | 0 | 0 | 0 | 0.2 | 0 | 0 | 0 | 0.2 | 0 | 0 | 0 | 0 | 0.5 | 0 | 0 | 0 | 0 |
| A36 | C | 405 | 500 | Production method D | 77.55 | 11 | 5.5 | 5 | 0 | 0 | 0 | 0 | 0 | 0 | 0.2 | 0 | 0 | 0 | 0.25 | 0 | 0 | 0 | 0 | 0.5 | 0 | 0 | 0 | 0 |
| A37 | E | 405 | 500 | Production method D | 77.8 | 11 | 5.5 | 5 | 0 | 0 | 0 | 0 | 0 | 0 | 0.2 | 0 | 0 | 0 | 0 | 0 | 0 | 0 | 0 | 0.5 | 0 | 0 | 0 | 0 |
| A38 | E | 405 | 500 | Production method D | 77.6 | 11 | 5.5 | 5 | 0 | 0 | 0 | 0 | 0 | 0 | 0.2 | 0 | 0 | 0 | 0 | 0.2 | 0 | 0 | 0 | 0.5 | 0 | 0 | 0 | 0 |
| A39 | C | 405 | 500 | Production method D | 77.55 | 11 | 5.5 | 5 | 0 | 0 | 0 | 0 | 0 | 0 | 0.2 | 0 | 0 | 0 | 0 | 0.25 | 0 | 0 | 0 | 0.5 | 0 | 0 | 0 | 0 |
| A40 | C | 415 | 500 | Production method D | 82.5 | 11 | 5.5 | 0 | 0 | 0.5 | 0 | 0 | 0 | 0 | 0 | 0 | 0 | 0 | 0 | 0 | 0 | 0 | 0 | 0.5 | 0 | 0 | 0 | 0 |
| A41 | E | 415 | 500 | Production method D | 81.2 | 11 | 5.5 | 0.5 | 0.1 | 0 | 0.5 | 0 | 0 | 0.1 | 0 | 0 | 0 | 0.1 | 0 | 0 | 0 | 0 | 0 | 1 | 0 | 0 | 0 | 0 |
| A42 | E | 410 | 500 | Production method D | 78.7 | 11 | 5.5 | 3 | 0.1 | 0 | 0.5 | 0 | 0 | 0.1 | 0 | 0 | 0 | 0.1 | 0 | 0 | 0 | 0 | 0 | 1 | 0 | 0 | 0 | 0 |
| A43 | E | 405 | 500 | Production method D | 76.7 | 11 | 5.5 | 5 | 0.1 | 0 | 0.5 | 0 | 0 | 0.1 | 0 | 0 | 0 | 0.1 | 0 | 0 | 0 | 0 | 0 | 1 | 0 | 0 | 0 | 0 |
| A44 | C | 375 | 500 | Production method D | 56.2 | 12 | 8 | 22 | 0 | 0 | 0.8 | 0 | 0 | 0 | 0 | 0 | 0 | 0 | 0 | 0 | 0 | 0 | 0 | 1 | 0 | 0 | 0 | 0 |
| A45 | C | 420 | 500 | Production method D | 80.3 | 12 | 5 | 1 | 0.5 | 0.5 | 0 | 0 | 0 | 0 | 0.2 | 0 | 0 | 0 | 0 | 0 | 0 | 0 | 0 | 0.5 | 0 | 0 | 0 | 0 |
| A46 | E | 420 | 500 | Production method E | 80.7 | 12 | 5 | 1 | 0.3 | 0.3 | 0 | 0 | 0 | 0 | 0.2 | 0 | 0 | 0 | 0 | 0 | 0 | 0 | 0 | 0.5 | 0 | 0 | 0 | 0 |

TABLE 1-2-continued

| No. | Category | Coating bath melting point (°C) | Coating bath temperature (°C) | Production method | Component (mass %) Zn | Al | Mg | Sn group Sn | Bi | In | Ca group Ca | Y | La | Ce | Si | Cr group Cr | Ti | Ni | Co | V | Nb | Cu | Mn | Fe | Sr group Sr | Sb | Pb | B |
|---|---|---|---|---|---|---|---|---|---|---|---|---|---|---|---|---|---|---|---|---|---|---|---|---|---|---|---|---|
| A47 | E | 420 | 500 | Production method E | 80.5 | 12 | 5 | 1 | 0.2 | 0.2 | 0.1 | 0 | 0 | 0 | 0 | 0 | 0 | 0 | 0 | 0 | 0 | 0 | 0 | 1 | 0 | 0 | 0 | 0 |
| A48 | E | 420 | 500 | Production method E | 80.7 | 12 | 5 | 1 | 0.1 | 0.1 | 0.1 | 0 | 0 | 0 | 0 | 0 | 0 | 0 | 0 | 0 | 0 | 0 | 0 | 1 | 0 | 0 | 0 | 0 |
| A49 | E | 420 | 500 | Production method D | 75.7 | 12 | 6 | 5 | 0 | 0 | 0.3 | 0 | 0 | 0 | 0.1 | 0 | 0 | 0 | 0 | 0 | 0 | 0 | 0 | 1 | 0 | 0 | 0 | 0 |
| A50 | E | 420 | 500 | Production method E | 75.4 | 12 | 6 | 5 | 0 | 0 | 0.3 | 0 | 0 | 0 | 0.1 | 0.1 | 0.1 | 0 | 0 | 0 | 0 | 0 | 0 | 1 | 0 | 0 | 0 | 0 |
| A51 | E | 420 | 500 | Production method E | 75.4 | 12 | 6 | 5 | 0 | 0 | 0.3 | 0 | 0 | 0 | 0.1 | 0.1 | 0 | 0.1 | 0 | 0 | 0 | 0 | 0 | 1 | 0 | 0 | 0 | 0 |
| A52 | E | 420 | 500 | Production method D | 75.4 | 12 | 6 | 5 | 0 | 0 | 0.3 | 0 | 0 | 0 | 0.1 | 0.1 | 0 | 0 | 0.1 | 0 | 0 | 0 | 0 | 1 | 0 | 0 | 0 | 0 |
| A53 | E | 420 | 500 | Production method E | 75.4 | 12 | 6 | 5 | 0 | 0 | 0.3 | 0 | 0 | 0 | 0.1 | 0.1 | 0 | 0 | 0 | 0 | 0 | 0 | 0 | 1 | 0 | 0 | 0 | 0 |
| A54 | C | 420 | 500 | Production method E | 75.3 | 12 | 6 | 5 | 0 | 0 | 0.3 | 0 | 0 | 0 | 0.1 | 0 | 0 | 0.1 | 0.1 | 0 | 0 | 0 | 0 | 1 | 0 | 0 | 0 | 0 |
| A55 | E | 420 | 500 | Production method E | 66.4 | 12 | 8 | 10 | 0.5 | 0 | 1.5 | 0 | 0.1 | 0.1 | 0 | 0 | 0 | 0 | 0 | 0 | 0 | 0.1 | 0 | 1 | 0.4 | 0 | 0 | 0 |
| A56 | E | 415 | 500 | Production method E | 65.5 | 12 | 8 | 11 | 0.5 | 0 | 1.5 | 0 | 0.1 | 0 | 0 | 0 | 0 | 0 | 0 | 0 | 0 | 0 | 0 | 1 | 0.4 | 0 | 0 | 0 |
| A57 | C | 415 | 500 | Production method E | 65.4 | 12 | 8 | 11 | 0.5 | 0 | 1.5 | 0 | 0.1 | 0 | 0 | 0 | 0 | 0 | 0 | 0 | 0 | 0 | 0 | 1 | 0.5 | 0 | 0 | 0 |
| A58 | E | 420 | 500 | Production method E | 65.7 | 13 | 7 | 9 | 4 | 0 | 0.3 | 0 | 0 | 0 | 0 | 0 | 0 | 0 | 0 | 0 | 0 | 0 | 0 | 1 | 0 | 0 | 0 | 0 |
| A59 | E | 430 | 500 | Production method D | 76.5 | 13 | 6 | 3 | 0 | 0 | 0.5 | 0 | 0 | 0 | 0 | 0 | 0 | 0 | 0 | 0 | 0 | 0 | 0 | 1 | 0 | 0 | 0 | 0 |

TABLE 1-3

| No. | Category | Coating bath melting point (°C) | Coating bath temperature (°C) | Production method | Component (mass %) | | | | | | | | | | | | | | | | | | | | | | | |
|---|---|---|---|---|---|---|---|---|---|---|---|---|---|---|---|---|---|---|---|---|---|---|---|---|---|---|---|---|
| | | | | | | | | Sn group | | | Ca group | | | | | Cr group | | | | | | | | | Sr group | | | |
| | | | | | Zn | Al | Mg | Sn | Bi | In | Ca | Y | La | Ce | Si | Cr | Ti | Ni | Co | V | Nb | Cu | Mn | Fe | Sr | Sb | Pb | B |
| A60 | C | 430 | 450 | Production method A | 76.5 | 13 | 6 | 3 | 0 | 0 | 0.5 | 0 | 0 | 0 | 0 | 0 | 0 | 0 | 0 | 0 | 0 | 0 | 0 | 1 | 0 | 0 | 0 | 0 |
| A61 | C | 430 | 500 | Production method B | 76.5 | 13 | 6 | 3 | 0 | 0 | 0.5 | 0 | 0 | 0 | 0 | 0 | 0 | 0 | 0 | 0 | 0 | 0 | 0 | 1 | 0 | 0 | 0 | 0 |
| A62 | C | 430 | 500 | Production method C | 76.5 | 13 | 6 | 3 | 0 | 0 | 0.5 | 0 | 0 | 0 | 0 | 0 | 0 | 0 | 0 | 0 | 0 | 0 | 0 | 1 | 0 | 0 | 0 | 0 |
| A63 | E | 430 | 500 | Production method D | 76.3 | 13 | 6 | 3 | 0 | 0 | 0.5 | 0 | 0 | 0 | 0 | 0 | 0 | 0 | 0 | 0 | 0.2 | 0 | 0 | 1 | 0 | 0 | 0 | 0 |
| A64 | C | 430 | 500 | Production method D | 76.25 | 13 | 6 | 3 | 0 | 0 | 0.5 | 0 | 0 | 0 | 0 | 0 | 0 | 0 | 0 | 0 | 0.25 | 0 | 0 | 1 | 0 | 0 | 0 | 0 |
| A65 | E | 430 | 500 | Production method E | 77 | 13 | 6 | 3 | 0 | 0 | 0 | 0 | 0 | 0 | 0 | 0 | 0 | 0 | 0 | 0 | 0 | 0 | 0 | 1 | 0 | 0 | 0 | 0 |
| A66 | E | 430 | 500 | Production method D | 76.8 | 13 | 6 | 3 | 0 | 0 | 0 | 0 | 0 | 0 | 0 | 0 | 0 | 0 | 0 | 0 | 0 | 0.2 | 0 | 1 | 0 | 0 | 0 | 0 |
| A67 | C | 430 | 500 | Production method D | 76.75 | 13 | 6 | 3 | 0 | 0 | 0 | 0 | 0 | 0 | 0 | 0 | 0 | 0 | 0 | 0 | 0 | 0.25 | 0 | 1 | 0 | 0 | 0 | 0 |
| A68 | C | 450 | 500 | Production method D | 65.5 | 14 | 9 | 5 | 5 | 0 | 0.5 | 0 | 0 | 0 | 0 | 0 | 0 | 0 | 0 | 0 | 0 | 0 | 0 | 1 | 0 | 0 | 0 | 0 |
| A69 | C | 440 | 500 | Production method D | 65.7 | 14 | 8 | 9 | 0 | 2 | 0.2 | 0.1 | 0 | 0 | 0 | 0 | 0 | 0 | 0 | 0 | 0 | 0 | 0 | 1 | 0 | 0 | 0 | 0 |
| A70 | E | 435 | 500 | Production method D | 71.7 | 14 | 7 | 5 | 0 | 1 | 0.3 | 0 | 0 | 0 | 0 | 0 | 0 | 0 | 0 | 0 | 0 | 0 | 0 | 1 | 0 | 0 | 0 | 0 |
| A71 | E | 450 | 500 | Production method D | 65.5 | 15 | 11 | 5 | 0 | 0 | 2 | 0 | 0 | 0 | 0 | 0 | 0 | 0 | 0 | 0 | 0 | 0 | 0 | 1 | 0 | 0 | 0 | 0 |
| A72 | C | 445 | 500 | Production method D | 74.45 | 15 | 8.5 | 0.05 | 0 | 0 | 0.5 | 0 | 0 | 0 | 0 | 0 | 0 | 0 | 0 | 0 | 0 | 0 | 0 | 1.5 | 0 | 0 | 0 | 0 |
| A73 | E | 440 | 500 | Production method D | 73.5 | 16 | 5 | 4 | 0 | 0 | 0 | 0 | 0 | 0 | 0 | 0 | 0 | 0 | 0 | 0 | 0 | 0 | 0 | 1.5 | 0 | 0 | 0 | 0 |
| A74 | E | 460 | 510 | Production method D | 66.5 | 16 | 11 | 5 | 0 | 0 | 0.5 | 0 | 0 | 0 | 0 | 0 | 0 | 0 | 0 | 0 | 0 | 0 | 0 | 1 | 0 | 0 | 0 | 0 |
| A75 | E | 460 | 510 | Production method D | 65.3 | 16 | 11 | 5 | 0 | 0 | 0.5 | 0 | 0 | 0 | 0 | 0.2 | 0 | 0 | 0 | 0 | 0 | 0 | 0 | 2 | 0 | 0 | 0 | 0 |

TABLE 1-3-continued

| No. | Category | Coating bath melting point (°C.) | Coating bath temperature (°C.) | Production method | Component (mass %) |||||||||||||||||||
|---|---|---|---|---|---|---|---|---|---|---|---|---|---|---|---|---|---|---|---|---|---|---|---|
| | | | | | | | | Sn group ||| Ca group |||||| Cr group ||||||| Sr group |||
| | | | | | Zn | Al | Mg | Sn | Bi | In | Ca | Y | La | Ce | Si | Cr | Ti | Ni | Co | V | Nb | Cu | Mn | Fe | Sr | Sb | Pb | B |
| A76 | C | 460 | 510 | Production method D | 65.75 | 16 | 11 | 5 | 0 | 0 | 0.5 | 0 | 0 | 0 | 0 | 0.25 | 0 | 0 | 0 | 0 | 0 | 0 | 0 | 1.5 | 0 | 0 | 0 | 0 |
| A77 | E | 460 | 510 | Production method D | 65.5 | 16 | 11 | 6 | 0 | 0 | 0.5 | 0 | 0 | 0 | 0 | 0 | 0 | 0 | 0 | 0 | 0 | 0 | 0 | 1 | 0 | 0 | 0 | 0 |
| A78 | E | 460 | 510 | Production method D | 65.3 | 16 | 11 | 6 | 0 | 0 | 0.5 | 0 | 0 | 0 | 0 | 0 | 0.2 | 0 | 0 | 0 | 0 | 0 | 0 | 1 | 0 | 0 | 0 | 0 |
| A79 | C | 460 | 510 | Production method D | 65.25 | 16 | 11 | 6 | 0 | 0 | 0.5 | 0 | 0 | 0 | 0 | 0 | 0.25 | 0 | 0 | 0 | 0 | 0 | 0 | 1 | 0 | 0 | 0 | 0 |
| A80 | E | 460 | 510 | Production method D | 65.5 | 16 | 12 | 5 | 0 | 0 | 0.5 | 0 | 0 | 0 | 0 | 0 | 0 | 0 | 0 | 0 | 0 | 0 | 0 | 1 | 0 | 0 | 0 | 0 |
| A81 | E | 460 | 510 | Production method D | 65.3 | 16 | 12 | 5 | 0 | 0 | 0.5 | 0 | 0 | 0 | 0 | 0 | 0 | 0.2 | 0 | 0 | 0 | 0 | 0 | 1 | 0 | 0 | 0 | 0 |
| A82 | C | 460 | 510 | Production method D | 65.45 | 16 | 12 | 5 | 0 | 0 | 0.3 | 0 | 0 | 0 | 0 | 0 | 0 | 0.25 | 0 | 0 | 0 | 0 | 0 | 1 | 0 | 0 | 0 | 0 |
| A83 | E | 450 | 500 | Production method D | 75 | 17 | 5 | 2 | 0 | 0 | 0 | 0 | 0 | 0 | 0 | 0 | 0 | 0 | 0 | 0 | 0 | 0 | 0 | 1 | 0 | 0 | 0 | 0 |
| A84 | E | 455 | 505 | Production method D | 72.5 | 17 | 6 | 2.5 | 0 | 0 | 1 | 0 | 0 | 0 | 0 | 0 | 0 | 0 | 0 | 0 | 0 | 0 | 0 | 1 | 0 | 0 | 0 | 0 |
| A85 | C | 455 | 475 | Production method A | 71.5 | 17 | 6 | 2.5 | 0 | 0 | 1 | 0 | 0 | 0 | 0 | 0 | 0 | 0 | 0 | 0 | 0 | 0 | 0 | 2 | 0 | 0 | 0 | 0 |
| A86 | C | 455 | 505 | Production method B | 71.5 | 17 | 6 | 2.5 | 0 | 0 | 1 | 0 | 0 | 0 | 0 | 0 | 0 | 0 | 0 | 0 | 0 | 0 | 0 | 2 | 0 | 0 | 0 | 0 |
| A87 | C | 455 | 505 | Production method C | 71.5 | 17 | 6 | 2.5 | 0 | 0 | 1 | 0 | 0 | 0 | 0 | 0 | 0 | 0 | 0 | 0 | 0 | 0 | 0 | 2 | 0 | 0 | 0 | 0 |
| A88 | E | 455 | 505 | Production method E | 75.5 | 17 | 5 | 1 | 0 | 0 | 0 | 0 | 0 | 0 | 0 | 0 | 0 | 0 | 0 | 0 | 0 | 0 | 0 | 1.5 | 0 | 0 | 0 | 0 |
| A89 | E | 460 | 510 | Production method E | 73 | 18 | 6 | 0.5 | 0.1 | 0 | 0.4 | 0 | 0 | 0 | 0 | 0 | 0 | 0 | 0 | 0 | 0 | 0 | 0 | 2 | 0 | 0 | 0 | 0 |

TABLE 1-4

| No. | Category | Coating bath melting point (° C.) | Coating bath temperature (° C.) | Production method | Component (mass %) Zn | Al | Mg | Sn group Sn | Bi | In |
|---|---|---|---|---|---|---|---|---|---|---|
| A90 | E | 460 | 510 | Production method E | 70 | 18 | 7 | 2.5 | 0 | 0 |
| A91 | E | 455 | 505 | Production method D | 67 | 18 | 8 | 5 | 0 | 0 |
| A92 | E | 465 | 515 | Production method E | 65.5 | 19 | 7 | 6.5 | 0 | 0 |
| A93 | E | 465 | 515 | Production method E | 73 | 19 | 5 | 1 | 0 | 0.5 |
| A94 | C | 465 | 515 | Production method E | 65 | 19 | 8 | 4 | 0 | 0 |
| A95 | C | 465 | 515 | Production method E | 66 | 19 | 8 | 4 | 0 | 0 |
| A96 | E | 465 | 515 | Production method E | 66.7 | 19 | 8 | 4 | 0 | 0 |
| A97 | E | 465 | 515 | Production method D | 66.4 | 19 | 8 | 4 | 0 | 0 |
| A98 | C | 470 | 520 | Production method D | 69.8 | 20 | 8 | 0 | 0.2 | 0 |
| A99 | E | 470 | 520 | Production method E | 65.5 | 20 | 8 | 3.5 | 0 | 0 |
| A100 | C | 470 | 485 | Production method A | 65.5 | 20 | 8 | 3.5 | 0 | 0 |
| A101 | C | 470 | 520 | Production method B | 65.5 | 20 | 8 | 3.5 | 0 | 0 |
| A102 | C | 470 | 520 | Production method C | 65.5 | 20 | 8 | 3.5 | 0 | 0 |
| A103 | E | 475 | 525 | Production method E | 65.9 | 21 | 9 | 1.5 | 1 | 0.4 |
| A104 | E | 470 | 520 | Production method D | 67 | 22 | 7 | 2 | 0 | 0 |
| A105 | E | 460 | 510 | Production method E | 69.2 | 22 | 6 | 2 | 0.1 | 0 |
| A106 | E | 460 | 510 | Production method D | 69 | 22 | 6 | 2 | 0 | 0.1 |
| A107 | C | 460 | 510 | Production method E | 69.05 | 22 | 6 | 2 | 0 | 0 |
| A108 | E | 470 | 520 | Production method E | 65.5 | 23 | 7 | 2 | 0 | 0 |
| A109 | E | 470 | 520 | Production method E | 68.5 | 23 | 4 | 2.5 | 0 | 0 |
| A110 | C | 475 | 525 | Production method E | 67.3 | 24 | 4 | 0.5 | 0 | 0 |
| A111 | E | 475 | 525 | Production method E | 65.5 | 24 | 3.5 | 3.5 | 0 | 0 |
| A112 | E | 470 | 520 | Production method E | 66 | 24.5 | 4 | 3.5 | 0 | 0 |
| A113 | E | 475 | 525 | Production method E | 65.7 | 24.5 | 3.5 | 4 | 0 | 0 |
| A114 | E | 475 | 525 | Production method E | 65.3 | 24.5 | 3.5 | 3 | 0 | 0 |
| A115 | C | 475 | 525 | Production method D | 65.6 | 24.5 | 3.5 | 3.5 | 0 | 0 |
| A116 | C | 485 | 535 | Production method D | 61 | 24.5 | 12.5 | 1.5 | 0 | 0 |
| A117 | C | 460 | 510 | Production method D | 69.5 | 25 | 3 | 1.5 | 0 | 0 |
| A118 | C | 465 | 515 | Production method D | 67.4 | 25 | 3.5 | 0.1 | 0 | 0 |
| A119 | C | Commercially available Zn—Al—Mg-based coating | | | 85.7 | 11 | 3 | 0 | 0 | 0 |

| No. | Ca group Ca | Y | La | Ce | Si | Cr group Cr | Ti | Ni | Co | V | Nb | Cu | Mn | Fe | Sr group Sr | Sb | Pb | B |
|---|---|---|---|---|---|---|---|---|---|---|---|---|---|---|---|---|---|---|
| A90 | 0.5 | 0 | 0 | 0 | 0 | 0 | 0 | 0 | 0 | 0 | 0 | 0 | 0 | 2 | 0 | 0 | 0 | 0 |
| A91 | 0.5 | 0 | 0 | 0 | 0 | 0 | 0 | 0 | 0 | 0 | 0 | 0 | 0 | 1.5 | 0 | 0 | 0 | 0 |
| A92 | 0.5 | 0 | 0 | 0 | 0 | 0 | 0 | 0 | 0 | 0 | 0 | 0 | 0 | 1.5 | 0 | 0 | 0 | 0 |
| A93 | 0 | 0 | 0 | 0 | 0 | 0 | 0 | 0 | 0 | 0 | 0 | 0 | 0 | 1.5 | 0 | 0 | 0 | 0 |
| A94 | 1 | 0.5 | 0.5 | 0.5 | 0 | 0 | 0 | 0 | 0 | 0 | 0 | 0 | 0 | 1.5 | 0 | 0 | 0 | 0 |
| A95 | 1 | 0.5 | 0.5 | 0 | 0 | 0 | 0 | 0 | 0 | 0 | 0 | 0 | 0 | 1 | 0 | 0 | 0 | 0 |
| A96 | 1 | 0 | 0 | 0.3 | 0 | 0 | 0 | 0 | 0 | 0 | 0 | 0 | 0 | 1 | 0 | 0 | 0 | 0 |
| A97 | 1 | 0 | 0.3 | 0.3 | 0 | 0 | 0 | 0 | 0 | 0 | 0 | 0 | 0 | 1 | 0 | 0 | 0 | 0 |
| A98 | 1 | 0 | 0 | 0 | 0 | 0 | 0 | 0 | 0 | 0 | 0 | 0 | 0 | 1 | 0 | 0 | 0 | 0 |
| A99 | 2 | 0 | 0 | 0 | 0 | 0 | 0 | 0 | 0 | 0 | 0 | 0 | 0 | 1 | 0 | 0 | 0 | 0 |
| A100 | 2 | 0 | 0 | 0 | 0 | 0 | 0 | 0 | 0 | 0 | 0 | 0 | 0 | 1 | 0 | 0 | 0 | 0 |
| A101 | 2 | 0 | 0 | 0 | 0 | 0 | 0 | 0 | 0 | 0 | 0 | 0 | 0 | 1 | 0 | 0 | 0 | 0 |
| A102 | 2 | 0 | 0 | 0 | 0 | 0 | 0 | 0 | 0 | 0 | 0 | 0 | 0 | 1 | 0 | 0 | 0 | 0 |
| A103 | 0.2 | 0 | 0 | 0 | 0 | 0 | 0 | 0 | 0 | 0 | 0 | 0 | 0 | 1 | 0 | 0 | 0 | 0 |
| A104 | 0.5 | 0 | 0 | 0 | 0 | 0 | 0 | 0 | 0 | 0 | 0 | 0 | 0 | 1.5 | 0 | 0 | 0 | 0 |
| A105 | 0 | 0 | 0 | 0 | 0.4 | 0 | 0 | 0 | 0 | 0 | 0 | 0 | 0 | 0.3 | 0 | 0 | 0 | 0 |
| A106 | 0 | 0 | 0 | 0 | 0.4 | 0 | 0 | 0 | 0 | 0 | 0 | 0 | 0.2 | 0.3 | 0 | 0 | 0 | 0 |
| A107 | 0 | 0 | 0 | 0 | 0.4 | 0 | 0 | 0 | 0 | 0 | 0 | 0 | 0.25 | 0.3 | 0 | 0 | 0 | 0 |
| A108 | 0.5 | 0 | 0 | 0 | 0 | 0 | 0 | 0 | 0 | 0 | 0 | 0 | 0 | 2 | 0 | 0 | 0 | 0 |
| A109 | 0.3 | 0.2 | 0 | 0 | 0 | 0 | 0 | 0 | 0 | 0 | 0 | 0 | 0 | 1.5 | 0 | 0 | 0 | 0 |
| A110 | 3.2 | 0 | 0 | 0 | 0 | 0 | 0 | 0 | 0 | 0 | 0 | 0 | 0 | 1 | 0 | 0 | 0 | 0 |
| A111 | 3 | 0 | 0 | 0 | 0 | 0 | 0 | 0 | 0 | 0 | 0 | 0 | 0 | 0.5 | 0 | 0 | 0 | 0 |
| A112 | 1 | 0 | 0 | 0 | 0 | 0 | 0 | 0 | 0 | 0 | 0 | 0 | 0 | 1 | 0 | 0 | 0 | 0 |
| A113 | 0.2 | 0 | 0 | 0 | 1.6 | 0 | 0 | 0 | 0 | 0 | 0 | 0 | 0 | 0.5 | 0 | 0 | 0 | 0 |
| A114 | 1 | 0 | 0 | 0 | 2.4 | 0 | 0 | 0 | 0 | 0 | 0 | 0 | 0 | 0.3 | 0 | 0 | 0 | 0 |
| A115 | 0.1 | 0 | 0 | 0 | 2.5 | 0 | 0 | 0 | 0 | 0 | 0 | 0 | 0 | 0.3 | 0 | 0 | 0 | 0 |
| A116 | 0 | 0 | 0 | 0 | 0 | 0 | 0 | 0 | 0 | 0 | 0 | 0 | 0 | 0.5 | 0 | 0 | 0 | 0 |
| A117 | 0 | 0 | 0 | 0 | 0 | 0 | 0 | 0 | 0 | 0 | 0 | 0 | 0 | 1 | 0 | 0 | 0 | 0 |
| A118 | 0 | 0 | 0 | 0 | 0 | 0 | 0 | 0 | 0 | 0 | 0 | 0 | 0 | 4 | 0 | 0 | 0 | 0 |
| A119 | 0 | 0 | 0 | 0 | 0.2 | 0 | 0 | 0 | 0 | 0 | 0 | 0 | 0 | 0.1 | 0 | 0 | 0 | 0 |

TABLE 1-5

| No. | Category | Total Cr group | Sr group | Concentration formula Sn—(Bi+In) | Ca—(Y+La+Ce) | Sn—Si | Sn/Zn | Specific intensity I (MCSB) | I (MgCaSn) | I (CaZnAl) | Intensity I (23.3°) | Diffraction peak position 23.36-23.46 |
|---|---|---|---|---|---|---|---|---|---|---|---|---|
| A1 | C | 0 | 0 | 0.8 | 0.1 | 1 | 0.01 | 1.3 | — | 0.4 | 882 | NG |
| A2 | E | 0 | 0.4 | 5 | 0.4 | 5 | 0.06 | 11.9 | 0.05 | 0.5 | 3967 | NG |
| A3 | E | 0 | 0.4 | 5 | 0.4 | 5 | 0.06 | 14.0 | 0.05 | 0.5 | 3864 | NG |
| A4 | E | 0 | 0 | 2 | 0 | 2 | 0.02 | 2.1 | 0.4 | <0.5 | 1263 | NG |
| A5 | C | 0 | 0.5 | 5 | 0.4 | 5 | 0.06 | 9.0 | 0.05 | 0.5 | 3765 | NG |
| A6 | C | 0 | 0.5 | 5 | 0.4 | 5 | 0.06 | 8.5 | 0.05 | 0.5 | 3864 | NG |
| A7 | E | 0 | 0 | 20 | 0 | 20 | 0.29 | 11.5 | 1.99 | <0.5 | 4392 | NG |
| A8 | E | 0 | 0 | 1 | 0.1 | 1 | 0.01 | 3.3 | 0.13 | 0.5 | 1092 | NG |
| A9 | C | 0 | 0 | 1 | 0.1 | 1 | 0.01 | 1.4 | — | 0.5 | 984 | NG |
| A10 | C | 0 | 0 | 1 | 0.1 | 1 | 0.01 | 1.4 | — | 0.5 | 876 | NG |
| A11 | C | 0 | 0 | 1 | 0.1 | 1 | 0.01 | 4.0 | 0.1 | 0.5 | 975 | NG |
| A12 | E | 0 | 0.3 | 1 | 0.1 | 1 | 0.01 | 3.5 | 0.14 | 0.5 | 1013 | NG |
| A13 | C | 0 | 0.6 | 1 | 0.1 | 1 | 0.01 | 3.8 | 0.13 | 0.4 | 1001 | NG |
| A14 | E | 0 | 0 | 4 | 0 | 4 | 0.05 | 4.4 | 1.88 | <0.5 | 3267 | NG |
| A15 | C | 0 | 0 | 0.2 | 0 | −0.1 | 0.00 | 1.1 | — | <0.5 | 541 | NG |
| A16 | E | 0 | 0.4 | 0.5 | 0 | 0.2 | 0.01 | 3.8 | 0.45 | <0.5 | 534 | OK |
| A17 | C | 0 | 0.5 | 0.5 | 0 | 0.2 | 0.01 | 3.5 | 0.6 | <0.5 | 561 | NG |
| A18 | E | 0 | 0 | 1 | 0 | 0.7 | 0.01 | 3.8 | 1.25 | <0.5 | 901 | OK |
| A19 | E | 0 | 0 | 2 | 0 | 1.7 | 0.02 | 5.0 | 1.42 | <0.5 | 1345 | OK |
| A20 | E | 0 | 0 | 5 | 0.03 | 5 | 0.06 | 6.5 | 0.3 | <0.5 | 2885 | NG |
| A21 | C | 0 | 0 | 5 | −0.65 | 5 | 0.06 | 6.9 | 0.2 | <0.5 | 2902 | NG |
| A22 | E | 0 | 0 | 0.1 | 0.05 | 0.1 | 0.00 | 2.1 | 0.28 | 0.9 | 508 | NG |
| A23 | E | 0 | 0 | 0.3 | 3 | 0.3 | 0.00 | 2.5 | 0.03 | 5.3 | 609 | NG |
| A24 | E | 0 | 0 | 0.5 | 3 | 0.5 | 0.01 | 2.5 | 0.03 | 5 | 721 | NG |
| A25 | C | 0 | 0 | 0.5 | 3 | 0.5 | 0.01 | 1.1 | — | 5 | 664 | NG |
| A26 | C | 0 | 0 | 0.5 | 3 | 0.5 | 0.01 | 1.3 | — | 5 | 618 | NG |
| A27 | C | 0 | 0 | 0.5 | 3 | 0.5 | 0.01 | 2.9 | 0.03 | 5 | 632 | NG |
| A28 | E | 0 | 0 | 4 | 0.5 | 4 | 0.05 | 4.6 | 0.04 | 0.8 | 4626 | NG |
| A29 | E | 0 | 0 | 2 | 0.1 | 1.8 | 0.02 | 4.6 | 0.06 | 0.8 | 1756 | OK |
| A30 | C | 0 | 0 | 2 | 0.3 | 2 | 0.03 | 4.4 | 0.05 | 1 | 2625 | NG |

TABLE 1-6

| No. | Category | Total Cr group | Sr group | Concentration formula Sn—(Bi+In) | Ca—(Y+La+Ce) | Sn—Si | Sn/Zn | Specific intensity I (MCSB) | I (MgCaSn) | I (CaZnAl) | Intensity I (23.3°) | Diffraction peak position 23.36-23.46 |
|---|---|---|---|---|---|---|---|---|---|---|---|---|
| A31 | E | 0 | 0 | 2 | 0.6 | 2 | 0.03 | 5.0 | 0.05 | 1 | 2354 | NG |
| A32 | C | 0 | 0 | 2 | 0.5 | 2 | 0.03 | 4.8 | 0.04 | 1 | 2367 | NG |
| A33 | E | 0 | 0 | 2 | 0.6 | 2 | 0.03 | 4.6 | 0.04 | 1 | 2311 | NG |
| A34 | E | 0 | 0 | 5 | 0 | 4.8 | 0.06 | 6.9 | 2.32 | <0.5 | 3854 | OK |
| A35 | E | 0.2 | 0 | 5 | 0 | 4.8 | 0.06 | 6.7 | 2.41 | <0.5 | 3765 | OK |
| A36 | C | 0.25 | 0 | 5 | 0 | 4.8 | 0.06 | 1.4 | — | <0.5 | 3921 | NG |
| A37 | E | 0 | 0 | 5 | 0 | 4.8 | 0.06 | 6.7 | 2.26 | <0.5 | 3832 | OK |
| A38 | E | 0.2 | 0 | 5 | 0 | 4.8 | 0.06 | 6.7 | 2.35 | <0.5 | 3568 | OK |
| A39 | C | 0.25 | 0 | 5 | 0 | 4.8 | 0.06 | 1.3 | — | <0.5 | 3712 | NG |
| A40 | C | 0 | 0 | −0.5 | 0 | 0 | 0.00 | 1.4 | 2 | <0.5 | 230 | NG |
| A41 | E | 0.1 | 0 | 0.4 | 0.4 | 0.5 | 0.01 | 3.3 | 0.05 | 1 | 601 | OK |
| A42 | E | 0.1 | 0 | 2.9 | 0.4 | 3 | 0.04 | 3.5 | 0.05 | 0.8 | 3124 | OK |
| A43 | E | 0.1 | 0 | 4.9 | 0.4 | 5 | 0.07 | 6.5 | 0.05 | 0.5 | 4256 | OK |
| A44 | C | 0 | 0 | 22 | 0.8 | 22 | 0.39 | 25.0 | 0.05 | 0.4 | 8012 | NG |
| A45 | C | 0 | 0 | 0 | 0 | 0.8 | 0.01 | 3.5 | 1.22 | <0.5 | 911 | NG |
| A46 | E | 0 | 0 | 0.4 | 0 | 0.8 | 0.01 | 3.5 | 1.34 | <0.5 | 923 | OK |
| A47 | E | 0 | 0 | 0.6 | 0.1 | 1 | 0.01 | 3.8 | 0.14 | 0.5 | 978 | NG |
| A48 | E | 0 | 0 | 0.8 | 0.1 | 1 | 0.01 | 4.0 | 0.13 | 0.5 | 998 | NG |
| A49 | E | 0 | 0 | 5 | 0.3 | 5 | 0.07 | 5.2 | 0.06 | 0.4 | 4102 | NG |
| A50 | E | 0.2 | 0 | 5 | 0.3 | 4.9 | 0.07 | 5.2 | 0.06 | 0.4 | 4203 | OK |
| A51 | E | 0.2 | 0 | 5 | 0.3 | 4.9 | 0.07 | 5.2 | 0.07 | 0.4 | 4116 | OK |
| A52 | E | 0.2 | 0 | 5 | 0.3 | 4.9 | 0.07 | 5.2 | 0.06 | 0.4 | 4153 | OK |
| A53 | E | 0.2 | 0 | 5 | 0.3 | 4.9 | 0.07 | 5.2 | 0.05 | 0.4 | 4136 | OK |
| A54 | C | 0.3 | 0 | 5 | 0.3 | 4.9 | 0.07 | 1.3 | — | 0.4 | 4200 | NG |
| A55 | E | 0 | 0.4 | 9.5 | 1.3 | 10 | 0.15 | 5.2 | 0.04 | 0.8 | 5214 | NG |
| A56 | E | 0 | 0.4 | 10.5 | 1.4 | 11 | 0.17 | 20.8 | 0.04 | 0.5 | 5641 | NG |
| A57 | C | 0 | 0.5 | 10.5 | 1.4 | 11 | 0.17 | 22.9 | 0.04 | 0.4 | 5312 | NG |

TABLE 1-6-continued

| | | | | Determination Concentration formula | | | | Specific intensity | | | Intensity | Diffraction peak |
|---|---|---|---|---|---|---|---|---|---|---|---|---|
| No. | Category | Total Cr group | Sr group | Sn—(Bi + In) | Ca—(Y + La + Ce) | Sn—Si | Sn/Zn | I (MCSB) | I (MgCaSn) | I (CaZnAl) | I (23.3°) | position 23.36-23.46 |
| A58 | E | 0 | 0 | 5 | 0.3 | 9 | 0.14 | 9.6 | 0.05 | <0.5 | 4999 | NG |
| A59 | E | 0 | 0 | 3 | 0.5 | 3 | 0.04 | 3.5 | 0.05 | 0.8 | 3365 | NG |

TABLE 1-7

| | | | | Determination Concentration formula | | | | Specific intensity | | | Intensity | Diffraction peak |
|---|---|---|---|---|---|---|---|---|---|---|---|---|
| No. | Category | Total Cr group | Sr group | Sn—(Bi + In) | Ca—(Y + La + Ce) | Sn—Si | Sn/Zn | I (MCSB) | I (MgCaSn) | I (CaZnAl) | I (23.3°) | position 23.36-23.46 |
| A60 | C | 0 | 0 | 3 | 0.5 | 3 | 0.04 | 1.4 | — | 0.8 | 3457 | NG |
| A61 | C | 0 | 0 | 3 | 0.5 | 3 | 0.04 | 1.4 | — | 0.8 | 3395 | NG |
| A62 | C | 0 | 0 | 3 | 0.5 | 3 | 0.04 | 3.1 | 0.05 | 0.8 | 3451 | NG |
| A63 | E | 0.2 | 0 | 3 | 0.5 | 3 | 0.04 | 3.3 | 0.06 | 0.8 | 3645 | NG |
| A64 | C | 0.25 | 0 | 3 | 0.5 | 3 | 0.04 | 1.3 | — | 0.8 | 3612 | NG |
| A65 | E | 0 | 0 | 3 | 0 | 3 | 0.04 | 3.5 | 1.96 | <0.5 | 3015 | NG |
| A66 | E | 0.2 | 0 | 3 | 0 | 3 | 0.04 | 4.0 | 1.92 | <0.5 | 2768 | NG |
| A67 | C | 0.25 | 0 | 3 | 0 | 3 | 0.04 | 1.4 | 1.85 | <0.5 | 2912 | NG |
| A68 | C | 0 | 0 | 0 | 0.5 | 5 | 0.08 | 5.2 | 0.06 | 0.4 | 4169 | NG |
| A69 | C | 0 | 0 | 7 | 0.1 | 9 | 0.14 | 5.2 | 0.06 | <0.5 | 4725 | NG |
| A70 | E | 0 | 0 | 4 | 0.3 | 5 | 0.07 | 4.2 | 0.05 | 0.4 | 4654 | NG |
| A71 | E | 0 | 0 | 5 | 2 | 5 | 0.08 | 16.7 | 0.03 | 0.7 | 4915 | NG |
| A72 | C | 0 | 0 | 0.05 | 0.5 | 0.05 | 0.00 | 1.1 | 0.05 | 5.2 | 215 | NG |
| A73 | E | 0 | 0 | 4 | 0 | 4 | 0.05 | 5.2 | 2.32 | <0.5 | 2367 | NG |
| A74 | E | 0 | 0 | 5 | 0.5 | 5 | 0.08 | 4.6 | 0.05 | 0.5 | 4321 | NG |
| A75 | E | 0.2 | 0 | 5 | 0.5 | 5 | 0.08 | 5.0 | 0.06 | 0.5 | 4356 | NG |
| A76 | C | 0.25 | 0 | 5 | 0.5 | 5 | 0.08 | 1.4 | — | 0.5 | 4159 | NG |
| A77 | E | 0 | 0 | 6 | 0.5 | 6 | 0.09 | 15.2 | 0.05 | <0.5 | 4465 | NG |
| A78 | E | 0.2 | 0 | 6 | 0.5 | 6 | 0.09 | 15.2 | 0.06 | <0.5 | 4458 | NG |
| A79 | C | 0.25 | 0 | 6 | 0.5 | 6 | 0.09 | 1.4 | — | <0.5 | 4396 | NG |
| A80 | E | 0 | 0 | 5 | 0.5 | 5 | 0.08 | 13.8 | 0.05 | <0.5 | 4267 | NG |
| A81 | E | 0.2 | 0 | 5 | 0.5 | 5 | 0.08 | 12.9 | 0.05 | <0.5 | 4314 | NG |
| A82 | C | 0.25 | 0 | 5 | 0.3 | 5 | 0.08 | 1.4 | — | <0.5 | 4004 | NG |
| A83 | E | 0 | 0 | 2 | 0 | 2 | 0.03 | 2.5 | 1.74 | <0.5 | 1932 | NG |
| A84 | E | 0 | 0 | 2.5 | 1 | 2.5 | 0.03 | 2.9 | 1.58 | 1.9 | 2121 | NG |
| A85 | C | 0 | 0 | 2.5 | 1 | 2.5 | 0.03 | 1.4 | — | 1.8 | 2168 | NG |
| A86 | C | 0 | 0 | 2.5 | 1 | 2.5 | 0.03 | 1.4 | — | 1.8 | 2264 | NG |
| A87 | C | 0 | 0 | 2.5 | 1 | 2.5 | 0.03 | 2.7 | 1.58 | 1.8 | 2545 | NG |
| A88 | E | 0 | 0 | 1 | 0 | 1 | 0.01 | 2.5 | 1.7 | <0.5 | 773 | NG |
| A89 | E | 0 | 0 | 0.4 | 0.4 | 0.5 | 0.01 | 2.3 | 0.06 | 1 | 525 | NG |

TABLE 1-8

| | | | | Determination Concentration formula | | | | Specific intensity | | | Intensity | Diffraction peak |
|---|---|---|---|---|---|---|---|---|---|---|---|---|
| No. | Category | Total Cr group | Sr group | Sn—(Bi + In) | Ca—(Y + La + Ce) | Sn—Si | Sn/Zn | I (MCSB) | I (MgCaSn) | I (CaZnAl) | I (23.3°) | position 23.36-23.46 |
| A90 | E | 0 | 0 | 2.5 | 0.5 | 2.5 | 0.04 | 3.3 | 0.04 | 0.8 | 3007 | NG |
| A91 | E | 0 | 0 | 5 | 0.5 | 5 | 0.07 | 6.5 | 0.05 | 0.5 | 3913 | NG |
| A92 | E | 0 | 0 | 6.5 | 0.5 | 6.5 | 0.10 | 22.9 | 0.05 | <0.5 | 4915 | NG |
| A93 | E | 0 | 0 | 0.5 | 0 | 1 | 0.01 | 3.8 | 1.6 | <0.5 | 573 | NG |
| A94 | C | 0 | 0 | 4 | −0.5 | 4 | 0.06 | 3.5 | 0.05 | 0.8 | 4426 | NG |
| A95 | C | 0 | 0 | 4 | 0 | 4 | 0.06 | 3.3 | 0.05 | 0.8 | 4515 | NG |
| A96 | E | 0 | 0 | 4 | 0.7 | 4 | 0.06 | 3.5 | 0.05 | 0.8 | 4561 | NG |
| A97 | E | 0 | 0 | 4 | 0.4 | 4 | 0.06 | 3.3 | 0.04 | 0.8 | 4712 | NG |
| A98 | C | 0 | 0 | −0.2 | 1 | 0 | 0.00 | 1.0 | 0.05 | <0.5 | 207 | NG |

TABLE 1-8-continued

| | | | | Determination Concentration formula | | | | Specific intensity | | | Intensity | Diffraction peak |
|---|---|---|---|---|---|---|---|---|---|---|---|---|
| No. | Category | Total Cr group | Sr group | Sn—(Bi + In) | Ca—(Y + La + Ce) | Sn—Si | Sn/Zn | I (MCSB) | I (MgCaSn) | I (CaZnAl) | I (23.3°) | position 23.36-23.46 |
| A99 | E | 0 | 0 | 3.5 | 2 | 3.5 | 0.05 | 5.2 | 0.04 | 0.9 | 3715 | NG |
| A100 | C | 0 | 0 | 3.5 | 2 | 3.5 | 0.05 | 1.4 | — | 0.9 | 3385 | NG |
| A101 | C | 0 | 0 | 3.5 | 2 | 3.5 | 0.05 | 1.4 | — | 0.9 | 3451 | NG |
| A102 | C | 0 | 0 | 3.5 | 2 | 3.5 | 0.05 | 5.2 | 4 | 0.9 | 3512 | NG |
| A103 | E | 0 | 0 | 0.1 | 0.2 | 1.5 | 0.02 | 4.4 | 0.15 | <0.5 | 1443 | NG |
| A104 | E | 0 | 0 | 2 | 0.5 | 2 | 0.03 | 4.2 | 0.05 | 0.8 | 2176 | NG |
| A105 | E | 0 | 0 | 1.9 | 0 | 1.6 | 0.03 | 4.0 | 1.58 | <0.5 | 1521 | OK |
| A106 | E | 0.2 | 0 | 1.9 | 0 | 1.6 | 0.03 | 3.8 | 1.62 | <0.5 | 1347 | OK |
| A107 | C | 0.25 | 0 | 2 | 0 | 1.6 | 0.03 | 1.4 | — | <0.5 | 1159 | NG |
| A108 | E | 0 | 0 | 2 | 0.5 | 2 | 0.03 | 2.5 | 0.05 | 0.8 | 1953 | NG |
| A109 | E | 0 | 0 | 2.5 | 0.1 | 2.5 | 0.04 | 3.5 | 0.05 | 0.7 | 2124 | NG |
| A110 | C | 0 | 0 | 0.5 | 3.2 | 0.5 | 0.01 | 3.8 | 0.03 | 1 | 801 | NG |
| A111 | E | 0 | 0 | 3.5 | 3 | 3.5 | 0.05 | 4.0 | 0.03 | 1 | 3125 | NG |
| A112 | E | 0 | 0 | 3.5 | 1 | 3.5 | 0.05 | 4.8 | 0.03 | 0.8 | 3311 | NG |
| A113 | E | 0 | 0 | 4 | 0.2 | 2.4 | 0.06 | 3.5 | 0.1 | <0.5 | 4712 | OK |
| A114 | E | 0 | 0 | 3 | 1 | 0.6 | 0.05 | 3.3 | 0.05 | 0.9 | 3315 | OK |
| A115 | C | 0 | 0 | 3.5 | 0.1 | 1 | 0.05 | 3.5 | 0.12 | <0.5 | 3541 | NG |
| A116 | C | 0 | 0 | 1.5 | 0 | 1.5 | 0.02 | 2.3 | 1.65 | <0.5 | 1024 | NG |
| A117 | C | 0 | 0 | 1.5 | 0 | 1.5 | 0.02 | 2.5 | 1.25 | <0.5 | 1100 | NG |
| A118 | C | 0 | 0 | 0.1 | 0 | 0.1 | 0.00 | 1.1 | — | <0.5 | 340 | NG |
| A119 | C | 0 | 0 | 0 | 0 | −0.2 | 0.00 | — | — | — | 275 | NG |

TABLE 1-9

| | | Area fraction (%) | | | | | | Corrosion resistance | | | Corrosion potential | SST White rust area | Powdering | | Draw bead test | Vickers hardness (Hv) |
|---|---|---|---|---|---|---|---|---|---|---|---|---|---|---|---|---|
| No. | Category | MCSB/Zn + MCSB | Dc (µm) | Massive MCSB | Fine ZnAl structure | Al | MgZn2 | Ternary eutectic structure | Plain surface | End surface 1 cycle | End surface 5 cycles | | | V-bending | Un-bending | | |
| A1 | C | 0 | — | — | 0 | 0 | 20 | 20 | 0 | B | B | B | −1 | B | AAA | A | A | 190 |
| A2 | E | 10 | 35 | 0.1 | 5 | 0 | 40 | 40 | 0 | A | AAA | AAA | −1.4 | AAA | AAA | A | A | 150 |
| A3 | E | 10 | 35 | 0.1 | 5 | 0 | 40 | 40 | 0 | A | AAA | AAA | −1.4 | AAA | AAA | A | A | 150 |
| A4 | E | 5 | 40 | 0.1 | 0 | 0 | 45 | 45 | 0 | A | AAA | A | −1.3 | A | AAA | A | A | 170 |
| A5 | C | 10 | 25 | 0.2 | 5 | 0 | 36 | 3 | 0 | B | AAA | AAA | −1.4 | B | B | B | A | 170 |
| A6 | C | 10 | 35 | 0.2 | 5 | 0 | 40 | 2 | 0 | B | AAA | AAA | −1.4 | B | B | B | A | 170 |
| A7 | E | 10 | 60 | 0.2 | 15 | 0 | 42 | 30 | 0 | A | AAA | AA | −1.5 | A | AAA | A | A | 150 |
| A8 | E | 25 | 15 | 0.1 | 0 | 5 | 40 | 28 | 0 | A | AAA | AA | −1.3 | AAA | AAA | A | A | 200 |
| A9 | C | 0 | — | — | 0 | 5 | 38 | 17 | 38 | B | B | B | −1.3 | B | B | B | A | 200 |
| A10 | C | 0 | — | — | 0 | 5 | 33 | 18 | 42 | B | B | B | −1.3 | B | AAA | A | A | 200 |
| A11 | C | 0 | — | — | 0 | 0 | 66 | 30 | 0 | A | AAA | AA | −1.3 | B | B | B | A | 200 |
| A12 | E | 25 | 15 | 0.1 | 0 | 5 | 42 | 23 | 0 | A | AAA | AA | −1.3 | AAA | AAA | A | A | 200 |
| A13 | C | 25 | 15 | 0.1 | 0 | 4 | 21 | 23 | 0 | B | B | B | −1.3 | B | B | B | A | 200 |
| A14 | E | 20 | 35 | 0.2 | 3 | 5 | 28 | 38 | 0 | A | AAA | AA | −1.4 | A | AAA | A | A | 210 |
| A15 | C | 0 | — | — | 0 | 4 | 26 | 37 | 0 | B | B | B | −1.2 | A | AAA | A | A | 210 |
| A16 | E | 30 | 40 | 0.2 | 0 | 5 | 25 | 38 | 0 | A | A | A | −1.2 | A | AAA | A | A | 210 |
| A17 | C | 30 | 40 | 0.2 | 0 | 5 | 21 | 30 | 0 | B | A | A | −1.2 | B | B | B | A | 210 |
| A18 | E | 30 | 15 | 0.1 | 0 | 5 | 24 | 38 | 0 | A | A | A | −1.2 | A | AAA | A | A | 210 |
| A19 | E | 30 | 25 | 0.1 | 0 | 4 | 26 | 35 | 0 | A | A | A | −1.2 | A | AAA | A | A | 210 |
| A20 | E | 25 | 35 | 0.1 | 5 | 5 | 28 | 36 | 0 | A | AAA | AA | −1.4 | A | AAA | A | A | 200 |
| A21 | C | 25 | 30 | 0.1 | 5 | 5 | 23 | 28 | 0 | B | AAA | AAA | −1.4 | B | B | B | A | 200 |
| A22 | E | 20 | 10 | 0.1 | 0 | 4 | 27 | 42 | 0 | A | AAA | AA | −1.2 | AAA | AAA | A | A | 250 |
| A23 | E | 20 | 10 | 0.1 | 0 | 5 | 27 | 42 | 0 | A | AAA | AA | −1.2 | AAA | AAA | A | A | 250 |
| A24 | E | 20 | 15 | 0.1 | 0 | 15 | 26 | 38 | 0 | A | AAA | AA | −1.2 | AAA | AAA | AAA | A | 250 |
| A25 | C | 0 | — | — | 0 | 5 | 13 | 43 | 33 | B | B | B | −1.2 | B | B | B | A | 250 |
| A26 | C | 0 | — | — | 0 | 5 | 12 | 42 | 36 | B | B | B | −1.2 | B | AAA | AAA | A | 250 |
| A27 | C | 0 | — | — | 0 | 0 | 53 | 38 | 0 | A | AAA | AA | −1.2 | B | B | B | A | 250 |
| A28 | E | 20 | 30 | 0.2 | 5 | 20 | 15 | 38 | 0 | A | AAA | AAA | −1.4 | AAA | AAA | AAA | A | 250 |
| A29 | E | 25 | 25 | 0.1 | 0 | 10 | 27 | 33 | 0 | A | A | AA | −1.3 | AAA | AAA | AAA | A | 240 |
| A30 | C | 25 | 25 | 0.1 | 0 | 15 | 22 | 23 | 0 | B | AAA | AA | −1.3 | B | B | B | A | 240 |

TABLE 1-10

| No. | Cat-ego-ry | Area fraction (%) Zn + MCSB | MCSB/Zn | Dc (μm) | Mas-sive MCSB | Fine ZnAl struc-ture | Al | MgZn2 | Ternary eutectic struc-ture | Corrosion resistance Plain sur-face | End surface 1 cycle | End surface 5 cycles | Corro-sion poten-tial | SST White rust area | Powdering V-bending | Powdering Un-bending | Draw bead test | Vick-ers hard-ness (Hv) |
|---|---|---|---|---|---|---|---|---|---|---|---|---|---|---|---|---|---|---|
| A31 | E | 25 | 25 | 0.1 | 0 | 10 | 25 | 37 | 0 | A | AAA | AA | −1.3 | AAA | AAA | AAA | A | 240 |
| A32 | C | 25 | 25 | 0.1 | 0 | 5 | 24 | 30 | 0 | B | AAA | AA | −1.3 | B | B | B | A | 240 |
| A33 | E | 25 | 25 | 0.1 | 0 | 5 | 28 | 38 | 0 | A | AAA | AA | −1.3 | AAA | AAA | A | A | 240 |
| A34 | E | 25 | 25 | 0.1 | 5 | 5 | 24 | 37 | 0 | A | A | AA | −1.4 | A | AAA | A | A | 220 |
| A35 | E | 25 | 25 | 0.1 | 5 | 5 | 28 | 33 | 0 | A | A | AA | −1.5 | A | AAA | A | A | 220 |
| A36 | C | 0 | — | — | 5 | 5 | 32 | 36 | 0 | B | B | B | −1.1 | B | B | B | A | 220 |
| A37 | E | 25 | 35 | 0.2 | 5 | 5 | 28 | 35 | 0 | A | A | AA | −1.4 | A | AAA | A | A | 220 |
| A38 | E | 25 | 35 | 0.2 | 5 | 5 | 25 | 36 | 0 | A | A | AA | −1.5 | A | AAA | A | A | 220 |
| A39 | C | 0 | — | — | 0 | 5 | 34 | 36 | 0 | B | B | B | −1.1 | B | B | B | A | 220 |
| A40 | C | 0 | — | — | 0 | 5 | 34 | 37 | 0 | B | AAA | A | −1.4 | B | B | B | A | 280 |
| A41 | E | 25 | 10 | 0.1 | 0 | 5 | 24 | 37 | 0 | A | AAA | AA | −1.3 | AAA | AAA | A | A | 250 |
| A42 | E | 25 | 25 | 0.1 | 0 | 5 | 24 | 38 | 0 | A | AAA | AA | −1.4 | AAA | AAA | A | A | 240 |
| A43 | E | 25 | 40 | 0.2 | 5 | 5 | 29 | 34 | 0 | A | AAA | AAA | −1.5 | AAA | AAA | A | A | 230 |
| A44 | C | 15 | 55 | 0.2 | 20 | 5 | 54 | 0 | 0 | B | AAA | AAA | −1.4 | B | AAA | A | A | 150 |
| A45 | C | 25 | 15 | 0.1 | 0 | 5 | 30 | 33 | 0 | B | A | A | −1.3 | B | B | B | A | 220 |
| A46 | E | 25 | 15 | 0.1 | 0 | 10 | 33 | 28 | 0 | A | A | A | −1.3 | A | AAA | AAA | A | 260 |
| A47 | E | 25 | 15 | 0.1 | 0 | 15 | 34 | 23 | 0 | A | AAA | AA | −1.3 | AAA | AAA | AAA | A | 250 |
| A48 | E | 25 | 15 | 0.1 | 0 | 10 | 34 | 23 | 0 | A | AAA | AA | −1.3 | AAA | AAA | AAA | A | 250 |
| A49 | E | 20 | 35 | 0.2 | 7 | 5 | 32 | 28 | 0 | A | AAA | AAA | −1.4 | A | AAA | AAA | A | 260 |
| A50 | E | 20 | 35 | 0.2 | 8 | 10 | 30 | 26 | 0 | A | AA | AAA | −1.5 | A | AAA | AAA | A | 260 |
| A51 | E | 20 | 35 | 0.2 | 7 | 5 | 30 | 26 | 0 | A | AA | AAA | −1.5 | A | AAA | A | A | 260 |
| A52 | E | 20 | 35 | 0.2 | 8 | 15 | 29 | 25 | 0 | A | AA | AAA | −1.5 | A | AAA | AAA | A | 260 |
| A53 | E | 20 | 35 | 0.2 | 7 | 10 | 30 | 24 | 0 | A | AA | AAA | −1.5 | A | AAA | AAA | A | 260 |
| A54 | C | 0 | — | — | 0 | 10 | 25 | 27 | 0 | B | B | B | −1.1 | B | B | B | A | 260 |
| A55 | E | 15 | 50 | 0.2 | 10 | 15 | 20 | 37 | 0 | A | AAA | AAA | −1.4 | AAA | AAA | AAA | A | 270 |
| A56 | E | 15 | 50 | 0.2 | 13 | 15 | 20 | 36 | 0 | A | AAA | AAA | −1.4 | AAA | AAA | AAA | A | 270 |
| A57 | C | 15 | 50 | 0.2 | 18 | 10 | 18 | 34 | 0 | B | AAA | AAA | −1.4 | B | B | B | A | 270 |
| A58 | E | 20 | 45 | 0.2 | 12 | 10 | 16 | 38 | 0 | A | AAA | AAA | −1.4 | A | AAA | AAA | A | 270 |
| A59 | E | 20 | 30 | 0.2 | 0 | 5 | 28 | 39 | 0 | A | AAA | AA | −1.3 | AAA | AAA | A | A | 260 |

TABLE 1-11

| No. | Cat-ego-ry | Area fraction (%) Zn + MCSB | MCSB/Zn | Dc (μm) | Mas-sive MCSB | Fine ZnAl struc-ture | Al | MgZn2 | Ternary eutectic struc-ture | Corrosion resistance Plain sur-face | End surface 1 cycle | End surface 5 cycles | Corro-sion potential | SST White rust area | Powdering V-bending | Powdering Un-bending | Draw bead test | Vickers hard-ness (Hv) |
|---|---|---|---|---|---|---|---|---|---|---|---|---|---|---|---|---|---|---|
| A60 | C | 0 | — | — | 0 | 5 | 30 | 40 | 0 | B | B | B | −1.3 | B | B | B | A | 260 |
| A61 | C | 0 | — | — | 0 | 5 | 35 | 37 | 0 | B | B | B | −1.3 | B | AAA | A | A | 260 |
| A62 | C | 0 | — | — | 0 | 0 | 77 | 20 | 0 | A | AAA | AA | −1.3 | B | B | B | A | 260 |
| A63 | E | 20 | 25 | 0.1 | 0 | 5 | 32 | 40 | 0 | A | AAA | AA | −1.4 | AAA | AAA | A | A | 260 |
| A64 | C | 0 | — | — | 0 | 5 | 37 | 34 | 0 | B | B | B | −1.1 | B | B | B | A | 260 |
| A65 | E | 20 | 25 | 0.1 | 0 | 10 | 33 | 35 | 0 | A | AAA | A | −1.3 | A | AAA | AAA | A | 260 |
| A66 | E | 20 | 25 | 0.1 | 0 | 5 | 30 | 36 | 0 | A | AAA | A | −1.4 | A | AAA | A | A | 260 |
| A67 | C | 0 | — | — | 0 | 5 | 34 | 40 | 0 | B | B | B | −1.1 | B | B | B | A | 260 |
| A68 | C | 15 | 25 | 0.1 | 12 | 5 | 47 | 3 | 0 | B | AAA | AAA | −1.4 | B | B | B | A | 280 |
| A69 | C | 15 | 25 | 0.1 | 13 | 5 | 45 | 2 | 0 | B | AAA | AAA | −1.4 | B | B | B | A | 280 |
| A70 | E | 15 | 35 | 0.2 | 5 | 5 | 30 | 41 | 0 | A | AAA | AAA | −1.4 | A | AAA | A | A | 280 |
| A71 | E | 15 | 35 | 0.2 | 20 | 5 | 12 | 44 | 0 | A | AAA | AAA | −1.4 | AAA | AAA | A | A | 310 |
| A72 | C | 20 | 10 | 0.1 | 0 | 5 | 3 | 38 | 33 | B | AAA | AAA | −1.1 | B | AAA | A | A | 300 |
| A73 | E | 35 | 35 | 0.2 | 5 | 5 | 33 | 18 | 0 | A | AAA | AA | −1.3 | AAA | AAA | A | A | 250 |
| A74 | E | 20 | 40 | 0.2 | 5 | 5 | 12 | 56 | 0 | A | AAA | AA | −1.4 | AAA | AAA | A | A | 300 |
| A75 | E | 20 | 35 | 0.2 | 6 | 5 | 10 | 55 | 0 | A | AAA | AA | −1.5 | AAA | AAA | A | A | 300 |
| A76 | C | 0 | — | — | 0 | 5 | 8 | 56 | 0 | B | B | B | −1.1 | B | B | B | A | 300 |
| A77 | E | 20 | 40 | 0.2 | 12 | 5 | 10 | 50 | 0 | A | AAA | AAA | −1.4 | AAA | AAA | A | A | 300 |
| A78 | E | 20 | 45 | 0.2 | 13 | 5 | 9 | 52 | 0 | A | AAA | AAA | −1.5 | A | AAA | A | A | 300 |
| A79 | C | 0 | 40 | 0.2 | 0 | 5 | 5 | 56 | 0 | B | B | B | −1.1 | B | B | B | A | 300 |
| A80 | E | 15 | 40 | 0.2 | 13 | 5 | 14 | 43 | 0 | A | AAA | AAA | −1.4 | AAA | AAA | A | A | 310 |
| A81 | E | 15 | 40 | 0.2 | 0 | 5 | 12 | 63 | 0 | A | AAA | AA | −1.5 | AAA | AAA | A | A | 310 |
| A82 | C | 0 | 40 | 0.2 | 0 | 5 | 16 | 49 | 0 | B | B | B | −1.1 | B | B | B | A | 310 |
| A83 | E | 30 | 20 | 0.1 | 0 | 5 | 40 | 19 | 0 | A | AAA | A | −1.3 | A | AAA | A | A | 280 |

TABLE 1-11-continued

| | | Area fraction (%) | | | | | | | Corrosion resistance | | | SST | | | | Vickers |
|---|---|---|---|---|---|---|---|---|---|---|---|---|---|---|---|---|
| | | | | | Fine | | Ternary | | | | | | Powdering | | Draw | hard- |
| | Cat- | | MCSB/Zn | Mas- | ZnAl | | eutectic | Plain | End surface | | Corro- | White | | | bead | ness |
| | ego- | Zn + | Dc | sive | struc- | | struc- | sur- | 1 | 5 | sion | rust | V- | Un- | | |
| No. | ry | MCSB | (μm) | MCSB | ture | Al | MgZn2 | ture | face | cycle | cycles | potential | area | bending | bending | test | (Hv) |
| A84 | E | 35 | 25 | 0.1 | 0 | 5 | 31 | 26 | 0 | A | AAA | A | −1.3 | AAA | AAA | A | 280 |
| A85 | C | 0 | — | — | 0 | 5 | 32 | 40 | 15 | B | B | B | −1.3 | B | B | B | A | 280 |
| A86 | C | 0 | — | — | 0 | 5 | 33 | 42 | 12 | B | B | B | −1.3 | B | AAA | A | A | 280 |
| A87 | C | 0 | — | — | 0 | 0 | 69 | 21 | 0 | A | AAA | A | −1.3 | B | B | A | A | 280 |
| A88 | E | 30 | 15 | 0.1 | 0 | 10 | 15 | 42 | 0 | A | AAA | A | −1.2 | A | AAA | AAA | A | 290 |
| A89 | E | 30 | 10 | 0.1 | 0 | 10 | 16 | 40 | 0 | A | AAA | AA | −1.2 | AAA | AAA | AAA | A | 300 |

TABLE 1-12

| | | Area fraction (%) | | | | | | | Corrosion resistance | | | SST | | | | Vickers |
|---|---|---|---|---|---|---|---|---|---|---|---|---|---|---|---|---|
| | | | | | Fine | | Ternary | | | | | | Powdering | | Draw | hard- |
| | Cat- | | MCSB/Zn | Mas- | ZnAl | | eutectic | Plain | End surface | | Corro- | White | | | bead | ness |
| | ego- | Zn + | Dc | sive | struc- | | struc- | sur- | 1 | 5 | sion | rust | V- | Un- | | |
| No. | ry | MCSB | (μm) | MCSB | ture | Al | MgZn2 | ture | face | cycle | cycles | potential | area | bending | bending | test | (Hv) |
| A90 | E | 25 | 30 | 0.2 | 0 | 20 | 18 | 35 | 0 | A | AAA | AA | −1.3 | AAA | AAA | AAA | A | 300 |
| A91 | E | 20 | 35 | 0.2 | 3 | 5 | 20 | 45 | 0 | A | AAA | AA | −1.4 | AAA | AAA | A | A | 290 |
| A92 | E | 25 | 35 | 0.2 | 12 | 15 | 18 | 28 | 0 | A | AAA | AAA | −1.4 | A | AAA | AAA | A | 290 |
| A93 | E | 30 | 25 | 0.1 | 0 | 10 | 20 | 35 | 0 | A | AAA | A | −1.2 | A | AAA | AAA | A | 290 |
| A94 | C | 20 | 30 | 0.2 | 6 | 10 | 19 | 41 | 0 | B | AAA | AA | −1.3 | B | B | B | A | 300 |
| A95 | C | 20 | 30 | 0.2 | 6 | 10 | 19 | 41 | 0 | B | AAA | AA | −1.3 | B | B | B | A | 300 |
| A96 | E | 20 | 30 | 0.2 | 5 | 10 | 18 | 42 | 0 | A | AAA | AA | −1.3 | AAA | AAA | AAA | A | 300 |
| A97 | E | 20 | 30 | 0.2 | 6 | 5 | 20 | 43 | 0 | A | AAA | AA | −1.3 | AAA | AAA | A | A | 300 |
| A98 | C | 0 | — | — | 0 | 5 | 23 | 43 | 0 | A | AAA | AA | −1.4 | A | B | B | A | 320 |
| A99 | E | 20 | 30 | 0.2 | 10 | 15 | 15 | 38 | 0 | A | AAA | AAA | −1.4 | AAA | AAA | AAA | A | 300 |
| A100 | C | 0 | 30 | 0.2 | 0 | 5 | 19 | 42 | 6 | B | B | B | −1.4 | B | B | B | A | 300 |
| A101 | C | 0 | 30 | 0.2 | 0 | 5 | 26 | 41 | 5 | B | B | B | −1.4 | B | AAA | AAA | A | 300 |
| A102 | C | 0 | 30 | 0.2 | 10 | 0 | 79 | 9 | 0 | A | AAA | AA | −1.4 | B | B | B | A | 300 |
| A103 | E | 20 | 25 | 0.1 | 0 | 10 | 18 | 50 | 0 | A | AAA | AA | −1.4 | A | AAA | AAA | A | 310 |
| A104 | E | 30 | 25 | 0.1 | 0 | 5 | 18 | 45 | 0 | A | AAA | AA | −1.3 | AAA | AAA | A | A | 300 |
| A105 | E | 30 | 25 | 0.1 | 0 | 10 | 20 | 38 | 0 | A | A | AA | −1.3 | A | AAA | AAA | A | 290 |
| A106 | E | 30 | 25 | 0.1 | 0 | 5 | 23 | 38 | 0 | A | A | AA | −1.4 | A | AAA | A | A | 290 |
| A107 | C | 0 | 25 | 0.1 | 0 | 15 | 29 | 33 | 0 | B | B | B | −1.1 | B | B | B | A | 290 |
| A108 | E | 15 | 25 | 0.1 | 0 | 15 | 20 | 46 | 0 | A | AAA | AA | −1.3 | AAA | AAA | AAA | A | 300 |
| A109 | E | 20 | 25 | 0.1 | 0 | 25 | 18 | 36 | 0 | A | AAA | AA | −1.3 | AAA | AAA | AAA | A | 200 |
| A110 | C | 15 | 15 | — | 0 | 15 | 28 | 16 | 0 | B | AAA | AA | −1.3 | B | B | B | A | 300 |
| A111 | E | 15 | 35 | 0.2 | 5 | 15 | 55 | 2 | 0 | A | AAA | AAA | −1.4 | AAA | AAA | AAA | A | 190 |
| A112 | E | 15 | 35 | 0.2 | 7 | 10 | 56 | 3 | 0 | A | AAA | AAA | −1.4 | AAA | AAA | AAA | A | 190 |
| A113 | E | 10 | 35 | 0.2 | 6 | 20 | 57 | 1 | 0 | A | A | AAA | −1.4 | A | AAA | AAA | A | 180 |
| A114 | E | 10 | 35 | 0.2 | 0 | 15 | 62 | 2 | 0 | A | A | AA | −1.4 | AAA | AAA | AAA | A | 190 |
| A115 | C | 10 | 35 | 0.2 | 8 | 5 | 59 | 9 | 0 | A | B | AAA | −1.4 | A | AAA | A | A | 190 |
| A116 | C | 10 | 20 | 0.1 | 0 | 5 | 18 | 62 | 0 | A | A | A | −1.2 | A | B | A | A | 350 |
| A117 | C | 10 | 15 | 0.1 | 0 | 5 | 71 | 6 | 0 | A | B | B | −1.1 | A | B | B | A | 220 |
| A118 | C | 0 | — | — | 0 | 5 | 81 | 5 | 0 | B | B | B | −1.1 | B | B | B | A | 220 |
| A119 | C | 0 | — | — | 0 | 0 | 37 | 9 | 52 | B | B | B | −1 | B | AAA | AAA | A | 150 |

Example B

In order to obtain coating layers of the chemical compositions shown in Table 2-1, a given amount of pure metal ingot was used for preparation and melted in a vacuum melting furnace, followed by initial make-up of coating bath in the air. For preparation of coated steel sheets, a batch-type melt coating system was used. 0.8-mm general cold-rolled carbon steel (C concentration of <0.1%) was used for a coating base sheet, and degreasing and pickling were performed immediately before the coating step.

In any sample preparation, the same reduction treatment method was applied to the coating base sheet until immersion in the coating bath. In other words, the coating base sheet was heated from room temperature to 800° C. by electric heating in a $N_2$—$H_2$ (5%) environment (dew point of −40° C. or less, oxygen concentration of less than 25 ppm), retained for 60 seconds, cooled to the coating bath temperature+10° C. by $N_2$ gas spraying, and immediately immersed in the coating bath.

The coating process was conducted according to the above-described Production method D for production.

By controlling the coating bath immersion time, coated steel sheets with different thicknesses of the Al—Fe alloy layer were prepared. In addition, the amount of wiping gas was adjusted to prepare coated steel sheets with different thicknesses of the Zn—Al—Mg alloy layer.

As in (Example A), various analyses and various measurements were conducted.

—Powdering—

To evaluate processability of the coating layer, each coated steel sheet was subjected to a 0R-90° V-bending test, and cellophane tape having a width of 24 mm was pressed against and pulled away from a V-shaped valley fold so as to visually judge powdering.

A case in which the powder exfoliated due to powdering was adhering in lines to the tape was evaluated as "B."

A case in which the powder exfoliated due to powdering was adhering in spots to the tape was evaluated as "A."

A case in which powdering exfoliation did not occur was evaluated as "AAA."

—Salt Spray Test (written as "SST" in Tables)—

The Zn—Al—Mg alloy layer was removed from the coating layer surface by surface cutting processing for Example Nos. 1 to 12. Theses coated steel sheets on which only the Al—Fe alloy layer was attached were subjected to a salt spray test (JIS Z 2371) so as to measure the coating surface red rust area fraction after 24 hours. Pass criteria were determined based on general cold-rolled carbon steel used as a comparative material for a coating base sheet, a red rust area fraction of 90% or more indicating an increase in the red rust area fraction was evaluated as "B," and a red rust area fraction of less than 90% was evaluated as "AAA."

Tables 2-1 to 2-3 show lists of Example B.

TABLE 2-1

| No. | Category | Coating bath melting point (° C.) | Coating bath temperature (° C.) | Immersion time (second) | Production method | Component (mass %) Zn | Al | Mg | Sn group Sn | Bi | In |
|---|---|---|---|---|---|---|---|---|---|---|---|
| B1 | E | 375 | 500 | 0.5 | Production method D | 79 | 6 | 4.5 | 10 | 0 | 0 |
| B2 | E | 375 | 500 | 2 | Production method D | 79 | 6 | 4.5 | 10 | 0 | 0 |
| B3 | E | 375 | 500 | 3 | Production method D | 79 | 6 | 4.5 | 10 | 0 | 0 |
| B4 | E | 410 | 500 | 3 | Production method D | 83.2 | 10 | 4.5 | 1 | 0 | 0 |
| B5 | E | 410 | 500 | 3 | Production method D | 83.2 | 10 | 4.5 | 1 | 0 | 0 |
| B6 | E | 410 | 500 | 3 | Production method D | 83.2 | 10 | 4.5 | 1 | 0 | 0 |
| B7 | E | 430 | 500 | 3 | Production method D | 77 | 13 | 6 | 3 | 0 | 0 |
| B8 | E | 450 | 500 | 3 | Production method D | 74.9 | 17 | 5 | 2 | 0 | 0 |
| B9 | E | 460 | 510 | 3 | Production method D | 69.1 | 20 | 7 | 2 | 0 | 0 |
| B10 | E | 460 | 510 | 3 | Production method D | 68.6 | 20 | 7 | 2 | 0 | 0 |
| B11 | E | 460 | 510 | 7 | Production method D | 65.6 | 20 | 7 | 2 | 0 | 0 |
| B12 | C | 460 | 510 | 9 | Production method D | 65.1 | 20 | 7 | 2 | 0 | 0 |
| B13 | C | | | | General carbon steel | 100 | — | — | — | — | — |

| No. | Ca group Ca | Y | La | Ce | Si | Cr group Cr | Ti | Ni | Co | V | Nb | Cu | Mn | Fe | Sr group Sr | Sb | Pb | B |
|---|---|---|---|---|---|---|---|---|---|---|---|---|---|---|---|---|---|---|
| B1 | 0 | 0 | 0 | 0 | 0 | 0 | 0 | 0 | 0 | 0 | 0 | 0 | 0 | 0.5 | 0 | 0 | 0 | 0 |
| B2 | 0 | 0 | 0 | 0 | 0 | 0 | 0 | 0 | 0 | 0 | 0 | 0 | 0 | 0.5 | 0 | 0 | 0 | 0 |
| B3 | 0 | 0 | 0 | 0 | 0 | 0 | 0 | 0 | 0 | 0 | 0 | 0 | 0 | 0.5 | 0 | 0 | 0 | 0 |
| B4 | 0 | 0 | 0 | 0 | 0.3 | 0 | 0 | 0 | 0 | 0 | 0 | 0 | 0 | 1 | 0 | 0 | 0 | 0 |
| B5 | 0 | 0 | 0 | 0 | 0.3 | 0 | 0 | 0 | 0 | 0 | 0 | 0 | 0 | 1 | 0 | 0 | 0 | 0 |
| B6 | 0 | 0 | 0 | 0 | 0.3 | 0 | 0 | 0 | 0 | 0 | 0 | 0 | 0 | 1 | 0 | 0 | 0 | 0 |
| B7 | 0 | 0 | 0 | 0 | 0 | 0 | 0 | 0 | 0 | 0 | 0 | 0 | 0 | 1 | 0 | 0 | 0 | 0 |
| B8 | 0 | 0 | 0 | 0 | 0 | 0 | 0 | 0 | 0 | 0 | 0 | 0 | 0 | 1 | 0 | 0 | 0 | 0.1 |
| B9 | 0.4 | 0 | 0 | 0 | 0 | 0 | 0 | 0 | 0 | 0 | 0 | 0 | 0 | 1.5 | 0 | 0 | 0 | 0 |
| B10 | 0.4 | 0 | 0 | 0 | 0 | 0 | 0 | 0 | 0 | 0 | 0 | 0 | 0 | 2 | 0 | 0 | 0 | 0 |
| B11 | 0.4 | 0 | 0 | 0 | 0 | 0 | 0 | 0 | 0 | 0 | 0 | 0 | 0 | 5 | 0 | 0 | 0 | 0 |
| B12 | 0.4 | 0 | 0 | 0 | 0 | 0 | 0 | 0 | 0 | 0 | 0 | 0 | 0 | 5.5 | 0 | 0 | 0 | 0 |
| B13 | — | — | — | — | — | — | — | — | — | — | — | — | — | — | — | — | — | — |

TABLE 2-2

| No. | Cat-ego-ry | Total Cr group | Total Sr group | Concentration formula Ca—(Y+ Sn—(Bi+In) | Concentration formula Ca—(Y+ La+Ce) | Determination Sn—Si | Sn/Zn | Coating layer Al—Fe layer (μm) | Coating layer Zn—Al—Mg layer (μm) | Specific intensity I (MCSB) | Specific intensity I (MgCaSn) | Specific intensity I (CaZnAl) | Intensity I (23.3°) | Diffraction peak position 23.36-23.46 |
|---|---|---|---|---|---|---|---|---|---|---|---|---|---|---|
| B1 | E | 0 | 0 | 10 | 0 | 10 | 0.13 | 0.10 | 25 | 8.5 | 1.99 | <0.4 | 4399 | NG |
| B2 | E | 0 | 0 | 10 | 0 | 10 | 0.13 | 1.50 | 25 | 9.7 | 1.95 | <0.4 | 4562 | NG |
| B3 | E | 0 | 0 | 10 | 0 | 10 | 0.13 | 2.00 | 25 | 8.4 | 1.93 | <0.4 | 4881 | NG |
| B4 | E | 0 | 0 | 1 | 0 | 0.7 | 0.01 | 2.00 | 3 | 3.3 | 1.2 | <0.4 | 901 | OK |
| B5 | E | 0 | 0 | 1 | 0 | 0.7 | 0.01 | 2.00 | 50 | 3.1 | 1.25 | <0.4 | 995 | OK |
| B6 | E | 0 | 0 | 1 | 0 | 0.7 | 0.01 | 2.00 | 95 | 3.6 | 1.25 | <0.4 | 945 | OK |
| B7 | E | 0 | 0 | 3 | 0 | 3 | 0.04 | 2.00 | 25 | 4.7 | 1.96 | <0.4 | 3645 | NG |
| B8 | E | 0 | 0.1 | 2 | 0 | 2 | 0.03 | 2.00 | 25 | 4.6 | 1.74 | <0.4 | 1936 | NG |
| B9 | E | 0 | 0 | 2 | 0.4 | 2 | 0.03 | 2 | 25 | 5 | 0.05 | 0.8 | 2985 | NG |
| B10 | E | 0 | 0 | 2 | 0.4 | 2 | 0.03 | 3 | 25 | 4.9 | 0.05 | 0.8 | 3024 | NG |
| B11 | E | 0 | 0 | 2 | 0.4 | 2 | 0.03 | 5 | 25 | 5.1 | 0.05 | 0.8 | 3112 | NG |
| B12 | C | 0 | 0 | 2 | 0.4 | 2 | 0.03 | 5.5 | 25 | 5.3 | 0.05 | 0.8 | 3215 | NG |
| B13 | C | — | — | — | — | — | — | — | — | — | — | — | — | — |

TABLE 2-3

| No. | Cat-ego-ry | Area fraction Zn+MCSC | MCSC/Zn | Dc (μm) | Massive MCSB | Fine Zn—Al structure | Fine Al | Fine MgZn2 | Ternary eutectic structure | SST Powdering 0R-90° | SST Red rust evaluation |
|---|---|---|---|---|---|---|---|---|---|---|---|
| B1 | E | 10 | 60 | 0.2 | 0 | 0 | 60 | 25 | 0 | AAA | — |
| B2 | E | 10 | 55 | 0.2 | 0 | 0 | 60 | 25 | 0 | A | AAA |
| B3 | E | 10 | 60 | 0.2 | 0 | 0 | 58 | 27 | 0 | A | AAA |
| B4 | E | 25 | 15 | 0.1 | 0 | 5 | 40 | 28 | 0 | AAA | AAA |
| B5 | E | 30 | 15 | 0.1 | 0 | 5 | 38 | 29 | 0 | A | AAA |
| B6 | E | 30 | 15 | 0.1 | 0 | 5 | 39 | 30 | 0 | A | AAA |
| B7 | E | 20 | 25 | 0.1 | 0 | 5 | 30 | 36 | 0 | AAA | AAA |
| B8 | E | 30 | 25 | 0.1 | 0 | 5 | 33 | 33 | 0 | AAA | AAA |
| B9 | E | 30 | 25 | 0.1 | 0 | 5 | 33 | 33 | 0 | AAA | AAA |
| B10 | E | 30 | 25 | 0.1 | 0 | 5 | 18 | 45 | 0 | A | AAA |
| B11 | E | 30 | 25 | 0.1 | 0 | 5 | 20 | 45 | 0 | A | AAA |
| B12 | C | 30 | 25 | 0.1 | 0 | 5 | 20 | 45 | 0 | B | AAA |
| B13 | C | — | — | — | — | — | — | — | — | — | B |

Example C

In order to obtain coating layers of chemical compositions shown in Table 3-1, a given amount of pure metal ingot was used and melted in a vacuum melting furnace, followed by initial make-up of coating bath in the air. For preparation of coated steel sheets, a batch-type melt coating system was used. 0.8-mm general hot-rolled carbon steel (C concentration of <0.1%) was used for a coating substrate, and degreasing and pickling were performed immediately before the coating step.

In any sample preparation, the same reduction treatment method was applied to the coating base sheet until immersion in the coating bath. In other words, the coating base sheet was heated from room temperature to 800° C. by electric heating in a $N_2$—$H_2$(5%) environment (dew point of −40° C. or less, oxygen concentration of less than 25 ppm), retained for 60 seconds, cooled to the coating bath temperature+10° C. by $N_2$ gas spraying, and immediately immersed in the coating bath. The thickness of each coating layer was set to 30 am.

The coating process was conducted according to the above-described Production method D or E for production.

Some samples were prepared using a 0.8-mm coating base sheet under the same conditions as Example A.

For all samples obtained, as in Example A, various analyses, various measurements, and evaluations were carried out. Note that X-ray diffraction analysis was not conducted.

Confirmation of the Ca—Al—Si intermetallic compound phase and the Mg—Al—Si intermetallic compound phase and measurement of the average grain size were carried out as described below.

A 10×10 mm square was cut out from each resulting coated steel sheet. The surface of the coating layer was embedded in a resin with a tilt of 10° from the horizontal plane and polished, and the oblique sectional structure of the coating layer was observed. In a case in which an optional section was examined to find the amorphous or needle-like intermetallic compound phase and the metallic compound phase was confirmed, element mapping analysis was further performed by EDS. In a case in which the presence of three elements, Ca, Al, and Si, was confirmed, it was regarded that there was the Ca—Al—Si intermetallic compound phase, and it was written as "OK" in the column of "Presence of Ca—Al—Si" column in Table 3. In a case in which the presence of three elements, Mg, Al, and Si, was confirmed, it was regarded that there was the Mg—Al—Si intermetallic compound phase, and it was written as "OK" in the column of "Presence of Mg—Al—Si" in Table 3.

In addition, in a case in which the presence of the Ca—Al—Si intermetallic compound phase and the presence of the Mg—Al—Si intermetallic compound phase were confirmed, the average grain size of each of the intermetallic compound phases was measured according to the method described above. The results were shown in the columns of "Dc of Ca—Al—Si" and "Dc of Mg—Al—Si" in Table 3.

In addition, in order to evaluate processed portion corrosion resistance, each coated steel sheet was cut into a size of 30×60×0.8 mm, from which 0T, 1T, 2T, 4T, and 8T bending test pieces were prepared. In addition, the 30×60 mm flat specimens and these T-bending specimens (external top portion) were simultaneously subjected to a salt spray test (JIS Z 2371), and the accelerated corrosion test was continued until spots of red rust appeared on the plain surface and the top portion. The processed-portion corrosion resistance deterioration rate defined by the following Formula was calculated for each of the 0T to 8T bending test pieces:

(processed-portion corrosion resistance deterioration rate)= (top portion of T-bending test piece)/(time for red rust formation on plain surface).

A processed-portion corrosion resistance deterioration rate of 0.8 or more for each of the samples 0 to 8T was evaluated as "AAA."

A processed-portion corrosion resistance deterioration rate of 0.8 or more only for the samples 1T to 8T was evaluated as "AA."

A processed-portion corrosion resistance deterioration rate of 0.8 or more only for the samples 2T to 8T was evaluated as "A+."

A processed-portion corrosion resistance deterioration rate of 0.8 or more only for the samples 4T to 8T was evaluated as "A."

A processed-portion corrosion resistance deterioration rate of 0.8 or more only for the sample 8T was evaluated as "B."

Tables 3-1 to 3-3 show lists of Example C.

TABLE 3-1

| No. | Category | Coating bath melting point (°C.) | Coating bath temperature (°C.) | Production method | Zn | Al | Mg | Sn group Sn | Bi | In |
|---|---|---|---|---|---|---|---|---|---|---|
| C1  | E | 370 | 500 | Production method D | 87.5  | 5.5  | 4   | 2   | 0   | 0   |
| C2  | E | 370 | 500 | Production method D | 87.98 | 5.5  | 4   | 2   | 0   | 0   |
| C3  | E | 400 | 500 | Production method D | 79.7  | 10   | 6   | 4   | 0   | 0   |
| C4  | E | 400 | 500 | Production method D | 79.6  | 10   | 6   | 4   | 0   | 0   |
| C5  | E | 420 | 500 | Production method D | 81.85 | 11   | 6   | 0.1 | 0   | 0   |
| C6  | E | 415 | 500 | Production method D | 81.2  | 11   | 5.5 | 0.5 | 0.1 | 0   |
| C7  | E | 430 | 500 | Production method D | 76.8  | 13   | 6   | 3   | 0   | 0   |
| C8  | E | 430 | 500 | Production method D | 75.1  | 13   | 6   | 3   | 0   | 0   |
| C9  | E | 440 | 500 | Production method D | 73.5  | 16   | 5   | 4   | 0   | 0   |
| C10 | E | 440 | 500 | Production method D | 73    | 16   | 5   | 4   | 0   | 0   |
| C11 | E | 450 | 500 | Production method D | 75    | 17   | 5   | 2   | 0   | 0   |
| C12 | E | 450 | 500 | Production method D | 74.6  | 17   | 5   | 2   | 0   | 0   |
| C13 | E | 455 | 505 | Production method D | 67    | 18   | 8   | 5   | 0   | 0   |
| C14 | E | 455 | 505 | Production method D | 66.5  | 18   | 8   | 5   | 0   | 0   |
| C15 | E | 465 | 515 | Production method E | 73    | 19   | 5   | 1   | 0   | 0.5 |
| C16 | E | 465 | 515 | Production method E | 72.8  | 19   | 5   | 1   | 0   | 0.5 |
| C17 | E | 460 | 510 | Production method D | 69    | 22   | 6   | 2   | 0   | 0.1 |
| C18 | E | 460 | 510 | Production method D | 68.8  | 22   | 6   | 2   | 0   | 0.1 |
| C19 | E | 470 | 520 | Production method E | 66    | 24.5 | 4   | 3.5 | 0   | 0   |
| C20 | E | 470 | 520 | Production method E | 63.6  | 24.5 | 4   | 3.5 | 0   | 0   |

| No. | Ca group Ca | Y | La | Ce | Si | Fe | Determination Concentration formula Sn—(Bi + In) | Ca—(Y + La + Ce) | Sn—Si | Sn/Zn |
|---|---|---|---|---|---|---|---|---|---|---|
| C1  | 0 | 0 | 0 | 0 | 0 | 0 | 2   | 0 | 2   | 0.02 |
| C2  | 0 | 0 | 0 | 0 | 0 | 0 | 2   | 0 | 2   | 0.02 |
| C3  | 0 | 0 | 0 | 0 | 0 | 0 | 4   | 0 | 4   | 0.05 |
| C4  | 0 | 0 | 0 | 0 | 0 | 0 | 4   | 0 | 4   | 0.05 |
| C5  | 0 | 0 | 0 | 0 | 0 | 0 | 0.1 | 0 | 0.1 | 0.00 |
| C6  | 0 | 0 | 0 | 0 | 0 | 0 | 0.4 | 0 | 0.5 | 0.01 |
| C7  | 0 | 0 | 0 | 0 | 0 | 0 | 3   | 0 | 3   | 0.04 |
| C8  | 0 | 0 | 0 | 0 | 0 | 0 | 3   | 0 | 3   | 0.04 |
| C9  | 0 | 0 | 0 | 0 | 0 | 0 | 4   | 0 | 4   | 0.05 |
| C10 | 0 | 0 | 0 | 0 | 0 | 0 | 4   | 0 | 4   | 0.05 |
| C11 | 0 | 0 | 0 | 0 | 0 | 0 | 2   | 0 | 2   | 0.03 |
| C12 | 0 | 0 | 0 | 0 | 0 | 0 | 2   | 0 | 2   | 0.03 |
| C13 | 0 | 0 | 0 | 0 | 0 | 0 | 5   | 0 | 5   | 0.07 |
| C14 | 0 | 0 | 0 | 0 | 0 | 0 | 5   | 0 | 5   | 0.08 |
| C15 | 0 | 0 | 0 | 0 | 0 | 0 | 0.5 | 0 | 1   | 0.01 |
| C16 | 0 | 0 | 0 | 0 | 0 | 0 | 0.5 | 0 | 1   | 0.01 |
| C17 | 0 | 0 | 0 | 0 | 0 | 0 | 1.9 | 0 | 2   | 0.03 |
| C18 | 0 | 0 | 0 | 0 | 0 | 0 | 1.9 | 0 | 2   | 0.03 |
| C19 | 0 | 0 | 0 | 0 | 0 | 0 | 3.5 | 0 | 3.5 | 0.05 |
| C20 | 0 | 0 | 0 | 0 | 0 | 0 | 3.5 | 0 | 3.5 | 0.06 |

TABLE 3-2

| No. | Category | Area fraction (%) Zn + MCSC | MCSC/Zn | MCSC/Zn Dc (μm) | Massive MCSB | Fine Zn—Al structure | Al | MgZn2 | Ternary eutectic structure | Ternary eutectic structure Ca—Al—Si Presence | Ca—Al—Si Dc (μm) | Mg—Al—Si Presence | Mg—Al—Si Dc (μm) |
|---|---|---|---|---|---|---|---|---|---|---|---|---|---|
| C1  | E | 5  | 40 | 1 | 0 | 0  | 45 | 45 | 0 | NG | —  | NG | —  |
| C2  | E | 5  | 40 | 1 | 0 | 0  | 43 | 43 | 0 | OK | 1  | OK | 1  |
| C3  | E | 20 | 35 | 2 | 3 | 5  | 28 | 38 | 0 | NG | —  | NG | —  |
| C4  | E | 20 | 35 | 2 | 3 | 5  | 25 | 36 | 0 | OK | 2  | OK | 1  |
| C5  | E | 20 | 10 | 1 | 0 | 4  | 27 | 42 | 0 | NG | —  | NG | —  |
| C6  | E | 25 | 10 | 1 | 0 | 5  | 24 | 37 | 0 | NG | —  | NG | —  |
| C7  | E | 20 | 25 | 1 | 0 | 5  | 30 | 36 | 0 | NG | —  | NG | —  |
| C8  | E | 20 | 25 | 1 | 0 | 5  | 30 | 34 | 0 | OK | 4  | OK | 3  |
| C9  | E | 35 | 35 | 2 | 5 | 5  | 33 | 18 | 0 | NG | —  | NG | —  |
| C10 | E | 35 | 35 | 2 | 5 | 5  | 32 | 16 | 0 | OK | 3  | OK | 1  |
| C11 | E | 30 | 20 | 1 | 0 | 5  | 40 | 19 | 0 | NG | —  | NG | —  |
| C12 | E | 30 | 20 | 1 | 0 | 5  | 40 | 18 | 0 | OK | 2  | OK | 1  |
| C13 | E | 20 | 35 | 2 | 3 | 5  | 20 | 45 | 0 | NG | —  | NG | —  |
| C14 | E | 20 | 35 | 2 | 3 | 5  | 20 | 43 | 0 | OK | 4  | OK | 2  |
| C15 | E | 30 | 25 | 1 | 0 | 10 | 20 | 35 | 0 | NG | —  | NG | —  |
| C16 | E | 30 | 25 | 1 | 0 | 10 | 20 | 33 | 0 | OK | 2  | OK | 1  |
| C17 | E | 30 | 25 | 1 | 0 | 5  | 23 | 38 | 0 | NG | —  | NG | —  |
| C18 | E | 30 | 25 | 1 | 0 | 5  | 23 | 35 | 0 | OK | 3  | OK | 2  |
| C19 | E | 15 | 35 | 2 | 7 | 10 | 56 | 3  | 0 | 91 | —  | NG | —  |
| C20 | E | 15 | 35 | 2 | 5 | 10 | 56 | 3  | 0 | OK | 5  | OK | 3  |

TABLE 3-3

| No. | Category | Corrosion resistance Plain surface | End surface 1 cycle | End surface 2 cycles | Processed portion | Corrosion potential | SST White rust area | Powdering V-bending | Powdering Un-bending | Draw bead test | Vickers hardness (Hv) |
|---|---|---|---|---|---|---|---|---|---|---|---|
| C1  | E | A | AAA | A   | A+  | −1.3 | A   | AAA | A   | A   | 170 |
| C2  | E | A | AA  | A   | AA  | −1.3 | A   | AAA | A   | A   | 170 |
| C3  | E | A | AAA | AA  | A   | −1.4 | A   | AAA | A   | A   | 210 |
| C4  | E | A | AA  | AAA | AAA | −1.4 | A   | AAA | A   | A   | 210 |
| C5  | E | A | AAA | AA  | A+  | −1.2 | AAA | AAA | A   | A   | 250 |
| C6  | E | A | AAA | AA  | A+  | −1.3 | AAA | AAA | A   | A   | 250 |
| C7  | E | A | AAA | A   | A+  | −1.4 | A   | AAA | A   | A   | 260 |
| C8  | E | A | A   | AA  | AAA | −1.4 | AAA | AAA | A   | A   | 260 |
| C9  | E | A | AAA | AA  | A   | 0    | A   | AAA | A   | A   | 250 |
| C10 | E | A | A   | AAA | AA  | −1.3 | A   | AAA | A   | A   | 250 |
| C11 | E | A | AAA | A   | A+  | −1.3 | A   | AAA | A   | A   | 280 |
| C12 | E | A | A   | AA  | AAA | −1.3 | A   | AAA | A   | A   | 280 |
| C13 | E | A | AAA | AA  | A   | −1.4 | AAA | AAA | A   | A   | 290 |
| C14 | E | A | A   | AAA | AA  | −1.4 | AAA | AAA | A   | A   | 290 |
| C15 | E | A | AAA | A   | A+  | −1.2 | A   | AAA | AAA | A   | 290 |
| C16 | E | A | AA  | AA  | AAA | −1.2 | A   | AAA | AAA | A   | 290 |
| C17 | E | A | A   | AA  | A+  | −1.4 | A   | AAA | A   | A   | 290 |
| C18 | E | A | A   | AAA | AAA | −1.4 | A   | AAA | A   | A   | 290 |
| C19 | E | A | AAA | AAA | A   | −1.4 | AAA | AAA | AAA | A   | 190 |
| C20 | E | A | A   | A   | AAA | AA  | −1.4 | A   | AAA | AAA | A   | 190 |

The preferred embodiments of the invention have been described in detail with reference to the accompanying drawings. However, the invention is not limited to such examples. It is obvious that those skilled in the art to which the invention belongs can conceive of various changes or modifications within the scope of the technical concept described in the claims. It is obviously understood that these changes or modifications also fall within the technical scope of the invention.

In FIGS. 1 to 14, each reference numeral refers to the corresponding subject as described below.

1: Al phase (including a fine Zn phase)
2: $MgZn_2$ phase (massive)
3: Zn—Al—$MgZn_2$ ternary eutectic structure
4: Zn phase containing a Mg—Sn intermetallic compound phase
5: Al phase
6: $MgZn_2$ phase
7: Zn phase containing a Mg—Sn intermetallic compound phase
8: Mg—Sn intermetallic compound phase having a grain size of 1 μm or more (massive Mg—Sn intermetallic compound phase)
9: Eutectoid structure having a lamellar spacing of less than 300 nm composed of a Zn phase and an Al phase (fine Zn—Al eutectoid structure)
11: Mg—Al—Si intermetallic compound phase
12: Ca—Al—Si intermetallic compound phase
13: Amorphous intermetallic compound phase (Mg—Al—Si intermetallic compound phase)
14: Needle-like intermetallic compound phase (Ca—Al—Si intermetallic compound phase)
20: Zn phase having a Zn—Al—$MgZn_2$ ternary eutectic structure
21: $MgZn_2$ phase having a Zn—Al—$MgZn_2$ ternary eutectic structure
22: Al phase having a Zn—Al—$MgZn_2$ ternary eutectic structure
30: Zn phase having a Zn—Al—$MgZn_2$ ternary eutectic structure
31: Al phase having a Zn—Al—$MgZn_2$ ternary eutectic structure
100: Coating layer
100A: Coating layer
101: Zn—Al—Mg alloy layer
101A: Zn—Al—Mg alloy layer
102: Al—Fe alloy layer
102A: Al—Fe alloy layer In the disclosure, the following Additional Statements are further disclosed.

(Additional Statement 1)

A melt-coated steel sheet having a steel product and a coating layer including a Zn—Al—Mg alloy layer disposed on the surface of the steel product, wherein a Zn phase in the Zn—Al—Mg alloy layer contains an intermetallic compound (Mg, Ca, Y, La, Ce)$_2$(Sn, Bi, In), the coating layer consists of
Zn: more than 65.0%,
Al: from more than 5% to less than 25.0%,
Mg: from more than 3% to less than 12.5%,
Sn: from 0.10% to 20%,
Bi: from 0% to less than 5%,
In: from 0% to less than 2%,
Ca: from 0% to 3.0%,
Y: from 0% to 0.5%,
La: from 0% to less than 0.5%,
Ce: from 0% to less than 0.5%,
Si: from 0% to less than 2.5%,
Cr: from 0% to less than 0.25%,
Ti: from 0% to less than 0.25%,
Ni: from 0% to less than 0.25%,
Co: from 0% to less than 0.25%,
V: from 0% to less than 0.25%,
Nb: from 0% to less than 0.25%,
Cu: from 0% to less than 0.25%,
Mn: from 0% to less than 0.25%,
Fe: from 0% to 5%,
Sr: from 0% to less than 0.5%,
Sb: from 0% to less than 0.5%,
Pb: from 0% to less than 0.5%,
B: from 0% to less than 0.5% in terms of percent (%) by mass and impurities, and Bi+In<Sn, Y+La+Ce≤Ca, Si<Sn, Cr+Ti+Ni+Co+V+Nb+Cu+Mn<0.25, and Sr+Sb+Pb+B<0.5 are satisfied.

(Additional Statement 2)

The melt-coated steel sheet according to Additional Statement 1, wherein the intermetallic compound (Mg, Ca, Y, La, Ce)$_2$(Sn, Bi, In) has a grain size of less than 1 m and is dispersed in the Zn phase.

(Additional Statement 3)

The melt-coated steel sheet according to Additional Statement 1 or 2, wherein the Zn phase containing the intermetallic compound (Mg, Ca, Y, La, Ce)$_2$(Sn, Bi, In) having a grain size of less than 1 μm is present with an area fraction of 3% or more in an optional cross-section of the Zn—Al—Mg alloy layer in an optional sectional structure of the Zn—Al—Mg alloy layer.

(Additional Statement 4)

The melt-coated steel sheet according to any one of Additional Statements 1 to 3, wherein a Zn—Al—$MgZn_2$ ternary eutectic structure is not present in the coating layer.

(Additional Statement 5)

The melt-coated steel sheet according to any one of Additional Statements 1 to 4, wherein based on an X-ray diffraction image obtained from the surface of the coating layer, the image being measured using a Cu-Kα ray with an X-ray output at 40 kV and 150 mA, intensity sum I ((Mg, Ca, Y, La, Ce)$_2$(Sn, Bi, In))={I (22.8° intensity (cps))+I (23.3° intensity (cps))+I (24.2° intensity (cps))} is 1000 cps or more.

(Additional Statement 6)

The melt-coated steel sheet according to any one of Additional Statements 1 to 5, wherein the coating layer contains 0.05% to 3% by mass of Ca, based on an X-ray diffraction image obtained from the surface of the coating layer, the image being measured using a Cu-Kα ray, specific intensity I (MgCaSn+Mg9Sn5)={I (22.8° intensity (cps))+I (26.3° intensity (cps))}/I (23.3° intensity (cps)) is less than 0.3 (provided that a case in which I (23.3° intensity (cps)) is less than 500 cps is excluded).

(Additional Statement 7)

The melt-coated steel sheet according to any one of Additional Statements 1 to 6, wherein the coating layer contains 0.05% to 3% by mass of Ca, and a Ca—Zn—Al-based intermetallic compound having a grain size of 1 μm or more is present with an area fraction of 5% or more in an optional cross-section of the Zn—Al—Mg alloy layer in an optional sectional structure of the Zn—Al—Mg alloy layer.

(Additional Statement 8)

The melt-coated steel sheet according to any one of Additional Statements 1 to 7, wherein the coating layer contains 3% to 20% by mass of Sn, 0.05<Sn %/Zn % is satisfied, a phase composed of (Mg, Ca, Y, La, Ce)$_2$(Sn, Bi, In) having a grain size of 1 μm or more is present with an area fraction of 3% or more in an optional cross-section of the Zn—Al—Mg alloy layer in an optional sectional structure of the Zn—Al—Mg alloy layer.

(Additional Statement 9)

The melt-coated steel sheet according to any one of Additional Statements 1 to 8, wherein a eutectoid structure composed of a Zn phase and an Al phase, and having a lamellar spacing of less than 300 nm is present with an area fraction of 10% or more in an optional cross-section of the Zn—Al—Mg alloy layer in an optional sectional structure of the Zn—Al—Mg alloy layer.

(Additional Statement 10)

The melt-coated steel sheet according to any one of Additional Statements 1 to 9, wherein the coating layer further includes an Al—Fe alloy layer, the Al—Fe alloy layer is formed on the steel product, and the Zn—Al—Mg alloy layer is formed on the Al—Fe alloy layer.

The disclosure of Japanese Patent Application No. 2017-013198 is incorporated herein by reference in its entirety.

All documents, patent applications, and technical standards described herein are incorporated herein by reference to the same extent when it is described specifically and individually that individual documents, patent applications, and technical standards are incorporated herein by reference.

The invention claimed is:

1. A coated steel product having a steel product and a coating layer including a Zn—Al—Mg alloy layer disposed on a surface of the steel product,
wherein the Zn—Al—Mg alloy layer has a Zn phase, and the Zn phase includes a Mg—Sn intermetallic compound phase,
wherein the coating layer consists of, in terms of percent (%) by mass:
Zn: more than 65.0%,
Al: from more than 5.0% to less than 25.0%,
Mg: from more than 3.0% to less than 12.5%,
Sn: from 0.1% to 20.0%,
Bi: from 0% to less than 5.0%,
In: from 0% to less than 2.0%,
Ca: from 0.05% to 3.00%,
Y: from 0% to 0.5%,
La: from 0% to less than 0.5%,
Ce: from 0% to less than 0.5%,
Si: from 0.01% to less than 2.5%,
Cr: from 0% to less than 0.25%,
Ti: from 0% to less than 0.25%,
Ni: from 0% to less than 0.25%,
Co: from 0% to less than 0.25%,
V: from 0% to less than 0.25%,
Nb: from 0% to less than 0.25%,
Cu: from 0% to less than 0.25%,
Mn: from 0% to less than 0.25%,
Fe: from 0% to 5.0%,
Sr: from 0% to less than 0.5%,
Sb: from 0% to less than 0.5%,
Pb: from 0% to less than 0.5%,
B: from 0% to less than 0.5%, and
impurities, and
wherein the coating layer has a chemical composition that satisfies the following Formulas 1 to 5:

$Bi+In<Sn$      Formula 1:

$Y+La+Ce \leq Ca$      Formula 2:

$Si<Sn$      Formula 3:

$0 \leq Cr+Ti+Ni+Co+V+Nb+Cu+Mn<0.25$      Formula 4:

$0 \leq Sr+Sb+Pb+B<0.5$      Formula 5:

wherein, in Formulas 1 to 5, each element symbol represents a content of a corresponding element in terms of percent (%) by mass,
wherein the Zn—Al—Mg alloy layer has at least one selected from the group consisting of a Ca—Al—Si intermetallic compound phase having an average grain size of 1 μm or more and a Mg—Al—Si intermetallic compound phase having an average grain size of 1 μm or more.

2. The coated steel product according to claim 1, wherein the Mg—Sn intermetallic compound phase has an average grain size of less than 1 μm.

3. The coated steel product according to claim 1, wherein, in a cross-section of the Zn—Al—Mg alloy layer, the Mg—Sn intermetallic compound phase having a grain size of less than 1 μm has an area fraction of from 10% to 50% with respect to the Zn phase including the Mg—Sn intermetallic compound phase.

4. The coated steel product according to claim 1, wherein, in a cross-section of the Zn—Al—Mg alloy layer, the Zn phase including the Mg—Sn intermetallic compound phase is present with an area fraction of 3% or more with respect to the cross-section of the Zn—Al—Mg alloy layer.

5. The coated steel product according to claim 1, wherein, based on an X-ray diffraction image of a surface of the coating layer, the image being measured using a Cu-Kα ray with an X-ray output at 40 kV and 150 mA, a specific intensity I (Mg—Sn intermetallic compound phase)={I (22.8° intensity (cps))+I (23.3° intensity (cps))+I (24.2° intensity (cps))}/3×I (background intensity at 20° (cps)) is 1.5 or more.

6. The coated steel product according to claim 1, wherein the Zn phase contains, as the Mg—Sn intermetallic compound phase, a MgCaSn phase and a $Mg_9Sn_5$ phase,
wherein, based on an X-ray diffraction image of a surface of the coating layer, the image being measured using a Cu-Kα ray with an X-ray output at 40 kV and 150 mA, a specific intensity I ($MgCaSn+Mg_9Sn_5$)={I (22.8° intensity (cps))+I (26.3° intensity (cps))}/I (23.3° intensity (cps)) is less than 0.3, and I (23.3° intensity (cps)) is 500 cps or more.

7. The coated steel product according to claim 5, wherein the coating layer has a Mg content of from more than 4.0% to less than 12.5% by mass,
wherein, based on the X-ray diffraction image of the surface of the coating layer, the image being measured using a Cu-Kα ray with an X-ray output at 40 kV and 150 mA, a diffraction peak having a strongest intensity among diffraction peaks appearing at from 23.0° to 23.46° appears between 23.36° to 23.46°.

8. The coated steel product according to claim 1,
wherein, in a cross-section of the Zn—Al—Mg alloy layer, a Ca—Zn—Al intermetallic compound phase having a grain size of 1 μm or more is present with an area fraction of 5% or more with respect to the cross-section of the Zn—Al—Mg alloy layer.

9. The coated steel product according to claim 1, wherein the coating layer has an Sn content of from 3.00% to 20.00% by mass, and, the following Formula is satisfied:
0.05<Sn/Zn, wherein each of Sn and Zn represents the content of the corresponding element,
wherein, in a cross-section of the Zn—Al—Mg alloy layer, a Mg—Sn intermetallic compound phase having a grain size of 1 μm or more is present with an area fraction of 3% or more with respect to the cross-section of the Zn—Al—Mg alloy layer.

10. The coated steel product according to claim 1, wherein, in a cross-section of the Zn—Al—Mg alloy layer, a eutectoid structure composed of a Zn phase and an Al phase, and having a lamellar spacing of less than 300 nm, is present with an area fraction of 10% or more with respect to the cross-section of the Zn—Al—Mg alloy layer.

11. The coated steel product according to claim 1, wherein a Zn—Al—MgZn$_2$ ternary eutectic structure has an area fraction of from 0% to 5% in a cross-section of the Zn—Al—Mg alloy layer.

12. The coated steel product according to claim 1, wherein an Sn content of the coating layer is from 0.10% to less than 3.00%.

13. The coated steel product according to claim 1, wherein the coating layer has an Al—Fe alloy layer between the steel product and the Zn—Al—Mg alloy layer.

14. The coated steel product according to claim 2, wherein, in a cross-section of the Zn—Al—Mg alloy layer, the Mg—Sn intermetallic compound phase having a grain size of less than 1 μm has an area fraction of from 10% to 50% with respect to the Zn phase including the Mg—Sn intermetallic compound phase.

15. The coated steel product according to claim 2, wherein, in a cross-section of the Zn—Al—Mg alloy layer, the Zn phase including the Mg—Sn intermetallic compound phase is present with an area fraction of 3% or more with respect to the cross-section of the Zn—Al—Mg alloy layer.

16. The coated steel product according to claim 3, wherein, in a cross-section of the Zn—Al—Mg alloy layer, the Zn phase including the Mg—Sn intermetallic compound phase is present with an area fraction of 3% or more with respect to the cross-section of the Zn—Al—Mg alloy layer.

17. The coated steel product according to claim 2, wherein, based on an X-ray diffraction image of a surface of the coating layer, the image being measured using a Cu-Kα ray with an X-ray output at 40 kV and 150 mA, a specific intensity I (Mg—Sn intermetallic compound phase)={I (22.8° intensity (cps))+I (23.3° intensity (cps))+I (24.2° intensity (cps))}/3×I (background intensity at 20° (cps)) is 1.5 or more.

* * * * *